United States Patent
Brown et al.

(10) Patent No.: US 7,129,601 B2
(45) Date of Patent: Oct. 31, 2006

(54) APPARATUS FOR CONTROLLED MOVEMENT OF AN ELEMENT

(75) Inventors: David C. Brown, Northborough, MA (US); Felix Stukalin, Framingham, MA (US); Michael B. Nussbaum, Newton, MA (US); Kurt Pelsue, Wayland, MA (US)

(73) Assignee: GSI Group Corporation, Billerica, MA (US)

( * ) Notice: Subject to any disclaimer, the term of this patent is extended or adjusted under 35 U.S.C. 154(b) by 244 days.

(21) Appl. No.: 10/075,940

(22) Filed: Feb. 13, 2002

(65) Prior Publication Data

US 2002/0181851 A1  Dec. 5, 2002

Related U.S. Application Data

(60) Provisional application No. 60/280,232, filed on Mar. 30, 2001.

(51) Int. Cl.
*H02K 41/00* (2006.01)
(52) U.S. Cl. .......................................... 310/12; 385/18
(58) Field of Classification Search ................. 310/12, 310/20, 80; 385/15–20; 398/55
See application file for complete search history.

(56) References Cited

U.S. PATENT DOCUMENTS 3,688,370 A * 9/1972 Cahill et al. .................. 492/16

(Continued)

FOREIGN PATENT DOCUMENTS

EP  0916983  5/1999

(Continued)

OTHER PUBLICATIONS

Motamedi, M. Edward et al. "On-chip optical processing" Microelectronic Structures and MEMS for Optical Processing II. The International Society for Optical Engineering. vol. 2881, Oct. 1996. pp. 84-117.

(Continued)

*Primary Examiner*—Karl Tamai
*Assistant Examiner*—Judson H. Jones
(74) *Attorney, Agent, or Firm*—Gauthier & Connors LLP

(57) ABSTRACT

A method and apparatus for supporting a movable member (10) with respect to a fixed member (40) is provided. The movable member (10) includes a magnetically permeable portion (81) contained therein and magnetic element (50) fixedly attached thereto and movable therewith. The movable member (10) is supported for rotation with respect to the fixed member (40) by an outer bearing surface (11) of the movable member and an inner bearing surface (20) of the fixed member (40). The fixed member (40) provides access to the movable member (10) from two sides thereof. A magnetically permeable stator element (70) is fixedly attached to the fixed member (40) and positioned within a magnetic flux field of the magnetic element (50) such that an air gap (73) is formed between the magnetic element (50) and the stator element (70). Accordingly a magnetic traction force acts across the air gap (73) for urging the moveable member (10) toward the fixed member (40) thereby clamping the movable element in a fixed orientation with respect to the movable element. The stator element (70) includes stator current coils (60) wound onto portions of the stator element for inducing electromagnetic forces within the stator element in response to a current passing through the coils. The electromagnetic force acts on the magnetic element (50) to move the movable member (10) in a controllable manner.

20 Claims, 24 Drawing Sheets

U.S. PATENT DOCUMENTS

| | | | | |
|---|---|---|---|---|
| 4,264,809 | A | * | 4/1981 | Fearnside ................ 250/201.1 |
| 4,365,863 | A | | 12/1982 | Broussaud |
| 4,436,260 | A | | 3/1984 | Donelan |
| 4,523,800 | A | | 6/1985 | Yamashita et al. .......... 359/200 |
| 4,696,585 | A | * | 9/1987 | Swearingen ................ 384/399 |
| 4,717,223 | A | | 1/1988 | Ishida et al. ................ 359/200 |
| 4,879,460 | A | | 11/1989 | Schleimann-Jensen et al. .......... 250/234 |
| 4,961,627 | A | | 10/1990 | Swain et al. |
| 5,040,882 | A | * | 8/1991 | Markle ........................ 359/727 |
| 5,185,675 | A | | 2/1993 | Banks |
| 5,208,880 | A | | 5/1993 | Riza et al. |
| 5,222,071 | A | | 6/1993 | Pezeshki et al. |
| 5,223,971 | A | | 6/1993 | Magel |
| 5,233,673 | A | | 8/1993 | Vali et al. |
| 5,253,033 | A | | 10/1993 | Lipchak et al. |
| 5,253,098 | A | | 10/1993 | Hikita et al. |
| 5,255,332 | A | | 10/1993 | Welch et al. |
| 5,268,974 | A | | 12/1993 | Hikita et al. |
| 5,345,521 | A | | 9/1994 | McDonald et al. |
| 5,373,393 | A | | 12/1994 | DeJule et al. |
| 5,430,571 | A | | 7/1995 | Witteveen .................. 359/216 |
| 5,606,448 | A | | 2/1997 | Suzuki et al. ............... 359/200 |
| 5,682,449 | A | | 10/1997 | Taira-Griffin |
| 5,881,042 | A | | 3/1999 | Knight |
| 5,923,798 | A | | 7/1999 | Aksyuk et al. |
| 5,943,159 | A | | 8/1999 | Zhu |
| 5,959,756 | A | | 9/1999 | Keyworth et al. |
| 5,963,682 | A | | 10/1999 | Dorschner et al. |
| 6,002,818 | A | | 12/1999 | Fatehi et al. |
| 6,008,834 | A | | 12/1999 | Lewis et al. |
| 6,031,946 | A | | 2/2000 | Bergmann et al. |
| 6,044,056 | A | | 3/2000 | Wilde et al. |
| 6,072,624 | A | | 6/2000 | Dixon et al. |
| 6,084,227 | A | | 7/2000 | Rhoads |
| 6,086,776 | A | | 7/2000 | Maynard |
| 6,097,860 | A | | 8/2000 | Laor |
| 6,104,478 | A | | 8/2000 | Giggenbach |
| 6,108,466 | A | | 8/2000 | Aksyuk et al. |
| 6,137,941 | A | | 10/2000 | Robinson |
| 6,154,302 | A | | 11/2000 | Yagi et al. |
| 6,163,643 | A | | 12/2000 | Bergmann et al. |
| 6,173,105 | B1 | | 1/2001 | Aksyuk et al. |
| 6,188,502 | B1 | | 2/2001 | Aoki .......................... 359/198 |
| 6,201,644 | B1 | | 3/2001 | Sakata et al. |
| 6,205,267 | B1 | | 3/2001 | Aksyuk et al. |
| 6,249,367 | B1 | | 6/2001 | Hirose ........................ 359/210 |
| 6,300,619 | B1 | | 10/2001 | Aksyuk et al. |
| 6,377,293 | B1 | | 4/2002 | Koh et al. .................. 347/261 |
| 6,526,194 | B1 | | 2/2003 | Laor ............................ 385/18 |
| 6,549,691 | B1 | | 4/2003 | Street et al. .................. 385/18 |
| 6,560,384 | B1 | | 5/2003 | Helkey et al. ................ 385/18 |
| 6,664,666 | B1 | * | 12/2003 | Corcoran ..................... 310/12 |
| 2001/0017665 | A1 | | 8/2001 | Ackermann et al. ........ 348/374 |
| 2002/0143252 | A1 | | 10/2002 | Dunne et al. ............... 600/437 |
| 2002/0181851 | A1 | | 12/2002 | Brown et al. |
| 2003/0095803 | A1 | | 5/2003 | Iino et al. ..................... 398/55 |

FOREIGN PATENT DOCUMENTS

| | | | |
|---|---|---|---|
| EP | 0916984 | | 5/1999 |
| FR | 79 07382 | * | 10/1980 |
| FR | 2452193 A | * | 11/1980 |
| JP | 1-500772 | | 3/1989 |
| JP | HE7-204955 | | 8/1995 |
| JP | 08-082757 | | 3/1996 |
| JP | 2000-081588 | | 3/2000 |

OTHER PUBLICATIONS

Preliminary Data Sheet, Rev 2. "5200-Series 64x64 MEMS Optical Switch Module" Agere Systems, Inc. Jul. 2001. (4 pages).

Ford, James E. et al. "Micromechanical Fiber-Optic Attenuator with 3 µs Response" Journal of Lightwave Technology. vol. 16, No. 9. Sep. 1998. pp. 1663-1670.

Goossen, K.W., et al. "Silicon Modulator Based on Mechanically-Active Anti-Reflection Layer with Mbit/sec Capability for Fiber-in-the-Loop Applications" IEEE Photonics Technology Letters. vol. 6, No. 9. Sep. 1994. pp. 1119-1121.

Barber, B. et al. "A Fiber Connectorized MEMS Variable Optical Attenuator" IEEE Photonics Technology Letters. vol. 10, no. 9. Sep. 1998. pp. 1262-1264.

Reid, J.Robert et al. "Arrays of thermal micro-actuators coupled to micro-optical components" Air Force Institute of Technology. The International Society for Optical Engineering, vol. 2865. pp. 74-82.

Walker, J.A. et al. "Performance and Packaging Implications of a MEMS Based Optical Modulator for WDM Fiber-To-The-Home Systems" IEEE Electronic Components and Technology Conference. 1997. pp. 601-606.

Lau, K.Y. "MEM's the Word for Optical Beam Manipulation" Circuits and Devices, IEEE. Jul. 1997. pp. 11-18.

Ford, James E. et al. "Fiber-Coupled Variable Attenuator Using a MARS Modulator" Microelectronic Structures and MEMS for Optical Processing III. The International Society for Optical Engineering. vol. 3226, Sep. 1997.pp. 86-93.

Glockner, Steffan and Goring, Rolf. "Multichannel Fiber-Optic Switches based on MOEM Systems" Microelectronic Structures and MEMS for Optical Processing III. The International Society for Optical Engineering. vol. 3226, Sep. 1997. pp. 76-85.

CLEO '95. "Summary of Papers Presented at the Conference on Lasers and Electro-Optics." Optical Society of America. 1995 Technical Digest Series, vol. 15. pp. 248-250.

Tien, Norman C. et al. "Actuation of polysilicon surface-micromachined mirrors" Miniaturized Systems with Micro-Optics and Micromechanics. The International Society for Optical Engineering. vol. 2687,.

* cited by examiner

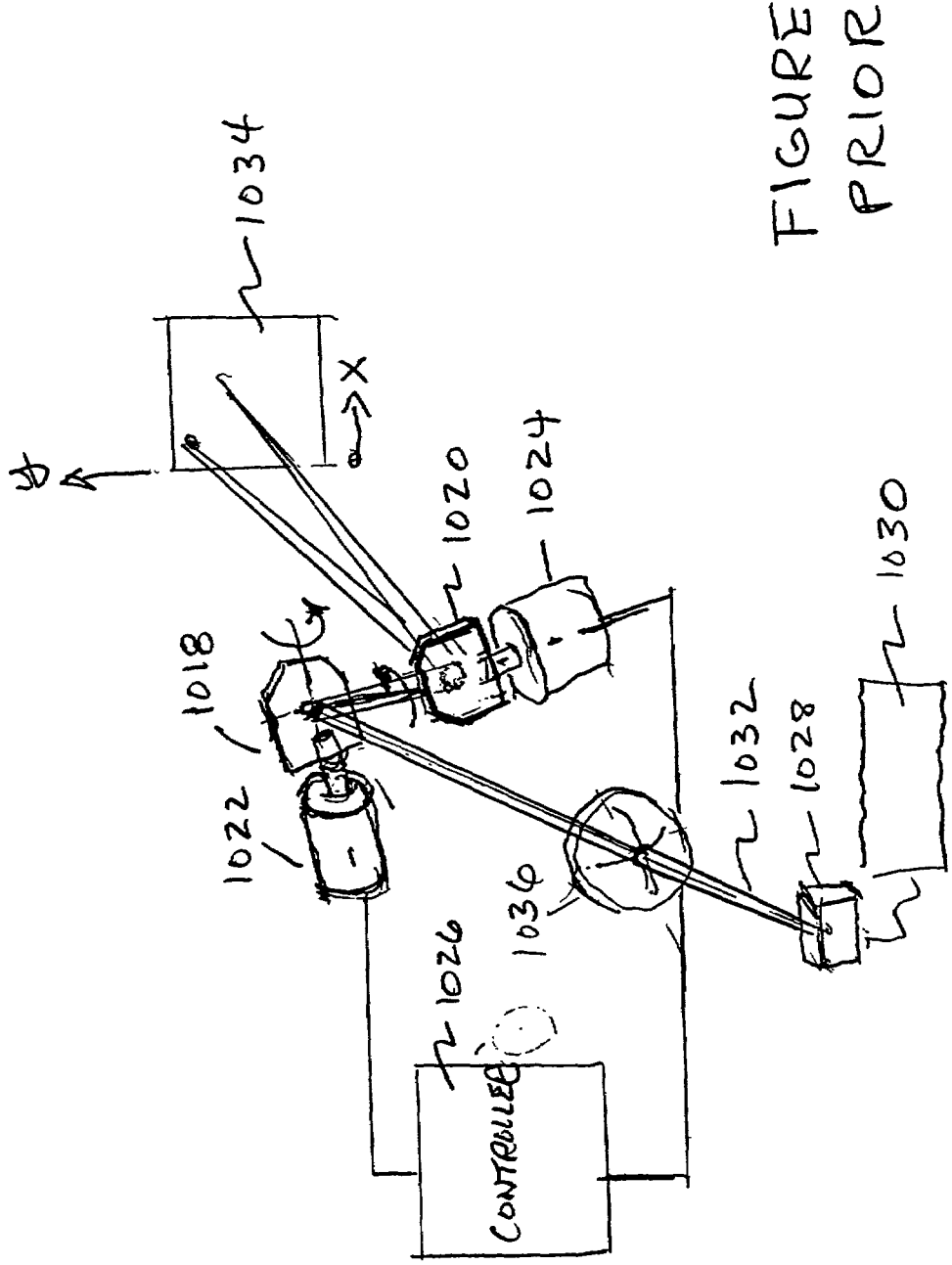

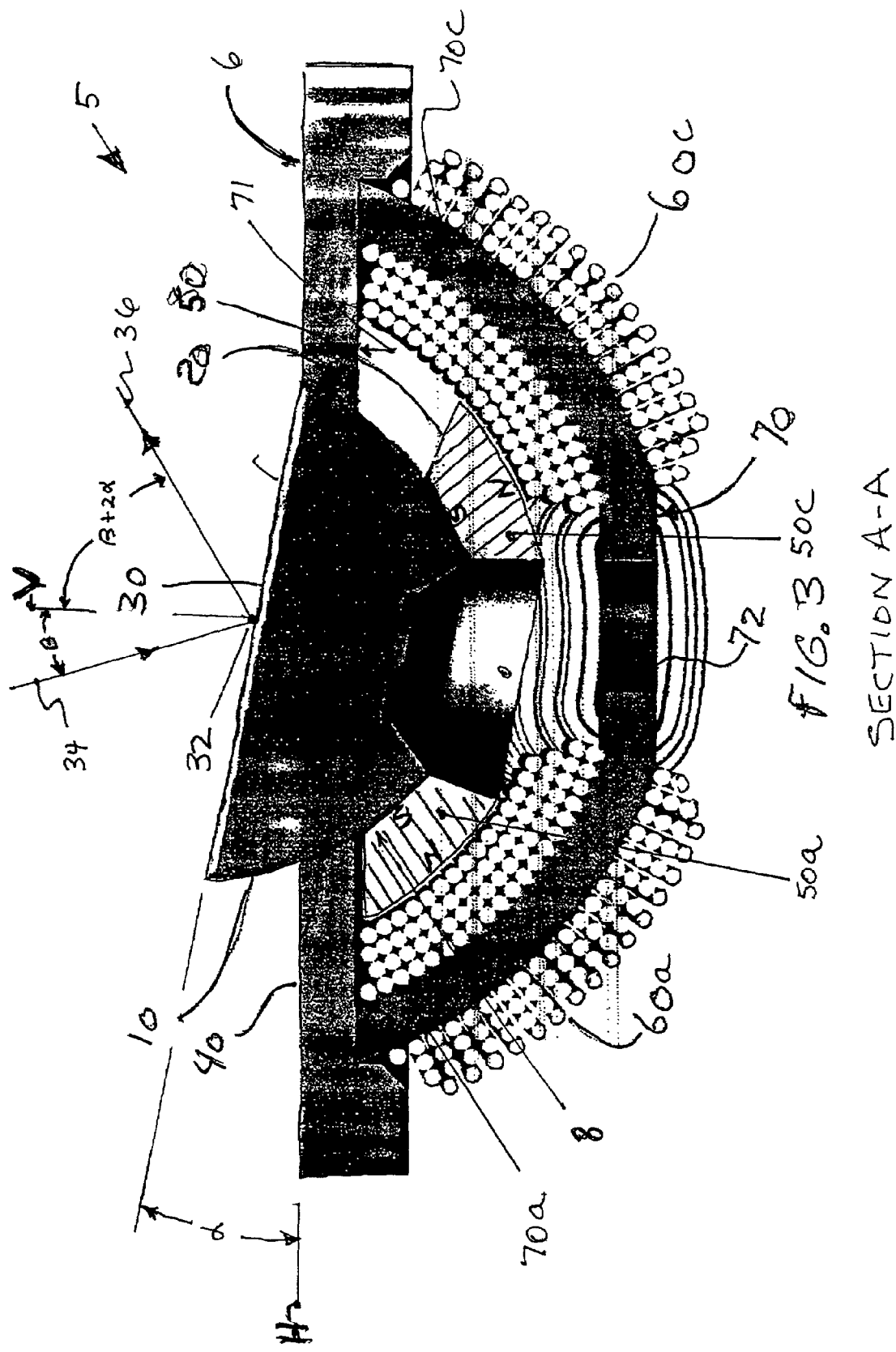

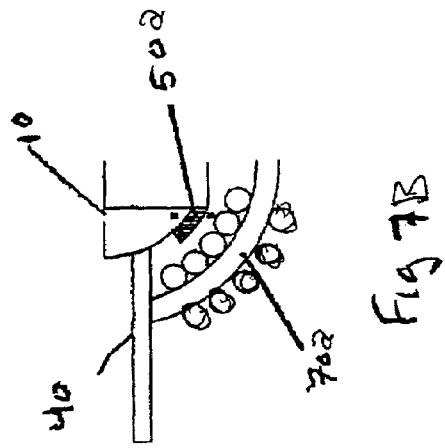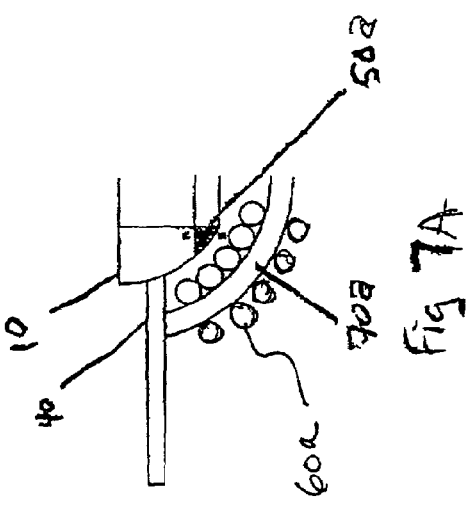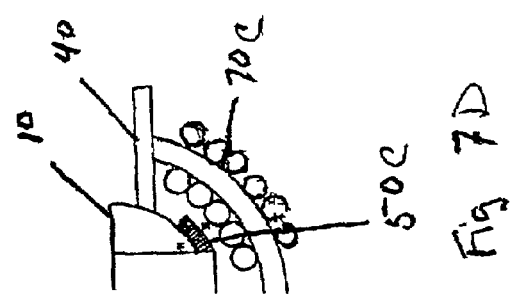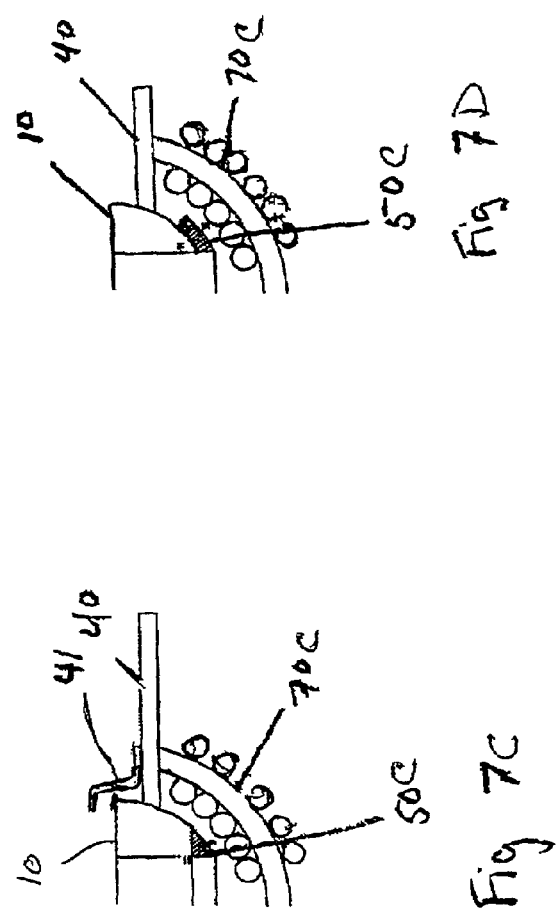

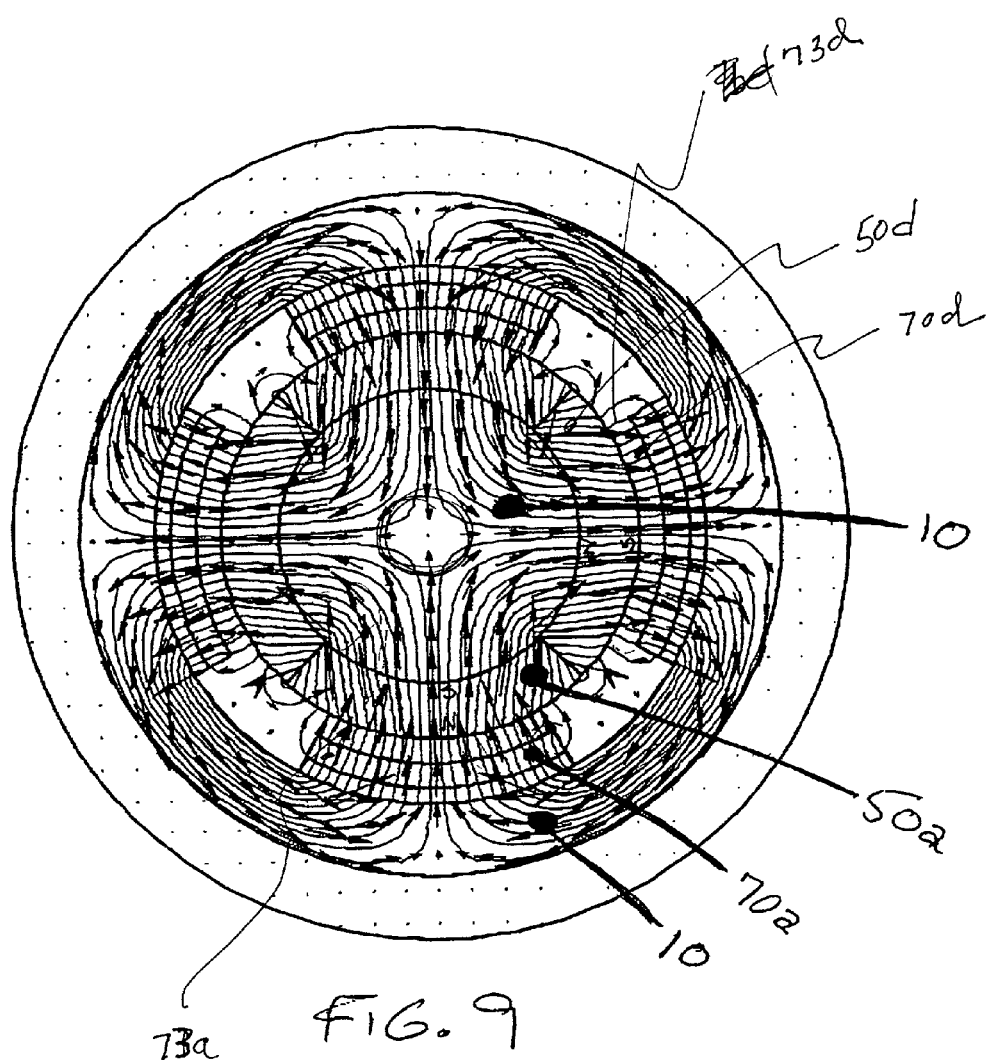

VIEW A-A

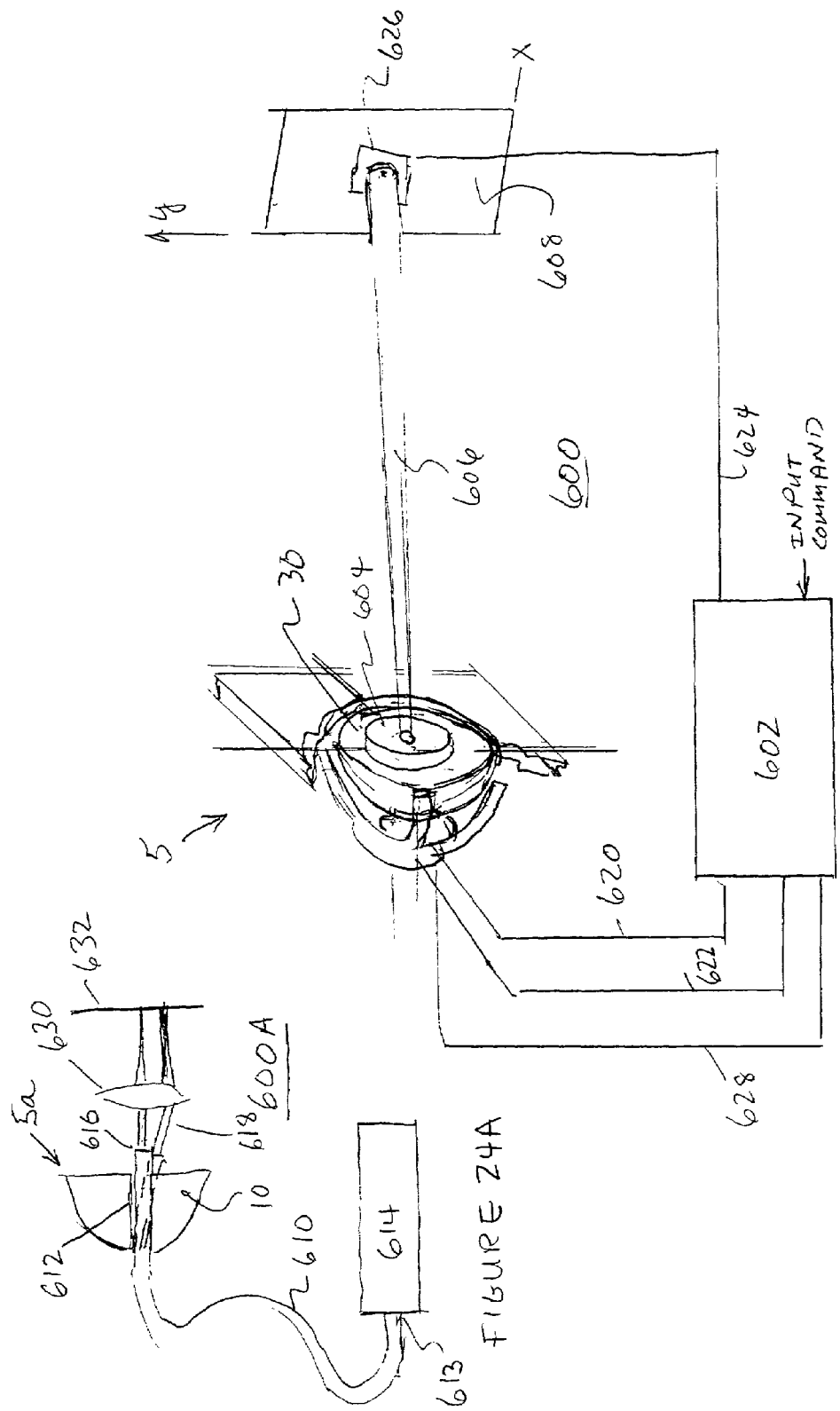

APPARATUS FOR CONTROLLED MOVEMENT OF AN ELEMENT

This application relates and claims priority for all purposes to pending U.S. application Ser. No. 60/280232, filed Mar. 30, 2001, and related U.S. applications entitled Free Space Optical Switch, application Ser. No. 10/075,946, and Method and Apparatus for Beam Deflection, application Ser. No. 10/075,950, filed on even date herewith and commonly assigned.

FIELD OF INVENTION

The present invention relates to a mechanism for directing an optical beam in free space by controlled angular movement of an optical element in one or two dimensions. In particular the invention relates to a beam steering device for use in a free space Optical Cross connect (OCX) switch used in a fiber to fiber telecommunications switching application or in an optical beam scanning apparatus for directing a beam in a desired pattern of movement.

BACKGROUND OF THE INVENTION

In fiber-optic communications there is a need for optical switching of light signals from fiber to fiber for path provisioning (creating data routes) at Optical Network Nodes (ONNs). These connections are intersections of major pipelines between Network Access Stations near the user networks. Long haul use patterns are fairly regular hence connections at ONNs are relatively constant and persist for minutes to hours. The industry is developing a solution based on the free space optical cross connect switch (OCX) to facilitate the ONN switching function.

With the development of digital wavelength division multiplexing (DWDM), the number of channels needed for optical switching can become very large. For example, 6 fibers carrying 160 wavelengths each results in 960 switchable light paths; hence OCX arrays of 1000 by 1000 ports can be needed. The micro mirror actuator systems of prior art designs include movable mirror elements that are typically rotated through a small angle in one or two planes by pairs of electronic actuators. The actuator may be mounted on a surface underlying the mirror and directly below unattached portions of the mirror. When a current or voltage is delivered to the actuator the unattached edge of the mirror is drawn toward the actuator by an electrical force moving the unattached portion of the mirror towards the underlying surface. Such devices usually use active closed loop electronic drivers that are always in an "on" state in order to hold the unattached mirror edge in a particular position. These devices require continuous consumption of power, to maintain the position. With each actuator dissipating just a fraction of a watt, the system load can total hundreds of watts of power for large actuator counts. This power generates heat that must be cooled and the total power load must be backed up in case of disruption, with battery and generator systems causing additional complexity and cost.

Prior art MEMs constructions have multiple deficiencies. FIG. 1 depicts a typical MEMs construction in which a gimbaled mirror assembly 1000 includes a movable mirror 1002 suspended on fine gimbaled structures or thin hinges 1004 and 1006 for rotation about a Y axis and suspended on fine gimbaled structure or thin hinges 1008 and 1010 for rotation about a X axis. The MEMs gimbaled mirror 1000 is mounted to an actuator layer 1012, shown cut away, which includes actuator elements for attracting a free edge of the mirror toward the actuator layer 1012.

In FIG. 1, an actuating force applied to the mirror 1002 from the actuating surface 1012, near a point A, draws a free edge of the mirror toward the actuator surface 1012 in the direction of the arrow shown at A. The mirror 1002 pivots about the Y-axis at the gimbals 1004 and 1006 such that the mirror at point B is raised with respect to the actuator surface 1012 as shown by the arrow at B. In the other axis, an actuator on the actuator surface 1012 near a point C draws another free end of the mirror in the direction of the arrow shown at C. The mirror 1002 pivots about the X-axis at the gimbals 1008 and 1010 such that the mirror at point D is raised with respect to the actuator surface 1012 as shown by the arrow at D. Single axis devices are also known for providing tilt about a single axis only. The actuator devices may employ electro-static, electromagnetic piezo-electric and mechanical actuator forces.

The gimbaled mirror assembly 1000 may be formed of a silicon or poly-silicon structure deposited or otherwise formed onto the actuator layer. In order to provide a reflective surface on the mirror 1002, a Metal Oxide Chemical Vapor Deposition comprising a coating of e.g. aluminum, silver, gold or another reflective material coats the surface 1002. The reflectivity of such layers is usually limited to about 96 to 98%. One example of a prior art MEMs device like the one shown in FIG. 1A has been described by Lucent Technologies and may have a mirror diameter in the range of about 100–500 μm (0.025–0.127 in.).

FIG. 1A depicts a plurality of optical switching mirror assemblies 1000. One commercially available example provides a 64 by 64 MEMS optical switch module having an operating temperature range of 5 to 70 degrees Centigrade, listed mirror switching time of 20 ms, with a power dissipation consumption of 15 watts. Insertion loss is 6 dB max (e.g. 75% losses); optical return loss is 30 dB, and cross channel isolation is 50 dB. Optical power transmission is limited to 31 milliwatts per port. In the particular example of FIG. 1A, each device 1000 is centered with respect to rows 1014 and columns 1016. Such an arrangement provides a poor packing density for each device leaving a low mirror area to total area ratio. Optical switching system, arrays of as few as two mirrors up to as many as 1024, or more, separate mirror elements may be required to be operating in an optical network switching hub.

One problem with the device shown in FIGS. 1 & 1A is that the mirror is surrounded mainly by air and lacks any conductive path to remove heat. This is one reason that conventional MEMS mirror devices are limited to low power, e.g. only 31 mw in the above example. Since the reflective surface of each mirror is typically limited to about 96 to 98% reflectivity, 2 to 4% of the light energy reaching the mirror may be absorbed by the mirror substrate or scattered, thereby heating the mirror substrate and the surrounding elements.

MEMS mirrors are also thin and subject to surface distortion caused by thermal stress such as may result from the heat absorbed by the substrate and by the always-on actuators. Other surface distorting factors include mechanical forces developed during actuation and release of actuation and even sagging due to the MEMs mirror low stiffness. Vibration and shock loads may also lead to transient mirror surface distortion. Mirror surface distortions may cause beam distortions, e.g. wave front aberration, scattering and optical power fluctuations, possibly resulting in increasing optical losses, signal errors and channel cross talk. A mirror system of the highest attainable reflectivity, of the highest obtainable surface flatness or accuracy of surface figure and of the highest possible stiffness and with less optical energy absorption and or better heat dissipation capability would be beneficial and could be used to reflect much higher beam powers than are now reflected by MEMS systems.

Reflective coatings in excess of 99.5 percent are realizable using multi-layer optical coatings under good process conditions. Such coatings are typically coated onto optical surfaces such as glass and metal and would be advantageous on optical switching mirrors to reduce scatter and absorption. However, these coatings have heretofore not been applied to conventional MEMs or other micro mechanical mirrors because the mirror structure is either too delicate for the coating environments or the mirror material is not compatible with accepting such coatings. Higher reflectivity coatings could reduce absorption in the mirror substrate. Mirror surfaces with a flatness of $\frac{1}{2}$–$\frac{1}{10}$ wave at the wavelength of the reflected light are routinely provided using conventional metal and glass mirror substrates by polishing. However, these polishing techniques have heretofore not been applied to conventional MEMS devices because the mirror structure is too small, too delicate, and not stiff enough or because the mirror material is not compatible with the polishing techniques.

Furthermore, to eliminate the actuator hold power required to hold a mirror stationary in prior art mirror actuators, a capability to latch or hold a mirror in a selected position without the need for electrical power would be most desirable in the optical switching field to further reduce power consumption and heat dissipation in the region of the mirror. Mirror actuating systems with a non-power consuming latch mode are not known for use with conventional mirror actuator devices. In large arrays in particular, it becomes important that the beam steering elements do not themselves place limits on the packing density of the physical parts so that a smaller overall unit size is achievable. Unit size and especially a high ratio of mirror surface area to total surface is important for closest packing arrangements in higher density arrays.

It is also desirable in optical switching systems to provide the lowest possible switch movement, settle and latch time for moving a mirror to a new position.

In other areas, the prior art teaches a diversity of beam steering or scanning devices used for single, dual and even three axes scanning of a radiation beam. FIG. 2 depicts a dual axis scanning device having first and second rotating mirrors 1018, 1020 mounted on first and second rotation elements usually comprising a limited rotation motors or galvanometers 1022, 1024. Each limited rotation motor 1022, 1024 is controlled by a servo or other style microprocessor controlled controller 1026 to rotate the mirrors through a desired angular range of just a few degrees up to 45 degrees or more. A radiation source 1028 and a source controller 1030 provide a radiation beam 1032 for directing onto a two-dimensional plane area 1034. A lens 1036 may be provided to focus the beam 1032 in the plane 1034. Each mirror 1018 and 1020 is individually controlled in its rotation angle to direct the radiation beam 1032 to any desired point in the plane 1034. In this example, rotation of the mirror 1018 scans the beam along the X-axis of the plane 1034 and rotation of the mirror 1020 scans the beam along the Y-axis of the plane 1043. Such a system as is depicted in FIG. 2 is capable of deflecting very high power optical beams without damage and provides very accurate beam placement capability. One drawback of the system is that it has heretofore been difficult to miniaturize.

Readers may find the following to provide further useful context for understanding the present invention. Yagi et al's U.S. Pat. No. 6,154,302 discloses a light deflection device in the form of a reflective or refractive surface supported on a hemisphere or half-ball member, which is supported by its hemispherical surface on a dielectric liquid layer within a conforming socket or cavity of a base member. The ball has positive and negative chargeable regions made of different materials, so that turning torque is applied to the ball by the electrostatic force from an electric field in the dielectric liquid created by electrodes distributed around the cavity in the base member, to which a suitable voltage is applied. The electrostatic turning torque alters the tilt or angular position of the hemispherical member axis relative to the base member, until a position of equilibrium corresponding to the applied voltage is reached. A variation contemplates a magnetic film on the ball, and an electromagnet on the base member, where rotation is controlled by magnetic force between the film and the electromagnet. Friction in some cases and lack of any turning torque in other cases is said to hold the ball stationary in the cavity after the electric field is extinguished. An array of such elements is also shown. One drawback of the invention by Yagi et al. is the need immerse the hemispherical elements within the dielectric liquid layer.

Sakata et al's U.S. Pat. No. 6,201,644 B1, of which Yagi is a co-inventor, describes a light deflection device and optical switching array, using a spherical body or half-ball and cavity similar in general appearance to Yagi's, with similar driving mechanisms for tilting the ball and with the same dielectric liquid layer.

Donelan's U.S. Pat. No. 4,436,260 illustrates a refracting optical scanner based on a hemispherical and a cylindrical shaped element with a mating conforming socket or cavity of a base member. A planar surface of the hemispherical or cylindrical is adjustable for relative tilt of a planar optical surface with respect to the base. A very small air bearing function facilitates relative sliding movement on the spherical interface between the components. A mechanical gimbal mechanism, offset from the nominal plane of the optical components by a four-point pushrod linkage arrangement, permits control of the tilt angle between the two optical components, affecting control of the beam deflection angle. This invention does not provide an easily controllable actuation force especially for small angles.

Swain et al's U.S. Pat. No. 4,961,627 illustrates a hemispherical element with a mating conforming socket or cavity of a base member. A planar surface of the hemispherical element is adjustable for relative tilt of a planar optical surface with respect to the base for refracting a beam passing through the hemispherical element. As in Donelan, a fluid filled gap separates the hemispherical element from the base. Piezoelectric actuators about the perimeter of the device provide for relative tilting of one component to the other. As in Donelan it is a drawback that a fluid seal is required and that the beam passes through the fluid.

In summary, there remains room in the art for a compact optical beam steering or deflecting device or design that provides for a high mirror rigidity and a high degree of mirror flatness or surface figure accuracy such as are currently obtainable by conventional optical forming techniques using conventional optical materials. There is also a need for a steering mirror capable of steering higher beam powers with improved heat dissipation and with the highest obtainable reflectivity to avoid beam absorption. There is a further need for a highly reflective mirror, which is coatable, with know high reflectivity coatings by conventional processes. Moreover, in optical switching applications there is a need for a mirror latching capability for maintaining a mirror in a fixed position for relatively long time periods without consuming electrical power. Moreover, it would be a benefit if each mirror in an optical switch was know to be unmoved after a power interruption

SUMMARY OF THE INVENTION

Several problems of the prior art are solved by the present invention as will be readily apparent from the examples and drawings listed below. Other and various objectives and examples within the scope of the invention will also be readily apparent to those skilled in the art from the description of preferred embodiments, claims and attached figures.

The invention provides a method and apparatus for supporting a movable member (10) with respect to a fixed member (40). The movable member (10) includes a magnetically permeable portion (81) contained therein and magnetic element (50) fixedly attached thereto and movable therewith. The movable member (10) is supported for rotation with respect to the fixed member (40) by an outer bearing surface (11) of the movable member and an inner bearing surface (20) also described as bearing seat, socket or raceway of the fixed member (40). The fixed member (40) provides access to the movable member (10) from two sides thereof. A magnetically permeable stator element (70) is fixedly attached to the fixed member (40) and positioned within a magnetic flux field of the magnetic element (50) such that an air gap (73) is formed between the magnetic element (50) and the stator element (70). Accordingly, a magnetic traction force acts across the air gap (73) for urging the moveable member (10) toward the fixed member (40) thereby clamping the movable element in a fixed orientation with respect to the movable member (10). The stator element (70) includes stator current coils (60) wound onto portions of the stator element for inducing electromagnetic forces within the stator element in response to a current passing through the coils. The electromagnetic force acts on the magnetic element (50) to move the movable member (10) in a controllable manner.

In another aspect of the invention, the bearing surface (11) and the bearing seat (20) have a coefficient of friction the magnetic tractive force magnitude is selected in combination with the coefficient of friction to provide a clamping force for urging the bearing surface (11) into contact with the bearing seat (20) with sufficient force magnitude that the clamping force holds the movable member in a stationary orientation with respect to the fixed member during normal operation of the apparatus. This may include operating the device upside down such that the magnetic traction force opposes gravity to keep the movable member (10) seated in the bearing seat (20).

The invention also includes a current driving circuit (400) connected with one or more stator current coils (60) for providing a current to the coils. The current is controllable for generating electromagnetic forces in the in the stator element (70) for acting on the magnetic element (50). The electromagnetic forces generated in the stator element (70) may be controlled to increasing the clamping force, decreasing the clamping force or lift the movable member (10) out of the bearing seat (20). The electromagnetic forces may also be controlled to move the movable element with respect to the fixed element such that the electromagnetic forces may have a direction and a magnitude sufficient for rotating the movable member about at least one rotational axis.

According to the invention, the first side (6) of the movable member (10) may comprise a mirrored surface (30) formed thereon for reflecting an incident radiation for directing a beam reflected from the mirror in a desired direction. Alternately, the first side (6) of the movable member (8) may provide a platform for supporting any element for controlled movement. Examples may include a mechanical pointer, a diode laser, an antenna or a radiation beam detector.

In another aspect of the invention, a detection device may be provided for determining an actual orientation of the movable member (10) with respect to some reference orientation. Moreover, the detection device may provide an electrical orientation signal representative of the actual orientation of the moveable member (10) with respect to a known reference orientation. The electrical orientation signal may be used to determine a magnitude and direction of the electromagnetic forces to be generated in the stator element by the coil currents (60) for moving the movable element to a desired orientation.

DESCRIPTION OF THE PREFERRED EMBODIMENT

Figure 1:
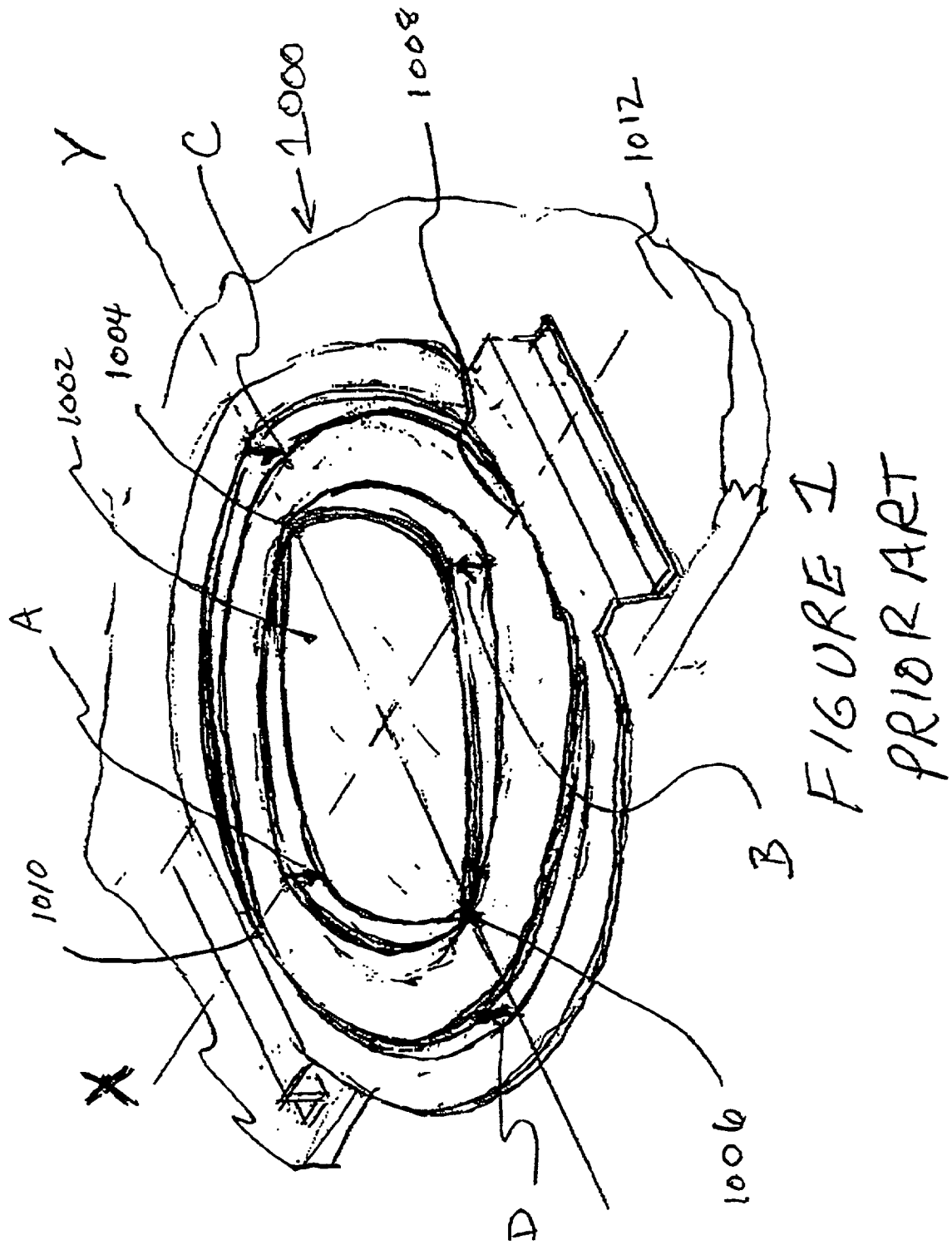
FIG. 1 is a prior art top view of a moveable, optical beam mirror assembly.
Figure 1A:
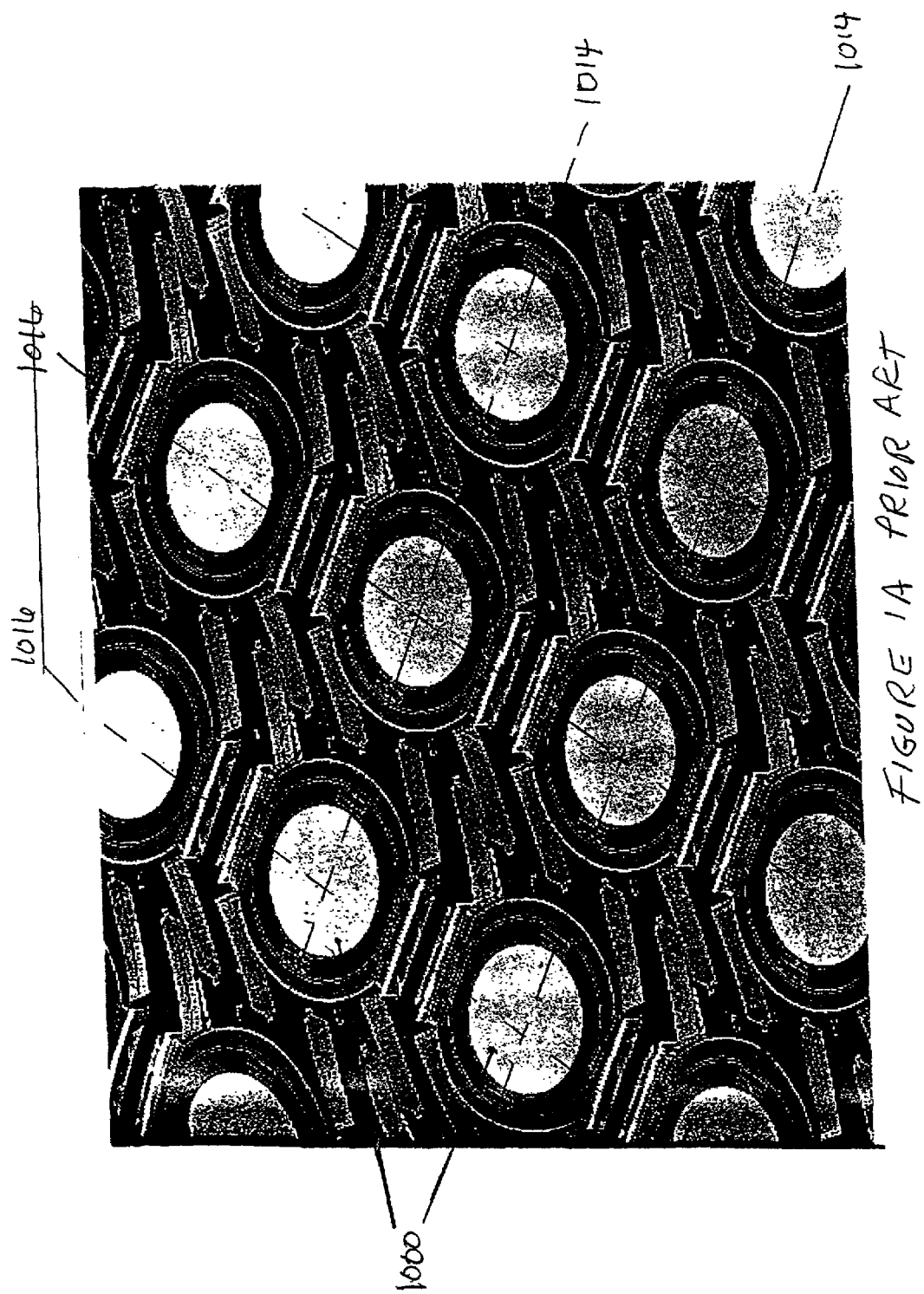
FIG. 1A is a prior art view depicting a portion of an array of movable optical mirrors.

It should be stated at the outset that the invention is susceptible of many embodiments and is applicable to other and various uses where dynamic control of the directional orientation from a reference point, of a very small platform or device is needed, particularly with little or no power required to hold a desired position once acquired. What follows is merely a description of a preferred embodiment, and should not be construed as limiting of the scope of the invention.

Ball and Socket

Referring now to FIGS. 3–7, there is illustrated the general layout of a preferred embodiment of the invention. FIG. 3A depicts a sectional view showing a two axis optical beam steering apparatus 5 in the general form of a ball and socket assembly. It is comprised of a movable member 10 in the form of a spherical or ball portion having an outer bearing surface 11 supported in a fixed member 40 that includes a spherical raceway or socket 20 for forming a seat in which the movable member 10 is movably supported for rotation with respect thereto. The fixed member 40 in the present example comprises a thin flat plate but may have other configurations. As shown in FIG. 3A, the movable member 10 is received within the fixed member 40, which includes a first side 6 and opposing second side 8. The fixed member 40 is configured to provide free access to the movable member 10 on the first side 6 of the fixed member 40 and through the opening 72 in the second side 8 of the fixed member 40.

According to the preferred embodiment, the beam steerer 5 includes a mirror surface 30 for reflecting an optical beam therefrom and redirecting the beam to a desired target location by controlled movement of the surface 30. In other embodiments of the invention, the movable member may be used to control the movement of other surfaces, objects or elements, as will be detailed below. The mirror surface 30 may be either directly deposited onto, or attached onto, the movable member 10. In the preferred embodiment, the surface 30 comprises an equatorial plane of the spherical or ball member 10. Alternately, the mirror surface 30 may be formed on other planes of the spherical section, which may or may not be parallel with the equatorial plane.

Figure 3A:
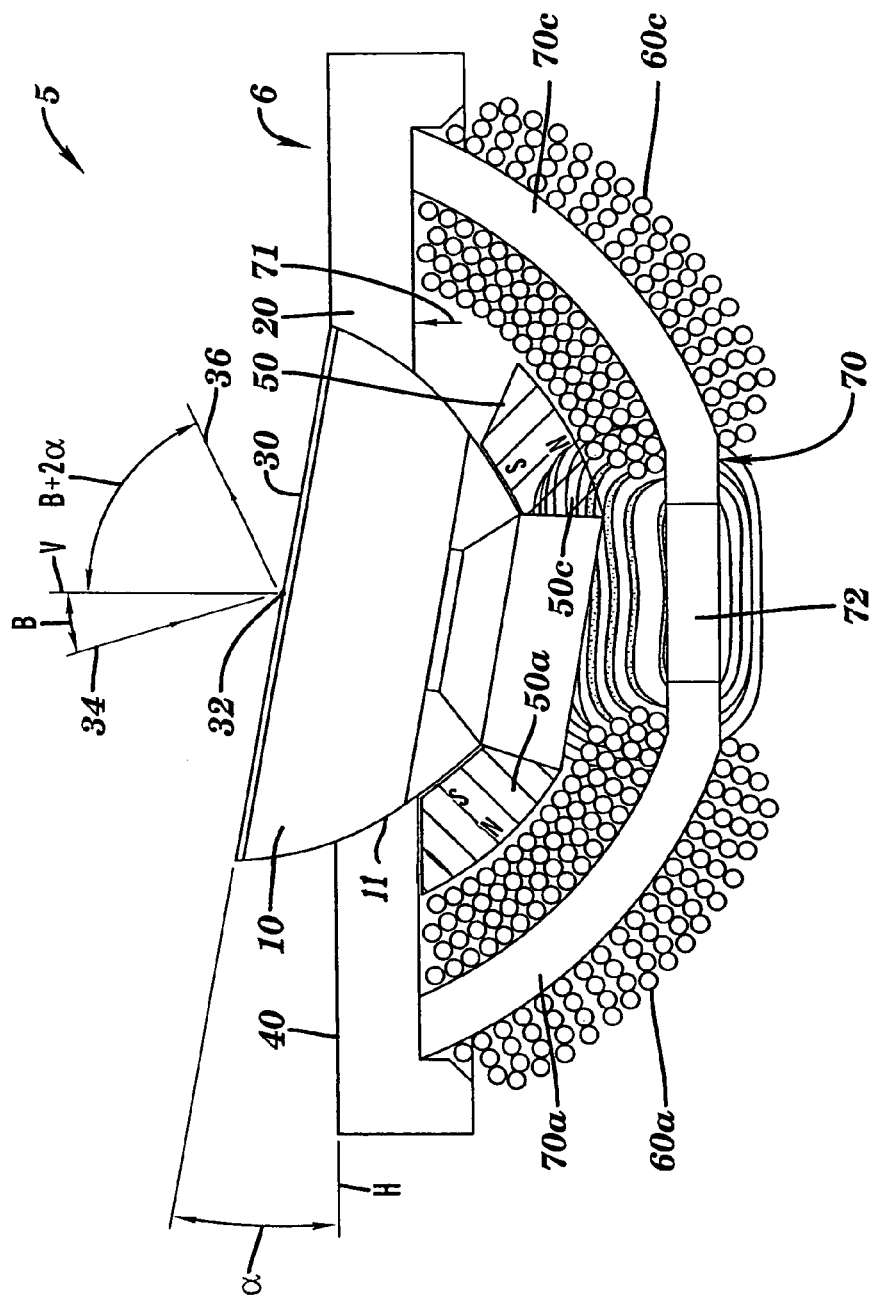
FIG. 3A is a single axis steering device.
Figure 3A:
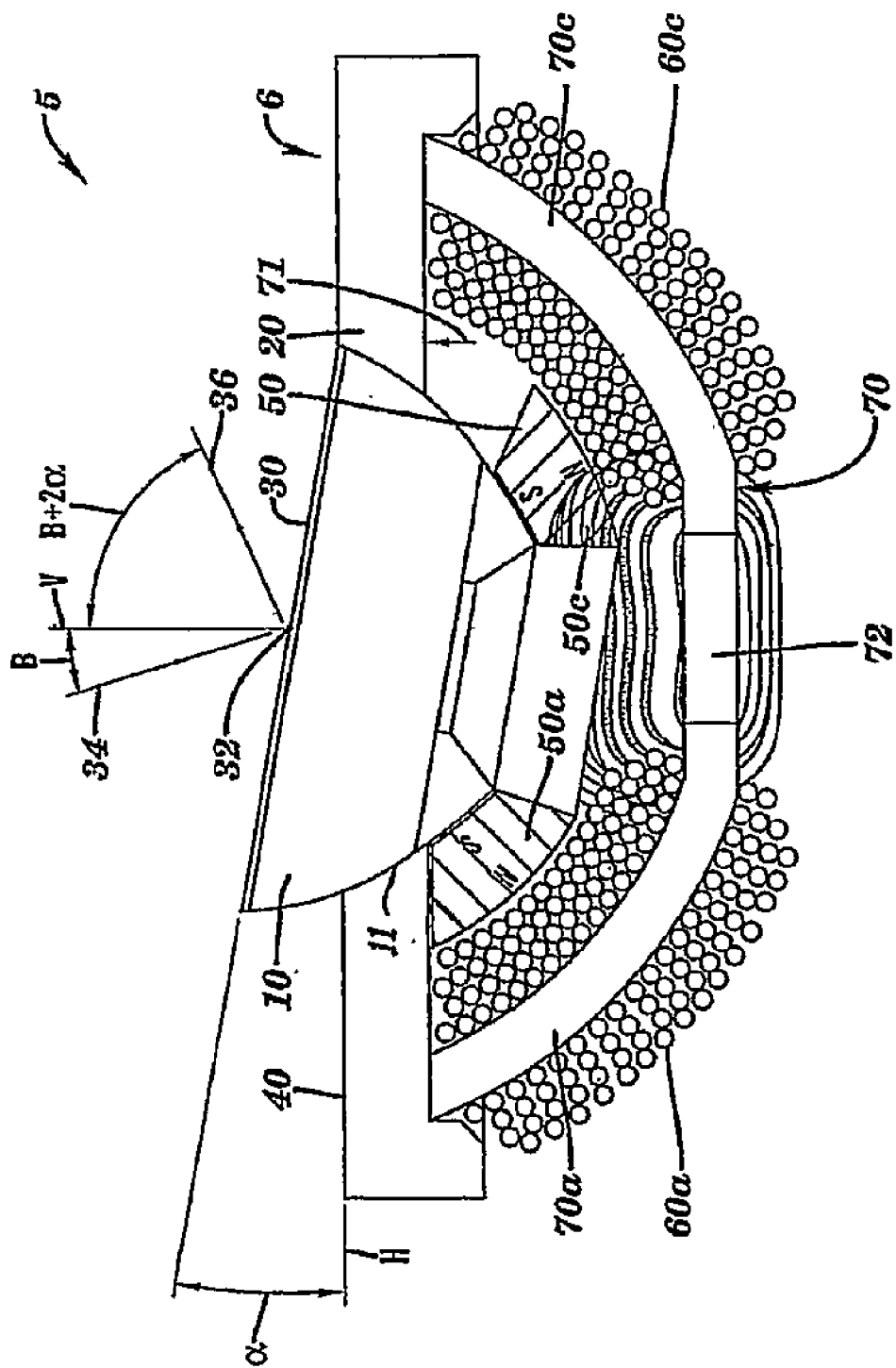
Figure 3B:
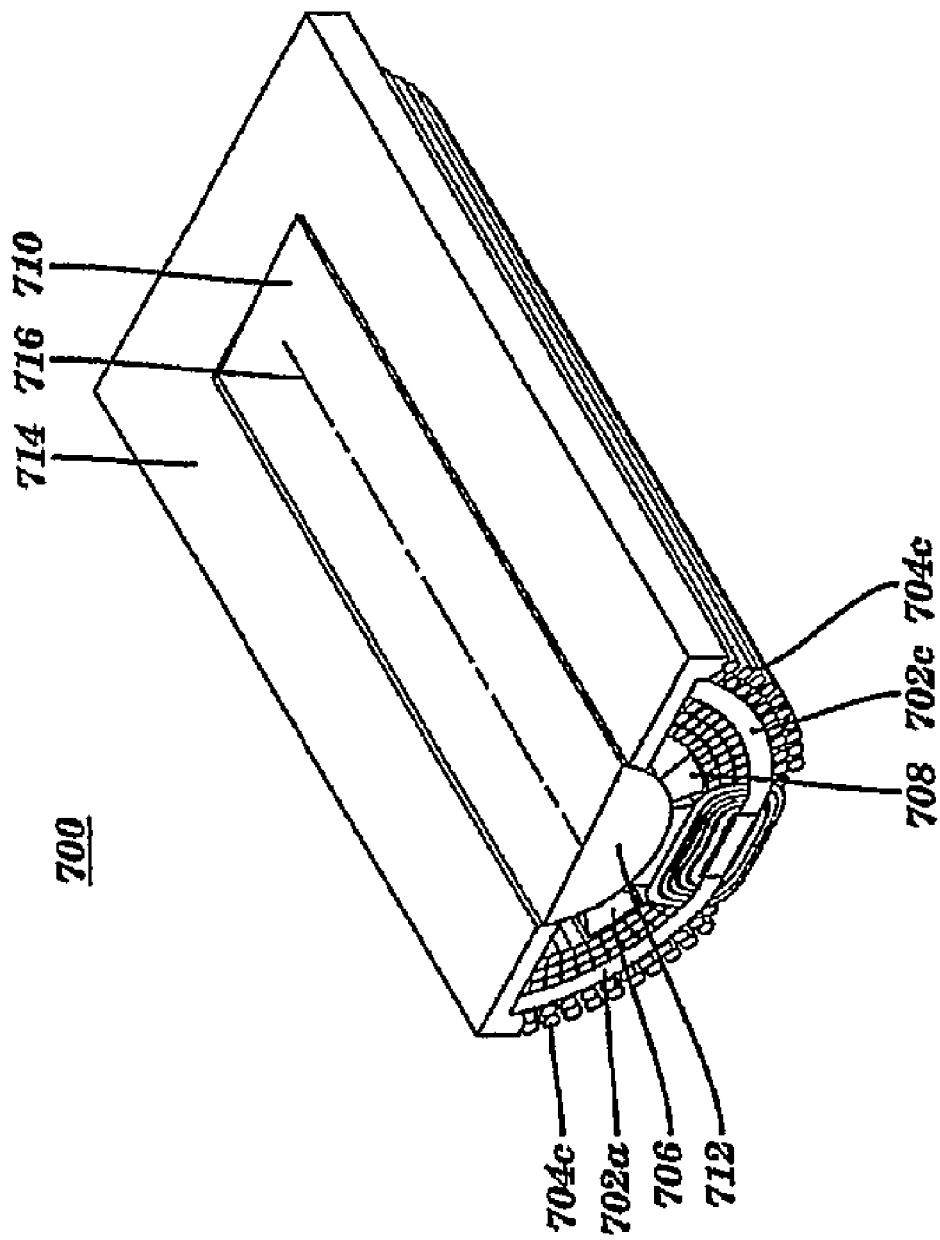
FIG. 3 is a cross section view of a preferred embodiment of the invention.
Figure 4:
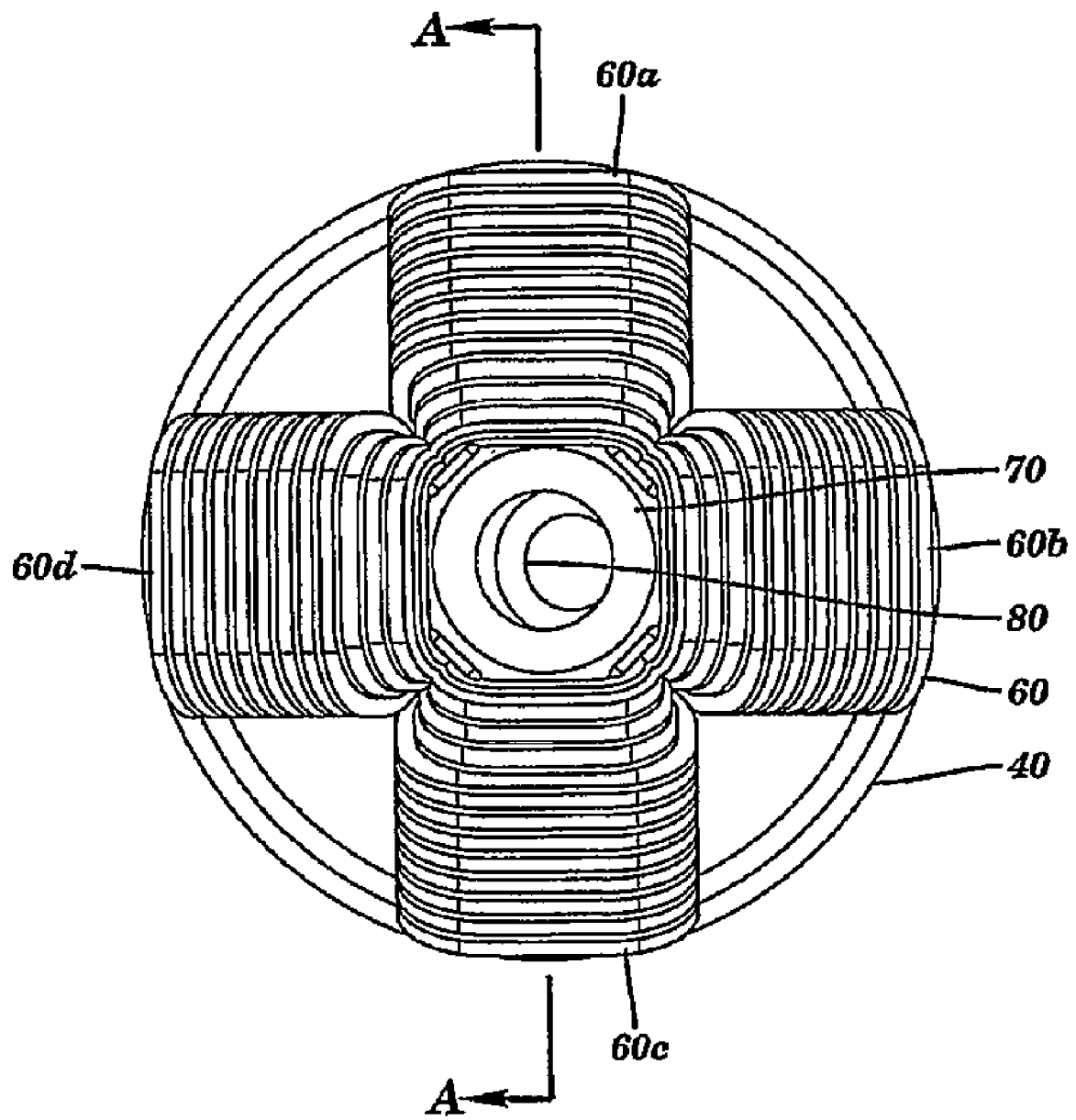
Figure 5:
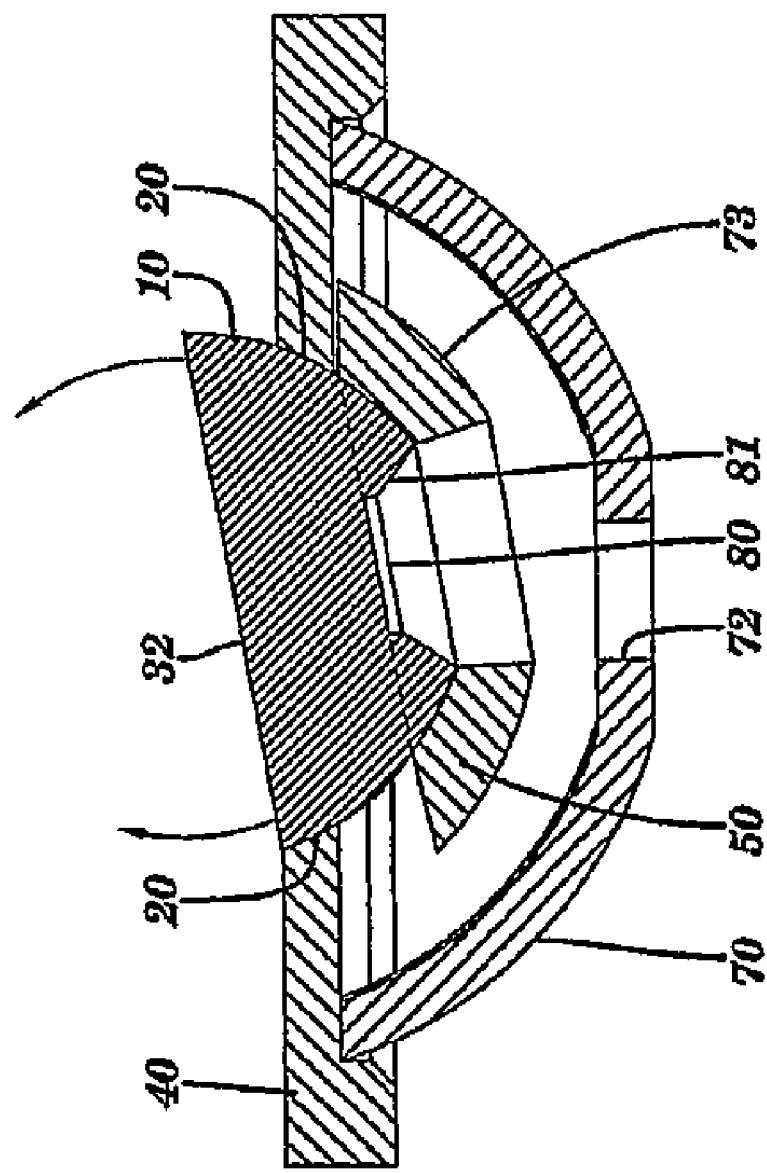
Figure 6:
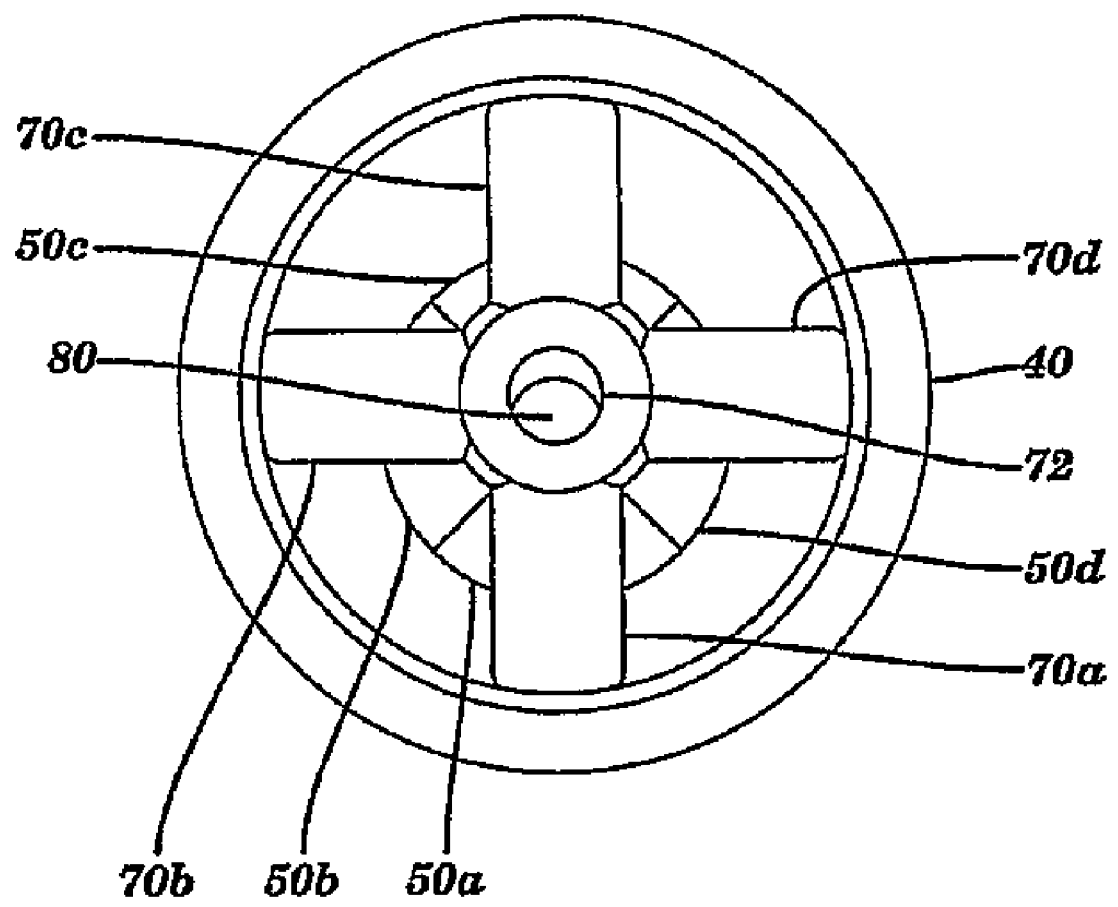

The sectional view of FIG. 3 is taken through a second equatorial plane of the spherical or ball member 10 that is perpendicular to the surface 30. A radial center 32 of the spherical or ball member 10 is shown on the surface 30 and represents an axis of rotation for the spherical or ball member 10. An optical beam or ray 34 incident on the mirror surface 30 at an angle $\beta$ with respect to, e.g. a vertical axis V, is reflected at a reflection angle of $\beta+2\alpha$ with respect to the vertical axis V, where $\alpha$ is the tilt angle of the surface 30 with respect to, e.g. a horizontal plane H. Accordingly, a reflected beam or ray 36 is deflected through an angle that is double the angle $\alpha$ moved by the surface 30. In the two-axis device, the mirror surface 30 has a second tilt angle in a plane perpendicular to the equatorial section shown in FIG. 3. The second tilt angle is not shown. Accordingly, an input ray 34 may be reflected at a reflection angle that may be any angle contained with a solid cone of angle centered on the rotation axis 32.

Magnetic Ring

Integral to or attached to of the movable member 10 on the second side 8 thereof is a magnetic element 50 comprising a magnetic ring. The magnetic ring 50 is formed and attached to the ball 10 in a manner providing clearance between the ring 50 and the fixed member 40 for allowing the ball 10 to be rotated about the axis 32 through the angle $\alpha$ and a perpendicular tilt angle, not shown. Magnet ring 50 is made up of four magnet portions 50 a–d, an opposing pair of which, 50a and 50c are shown in the section view of FIG. 3. Each magnetic section comprises opposing north and south magnetic poles, labeled N and S respectively in FIG. 3 and 7a–7d, such that a magnetic flux passes through each magnet section from one pole to the opposing pole. According to the invention, opposing magnet portions, e.g. 50a and 50c have a south magnetic pole facing the ball 10 and a north magnetic pole facing away from the ball 10. Alternately, adjacent magnet section have oppositely oriented poles such that in the present example, magnet portions 50b and 50d have a north magnetic pole facing the ball 10 and a south magnetic pole facing away from the ball 10. The ring 50 may be assembled from substantially same sized magnet portions each forming a quarter portion of the ring 50 or the ring 50 may be formed as a single monolithic magnet. As will be detailed further below, the magnetic ring 50 may be formed integral with the ball 10.

Stator

Figure 5:
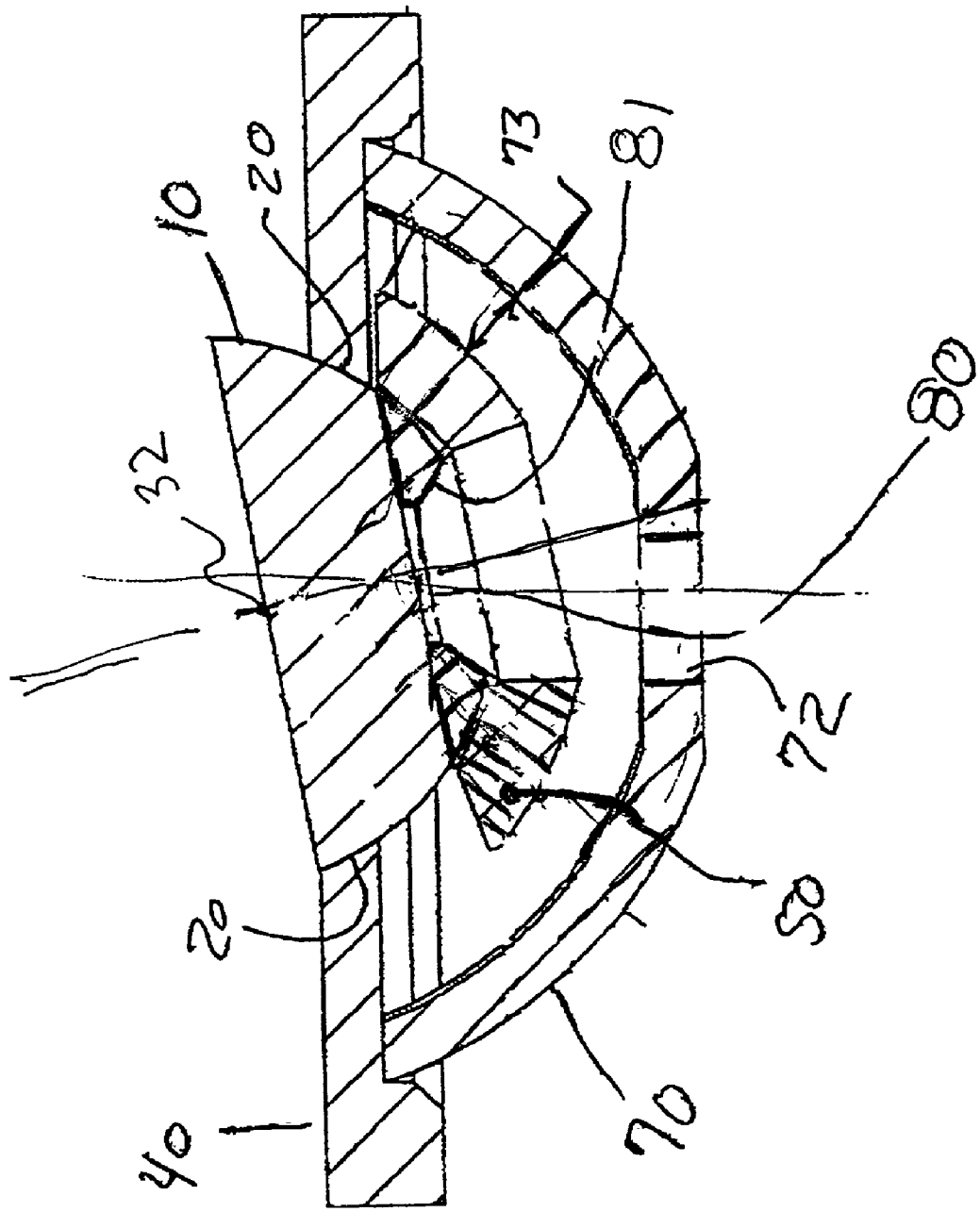
FIG. 5 is a partial cross section view of the embodiment of FIG. 3, the coils being omitted for clarity.
Figure 6:
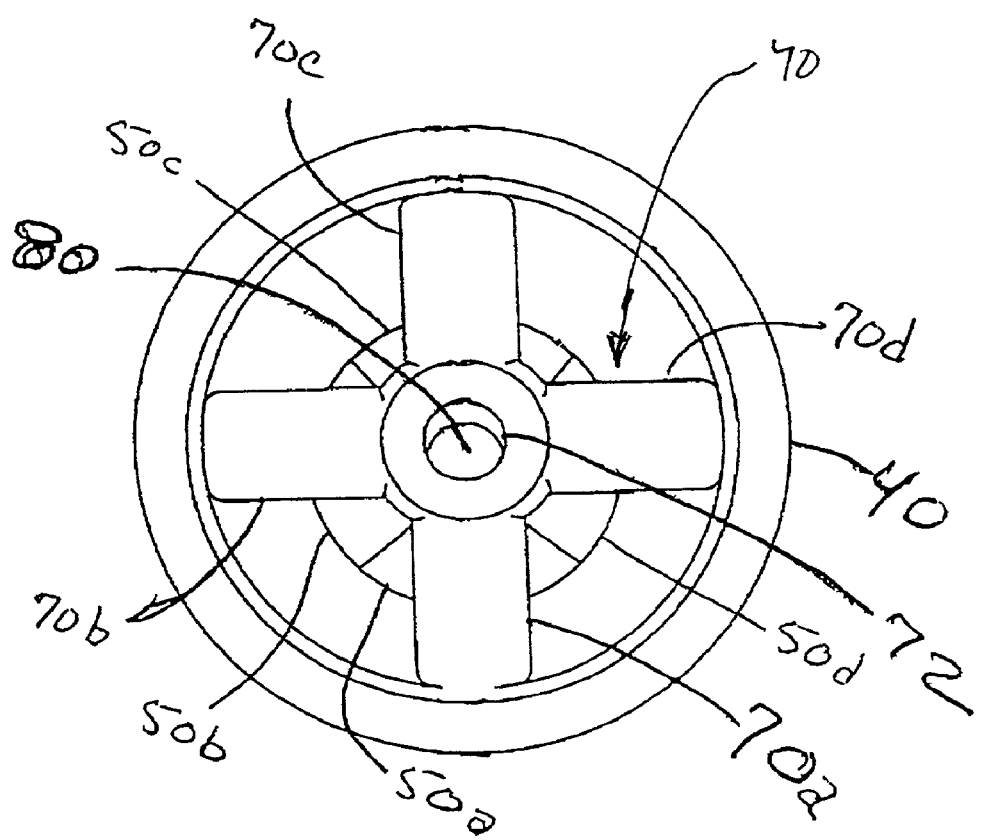
FIG. 6 is a lower end view of the structure of FIG. 5.

The second side 8 of the steering apparatus 5 is shown in FIG. 6. A fixedly supported stator element, referred to generally by the reference numeral 70 is provided proximate to the magnetic element 50 such that an air gap is provided between the magnetic element 50 and the stator element 70. The stator element 70 comprises a magnetically permeable material and from one element of a magnetic circuit. The stator element 70 of FIG. 6 further comprises a cruciform element having four stator arms 70a–d corresponding to each of the four magnet ring portions 50a–50d. As can best be seen in FIG. 5, a uniform thickness air gap 73 is formed between each stator arm 70a–d and each magnet ring portions 50a–d by forming the stator arms substantially about a spherical radius centered with respect to the rotation axis 32, of the ball 10. As also shown in FIG. 5, the stator 70 is fixedly attached to the fixed member 40. The stator element 70 is shown in a flat condition in FIG. 8 for clarity.

In accordance with the invention, a magnetic attraction force, or traction force, is generated between the magnetically permeable stator element 70 and the magnetic element 50. The traction force, which acts across the air gap 73, tends to draw the movable member 10 toward the fixed member 40, such that in the preferred embodiment, the spherical ball 10 is drawing into a seated arrangement with the spherical bearing race 20. With sufficient magnetic traction force, and with sufficient friction in the ball bearing seat interface, the ball 10 can be firmly held in a fixed orientation by the magnetic traction force for an indefinite period.

Stator Coils

Figure 4:
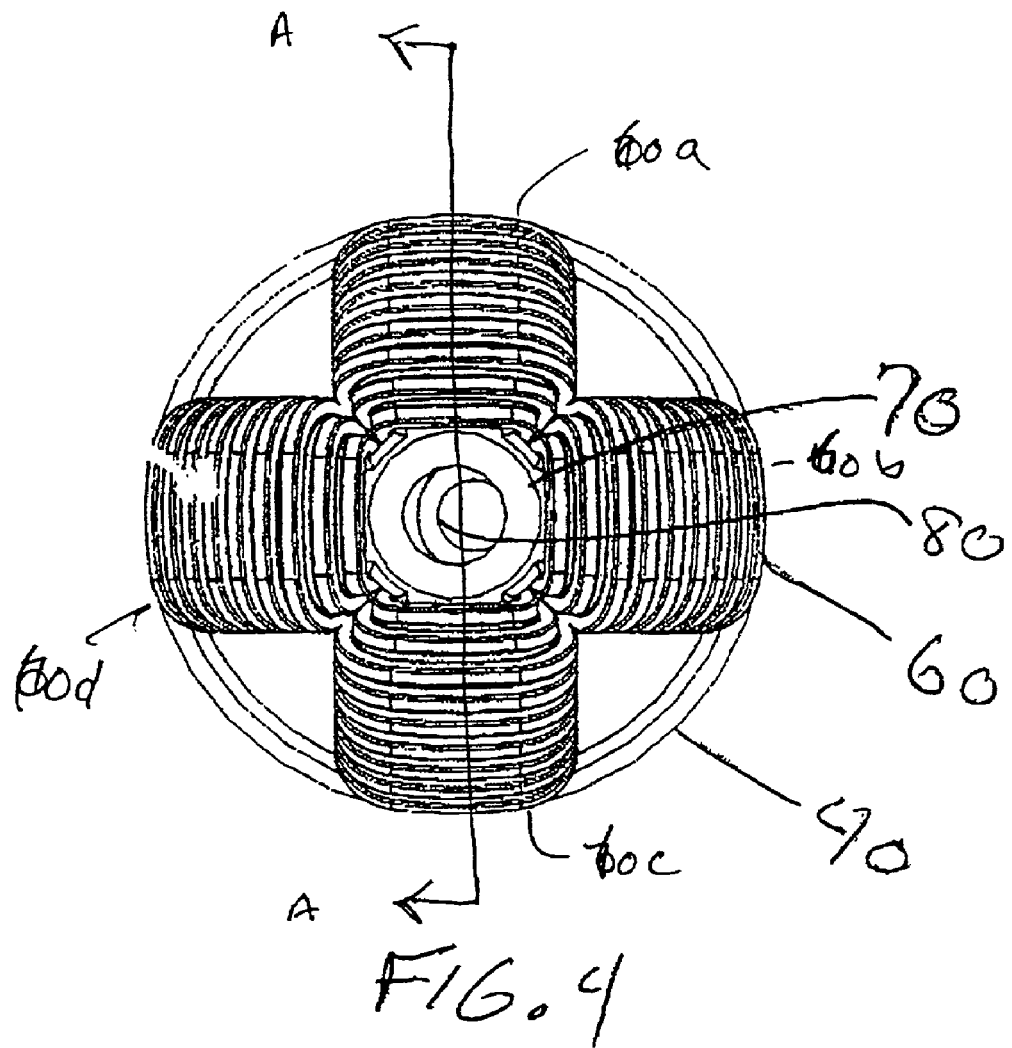
FIG. 4 is an second side view of the embodiment of FIG. 3.
Figure 8:
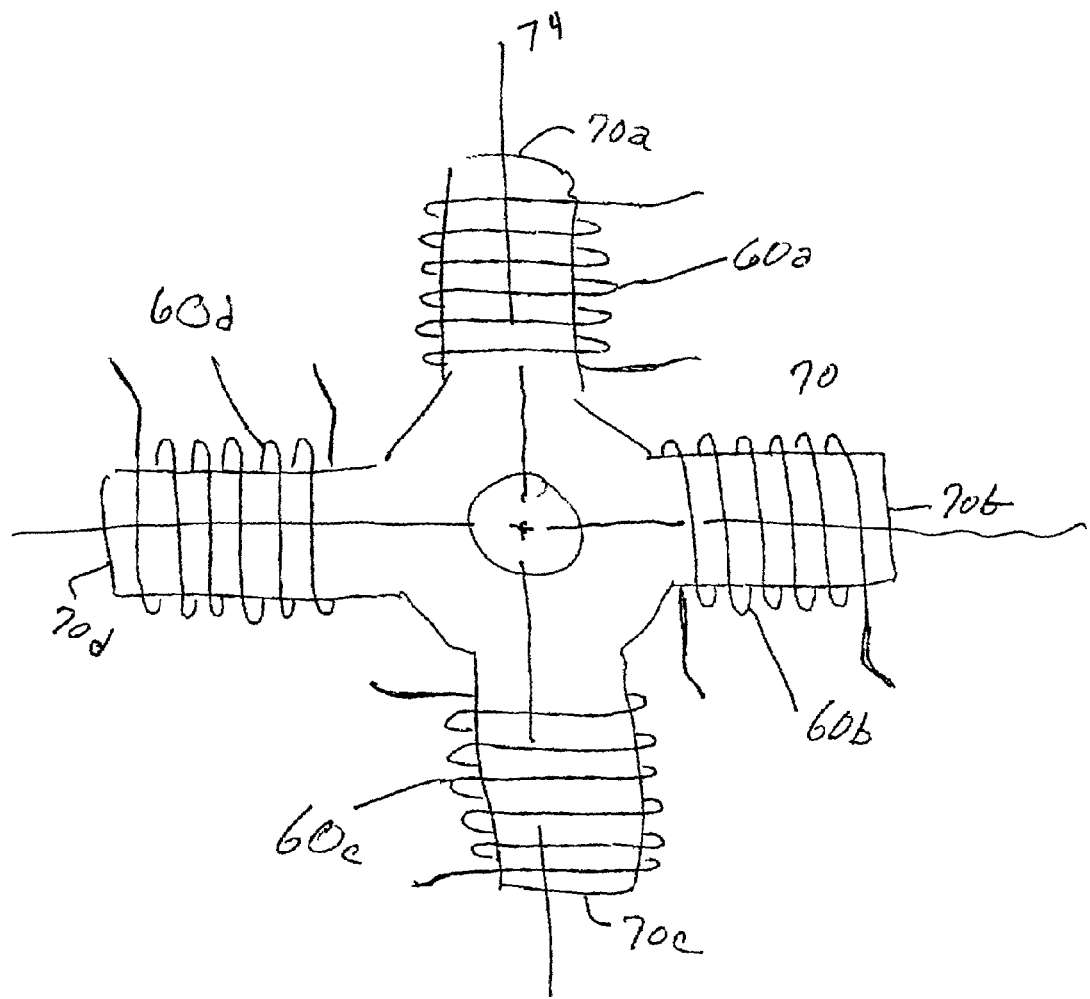
FIG. 8 is a diagrammatic plane view of the lower end of the stator and coil windings of the embodiment of FIG. 3.

The stator 70 further comprises stator current coils 60*a–d*, wound onto respective stator arms 70*a–d*, shown from side 8 in FIG. 4 and shown flat in FIG. 8. As shown in the cross-sectional FIG. 3, opposing stator arms 70*a* and 70*c* and associated stator coils 60*a* and 60*c* are formed to substantially conform to the spherical shape of the ball 10 at a substantially uniform radius from the radial center 32 with distal ends of each stator arm 70*a* and 70*c* fitted into a recess 71 on an underside of the plate 40. Each stator arm 70*a–d* is fixedly to the fixed element or plate 40 by bonding, soldering or by any appropriate attachment method. Each stator coil 60*a–d* is wound to substantially perpendicularly intersect magnetic flux lines in the air gap 73, as will be further described below. As is shown in FIG. 8 the coils are wound perpendicularly to a longitudinal axis 74 of the stator arms 70*a–d*.

According to the invention, when an electrical current is applied to any one of stator coils e.g. coil 60*a*, a magnetic force is induced in the stator along an axis perpendicular to the coil windings. Accordingly, a current coil 60*a* induces a magnetic force having a force direction along a longitudinal axis of stator arm 70*a*. Such a force when acting on the magnet portion 50*a* can be used to rotated the movable member 10. A current in a first direction might cause a clockwise force thereby proving a clockwise rotation of the ball 10, e.g. through angle α, and a current in the opposite direction creates a counter-clockwise magnetic force for rotating the ball 10 counter-clockwise. If a substantially similar currents having the same amplitude and direction are applied to two opposing coils, e.g. 60*a* and 60*c*, a magnetic force is induced in each of the stator arms 70*a* and 70*c* thereby doubling the magnetic force for rotating the ball 10.

According to the present invention, all four coils 60*a, b, c* and *d* can be excited with independent currents in both direction and magnitude by one or more current drive circuits. However, in a preferred embodiment, opposing current coils may be connected to the same driver either in series or in parallel such that opposing coils are simultaneously driven by the same current source. The magnetic force generated along a longitudinal axis of each stator arm 70*a–*70*d* can be used to rotate the ball 10 within the seat 20 in a controlled manner. By virtue of having four magnet sections, four stator arms and four coils, the ball 10 may be rotated in two mutually perpendicular axes, thereby tilting the mirror surface 30 in two mutually perpendicular axes as well.

By controlling the currents in each of the four coils, three fundamental conditions can then result. In a first condition, current drivers may provide a clamping force across the air gap 73. The clamping force is applied by driving all four coils to provide a force substantially toward a center aperture 72 of the stator element 70 such that the magnetic element 50 is attracted toward the aperture 72 and the attached movable member 10 is draw by a greater force into the bearing seat 20. A clamping force is also provided when little or no current is applied to the coils 60 because as stated above, a traction force between the magnetic element 50 and the stator 70 is provided even without current in the coils 60.

In a second condition, levitation current is applied to the coils 60 that generate an induced magnetic levitation force in the stator 70 that substantially directly opposes the clamping force between the magnetic element 50 and the stator 70. The levitation force may have sufficient magnitude to actually lift the movable member 10 for providing a clearance between the ball 10 and the bearing seat 20 or the levitation force may just reduce the clamping force between the magnetic element 50 and the stator 70.

In a third condition, a torque current is applied to the coils 60 for generating induced torque forces in the stator 70. The torque forces are substantially directed along the longitudinal axes 74 of the stator arms 70*a–d* and magnetic forces are imparted to the magnetic element 50 for rotating the movable member 10. As described above, two mutually perpendicular rotations may be achieved by driving mutually perpendicular coils with an appropriate current. Of course any even number of opposing magnet sections, stator arms and stator coils may be provided to rotate the movable element about a separate axis corresponding to each opposing pair of magnets, stator arms and coils.

Flux Paths

Figure 9:
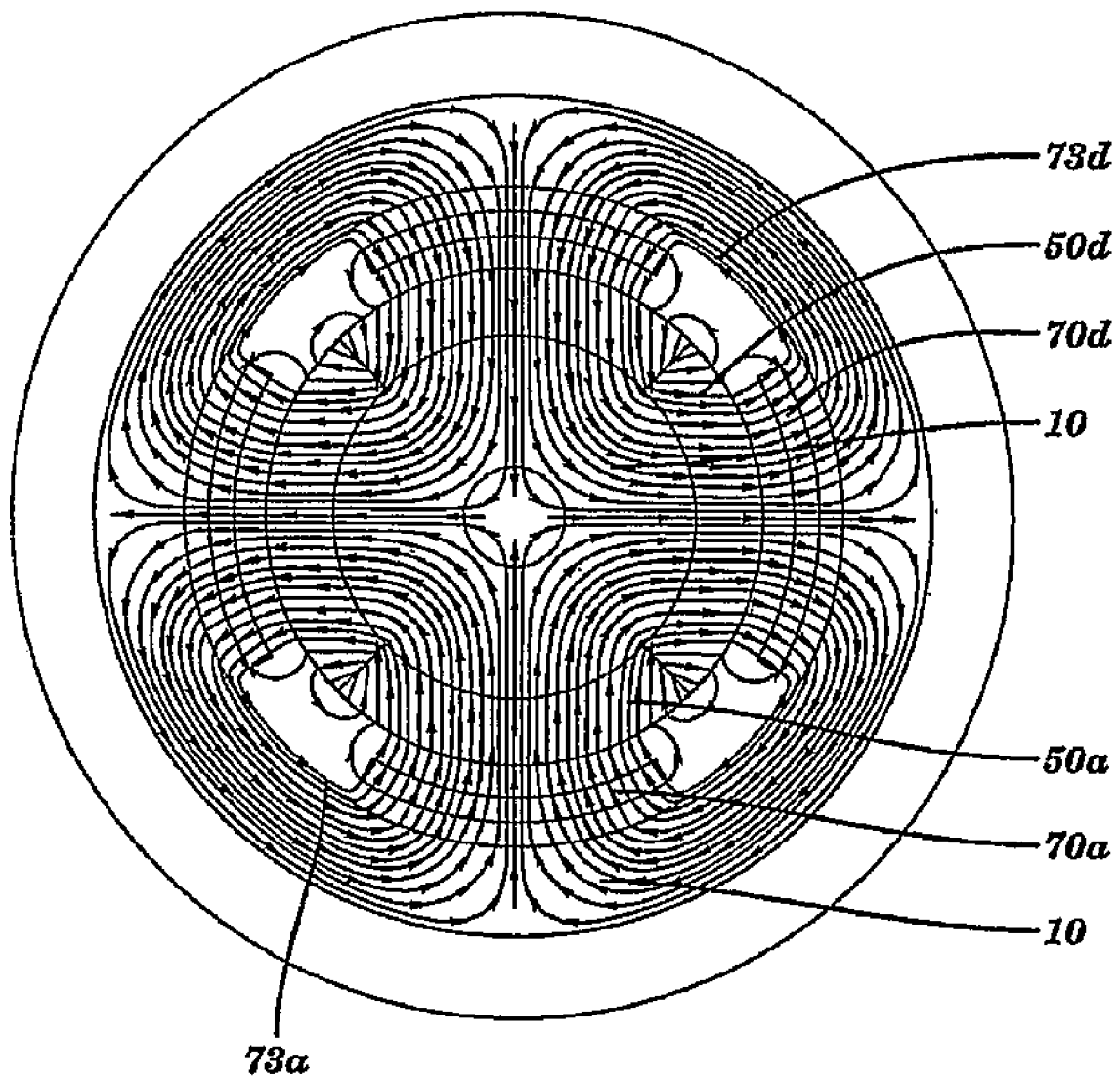
FIG. 9 is a schematic of the flux circuit of the embodiment of FIG. 3.

Referring to FIG. 9, four magnetic circuits formed in the two-axis tilt device are shown schematically. A first flux path passes between the north and south poles of magnet portion, 50*a*, through the ball 10 between the south and north poles of the adjacent magnet portion 50*d* across a first air gap 73*d* and into stator arm 70*d*. The magnetic flux lines then pass through the magnetically permeable stator element 70 from the arm 70*d* to the adjacent stator arm 70*a*, across a second air gap 73*a* and return to the magnet portion 50*a*. Each magnetic circuit is configured to create concentrated lines of magnetic flux radially across each air gaps 73*a*–73*d* such that the magnet portions 50*a*–50*d* are attracted to the stator element 70 which is fixedly attached to the fixed member 40. A tractive force between the magnet portions and the stator across the air gap draws the ball 10 into the spherical raceway 20. Since the movable member 10 is included in the magnetic circuit, the material of the movable member 10 will be beneficially magnetically permeable. Alternatively, the movable member 10 may include a magnetically permeable path, passing there through, which may be a separate element associated the movable member 10.

Figure 7B:
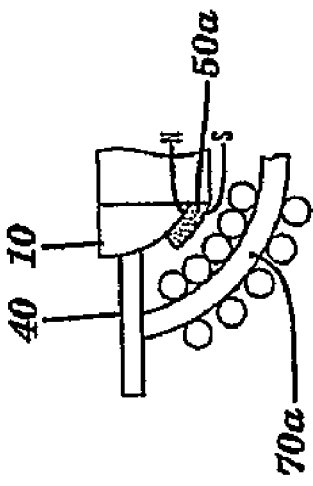
FIGS. 7A, B, C, and D are partial cross section views of embodiments with different magnet ring configurations.
Figure 7A:
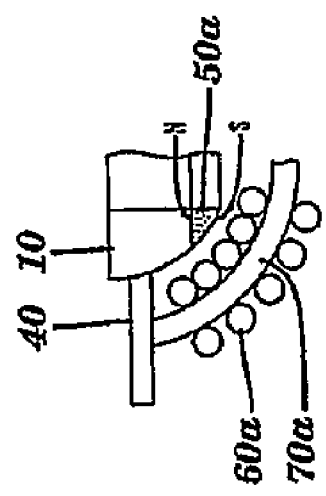
Figure 7D:
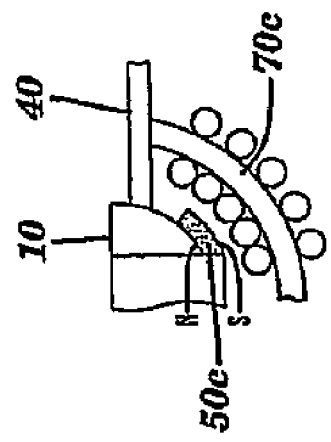
Figure 7C:
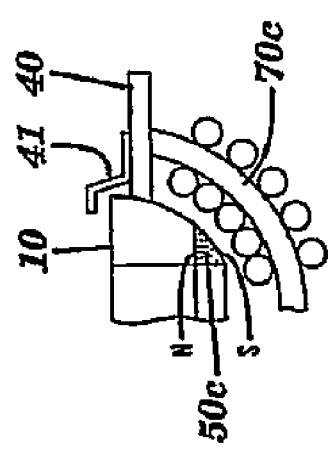
Figure 8:
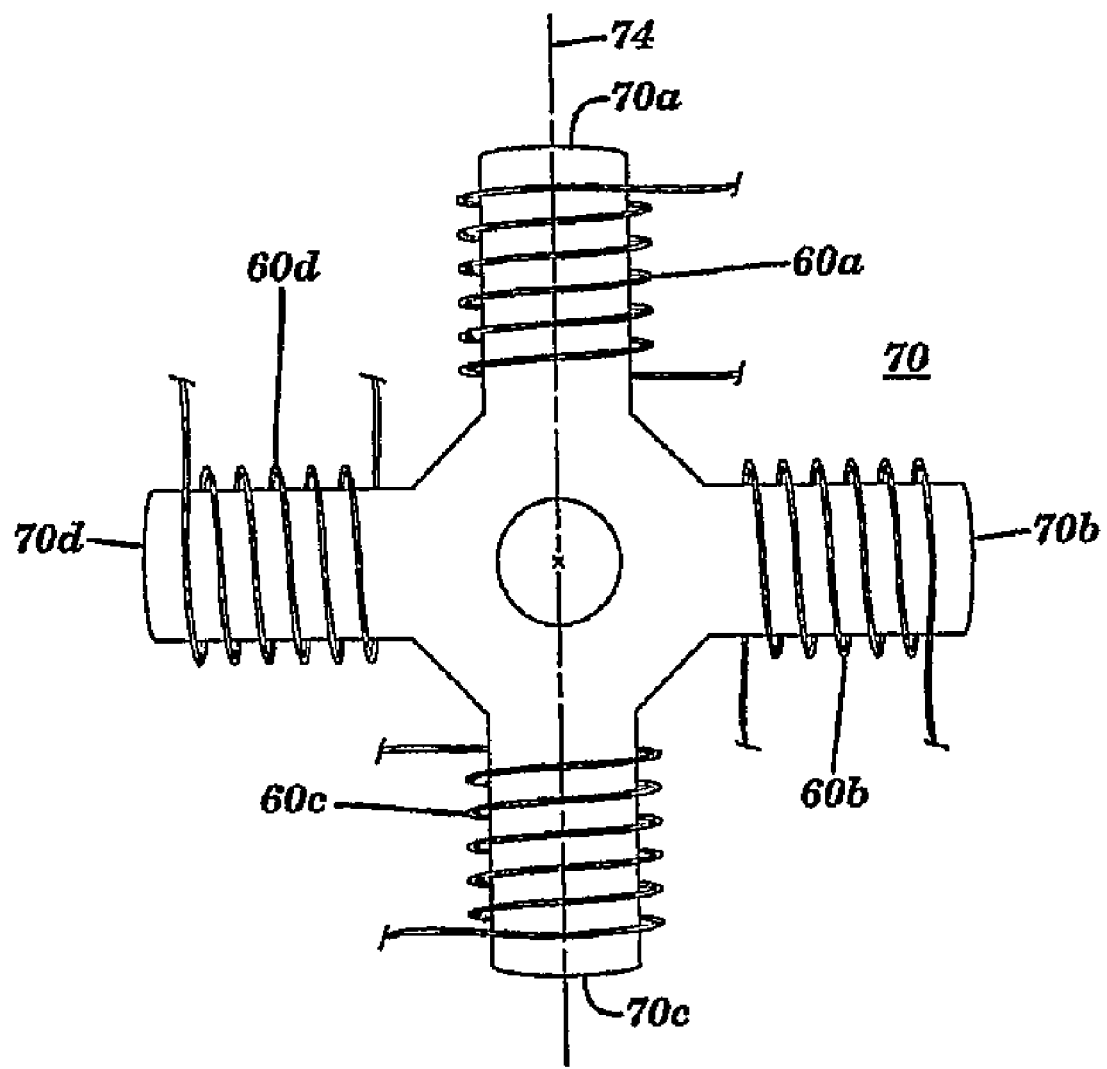

Those skilled in the art will recognize that variations of the magnet configuration offer varied manufacturing solutions, some examples of which are shown in FIGS. 7*a–d*. For example the magnet portions 50*a–d* can be integral with the ball geometry as shown in FIGS. 7*a* and 7*c*. In these configurations, the ball 10 may be removable from the fixed member 40 from the first side 6 without removing the magnetic element 50. This configuration is convenient if it is desirable to periodically replace the movable member 10 in the event of a damaged mirror or the like. A removable or permanent retaining collars 41, as shown in partial cross section in FIG. 7*c*. It may be added over ball 10, attached to the first side 6 of plate 40 to insure that ball 10 does not unintentionally escape from its seat. In other examples, the magnetic element 50 may be formed to extend outside the spherical form of the ball 10 as shown in FIGS. 7*b* and 7*d*. In this configuration, the ball 10 cannot be removed from the fixed member 40 without removing the magnetic element 50. Accordingly, the magnet element 50 may further provide a retaining function for holding the ball in place in the event that a jarring shock for might cause the ball to dislodge from the bearing seat 20. In addition, the protruding edges of magnet ring 50 can also serve as a limit stop against the underside of plate 40 for limiting the tilt angles of the surface 30.

FIGS. 7*a* and 7*c* further illustrate magnet configured with vertical magnetic pole orientations, while FIGS. 7*b* and 7*d* illustrate magnet configurations with radial magnetic pole orientations. Any of the configurations may be used, however, the configuration shown in FIG. 7*d* is the preferred embodiment because it offers the most efficient use of its magnetic volume while providing radial magnetic lines across the air gap 73. Also, as best shown in FIG. 5, a magnetically permeable back iron element 81 may be formed integral with an otherwise non-magnetically permeable ball member 10 to provide a magnetic flux path as shown in FIG. 9. Of course numerous other magnetic circuit elements and flux paths are usable without deviation from the scope of the present invention.

Force Examples

Figure 10:
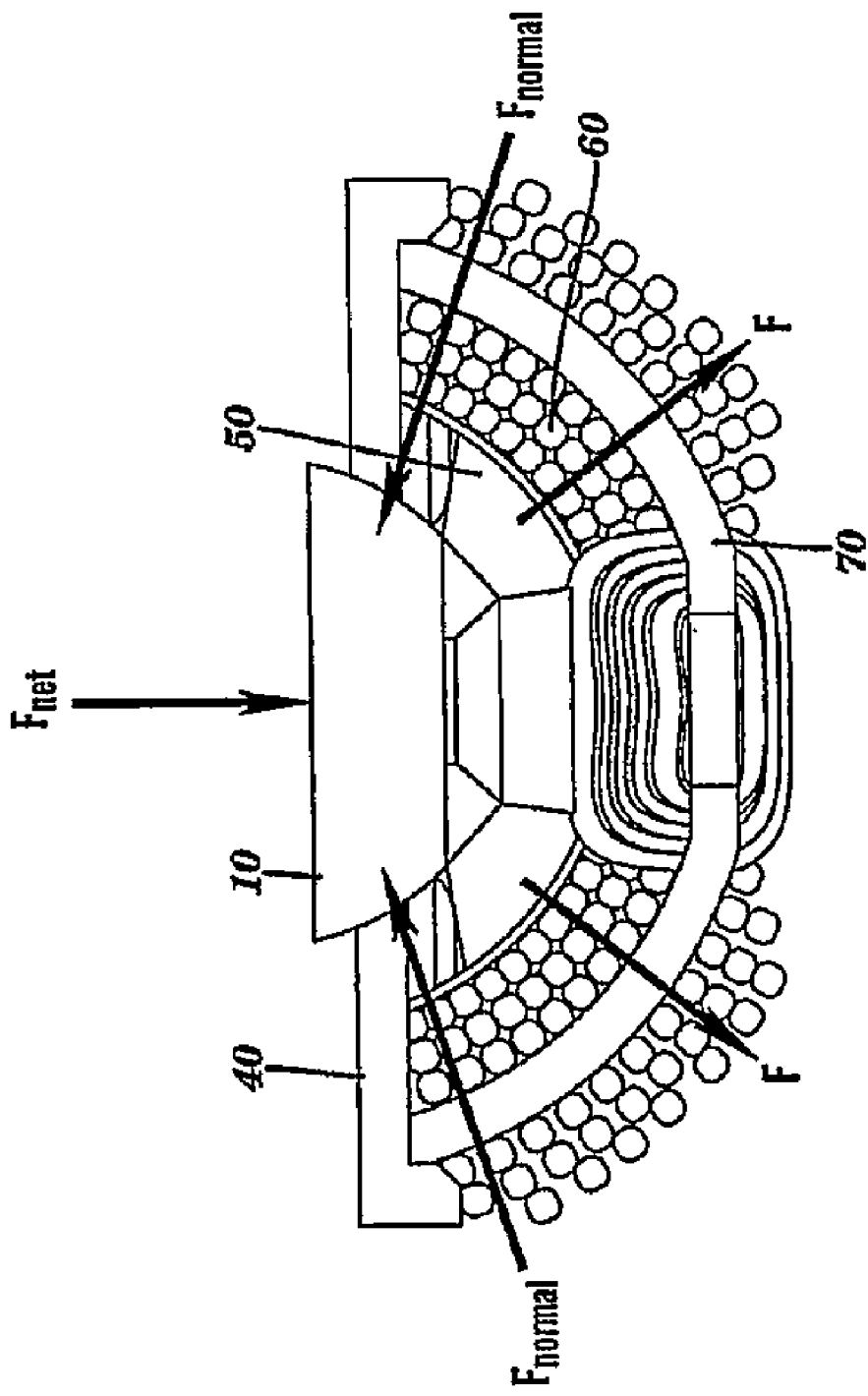
FIG. 10 is the cross section of FIG. 3, illustrating the magnetic forces of the embodiment with force diagrams.
Figure 11:
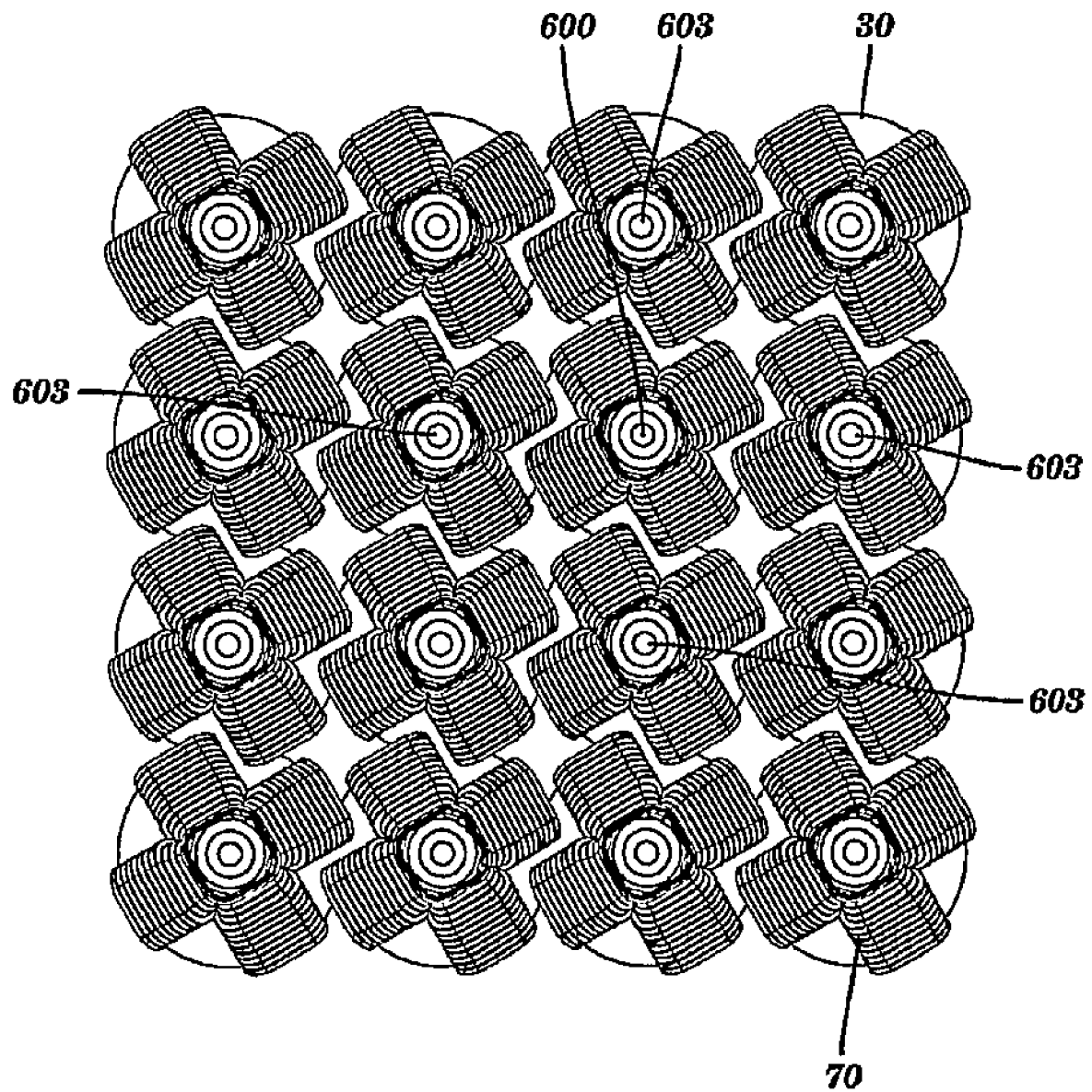
Figure 13:
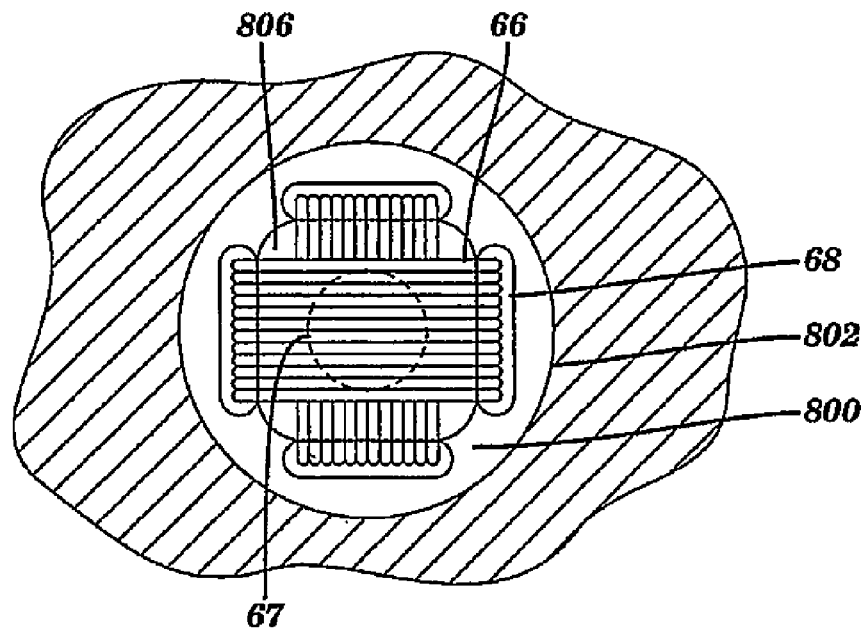
Figure 12:
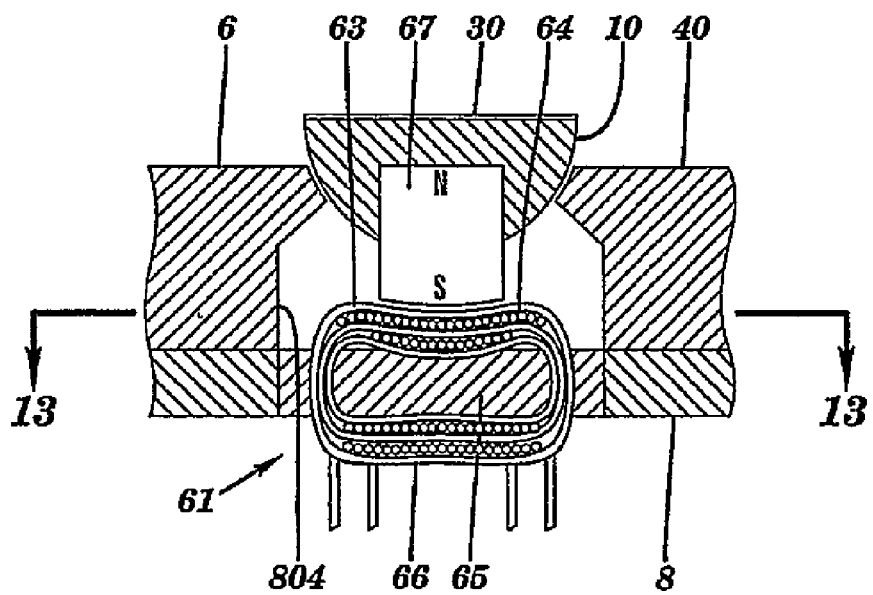
Figure 14:
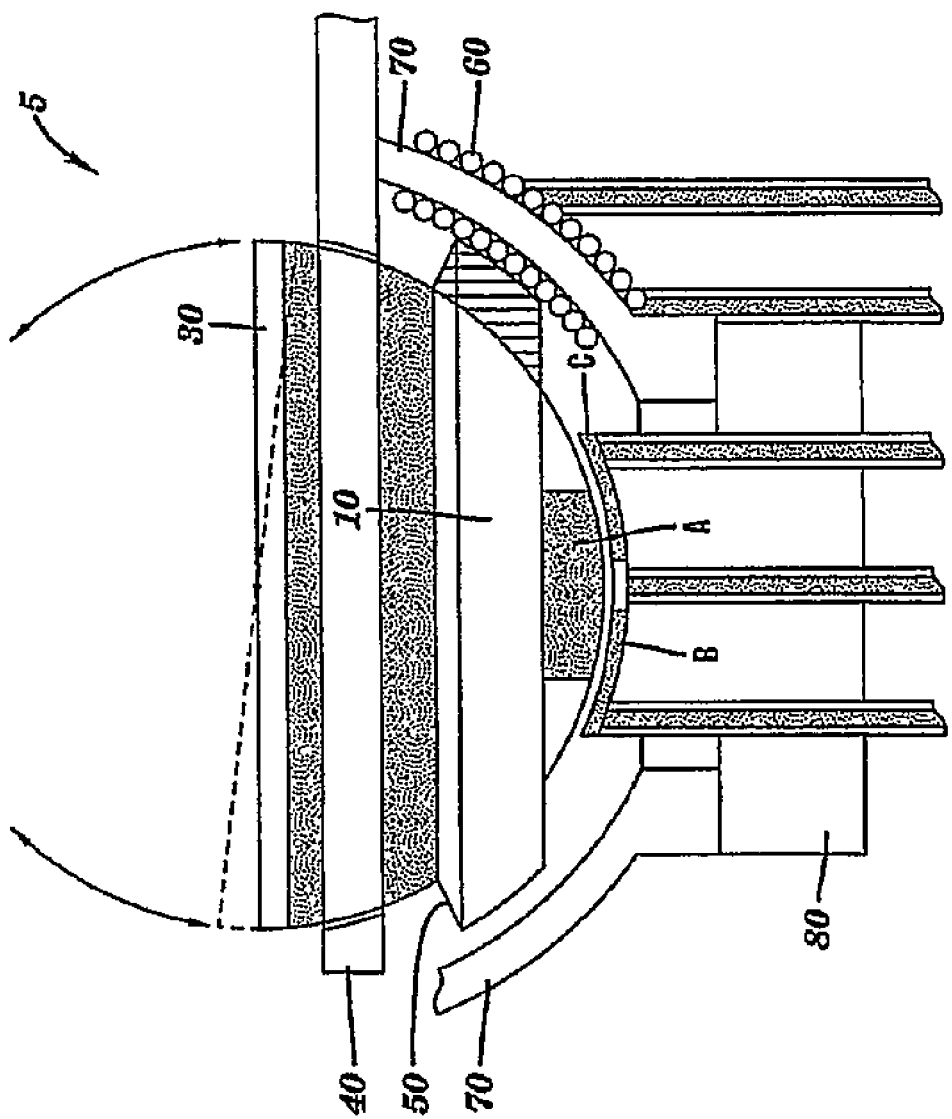
Figure 15:
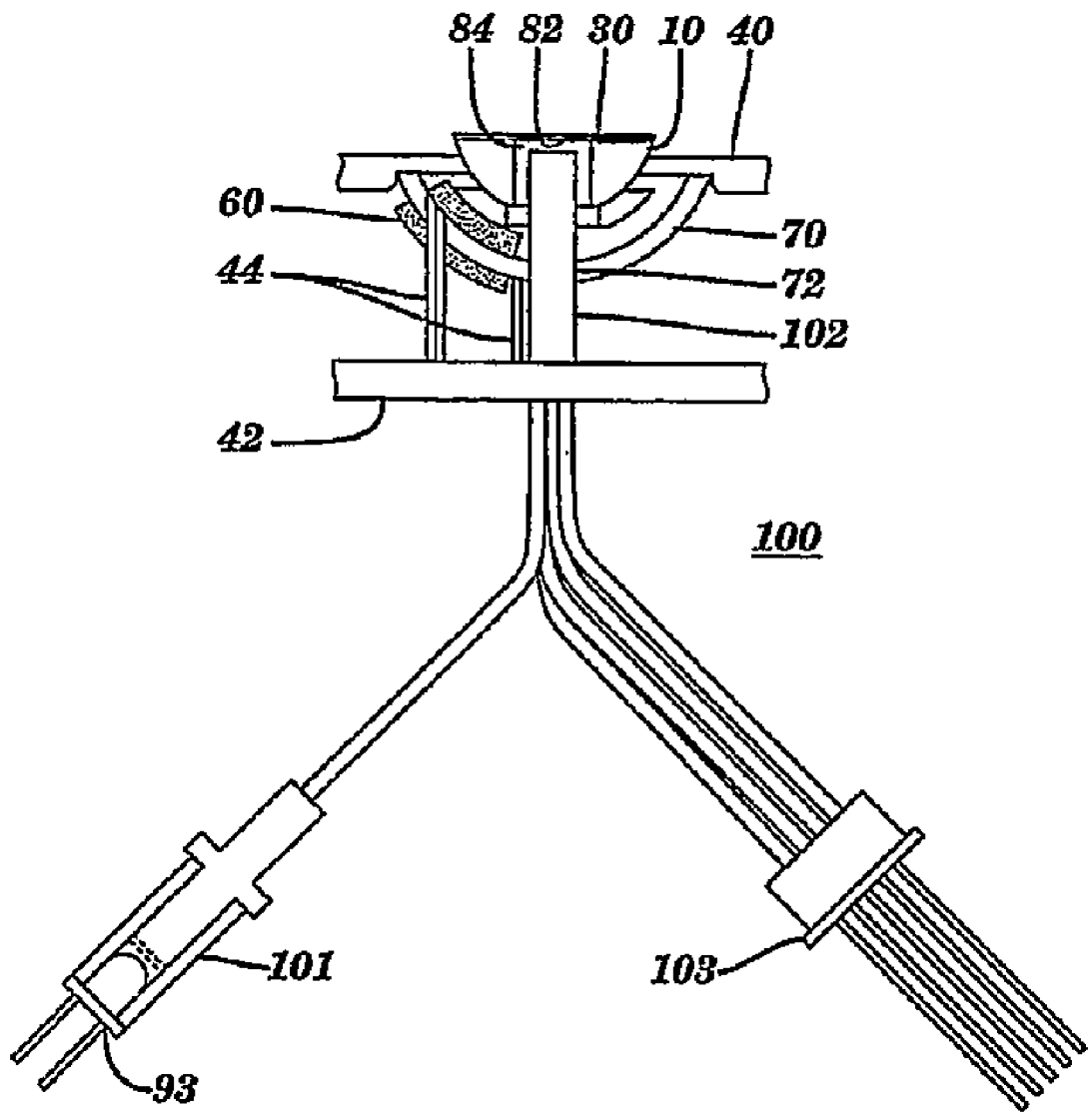
Figure 17:
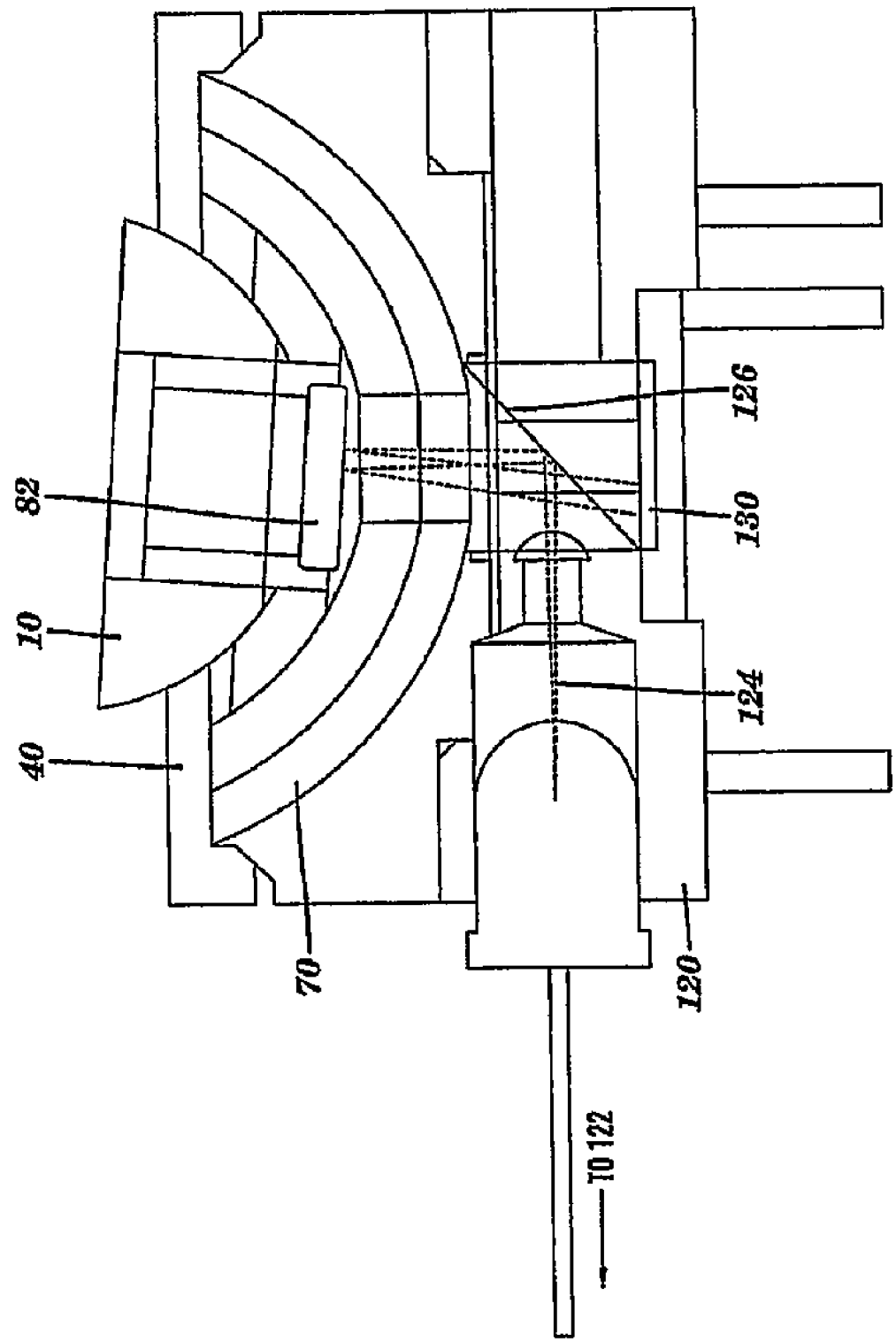
Figure 18:
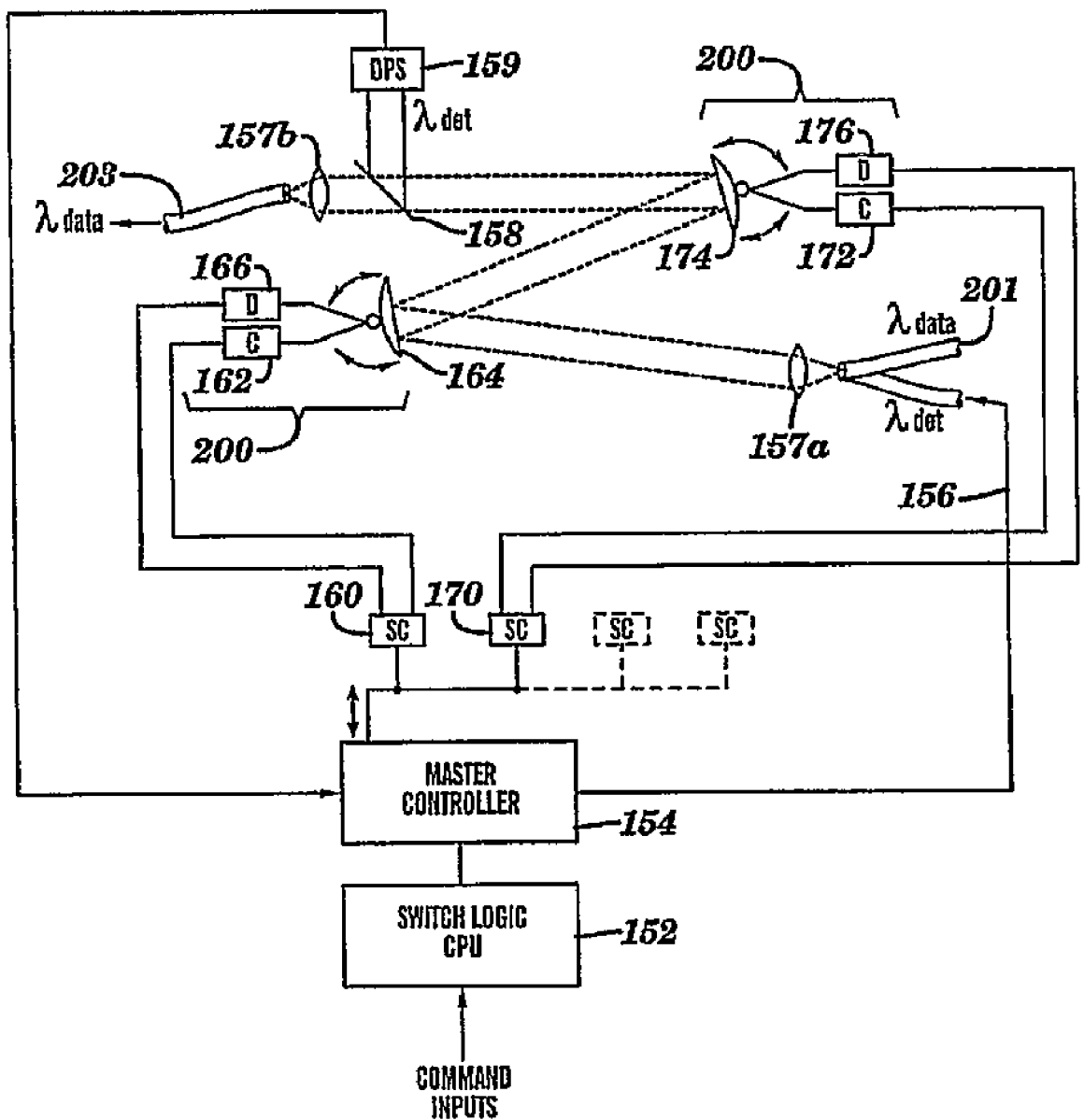
Figure 19:
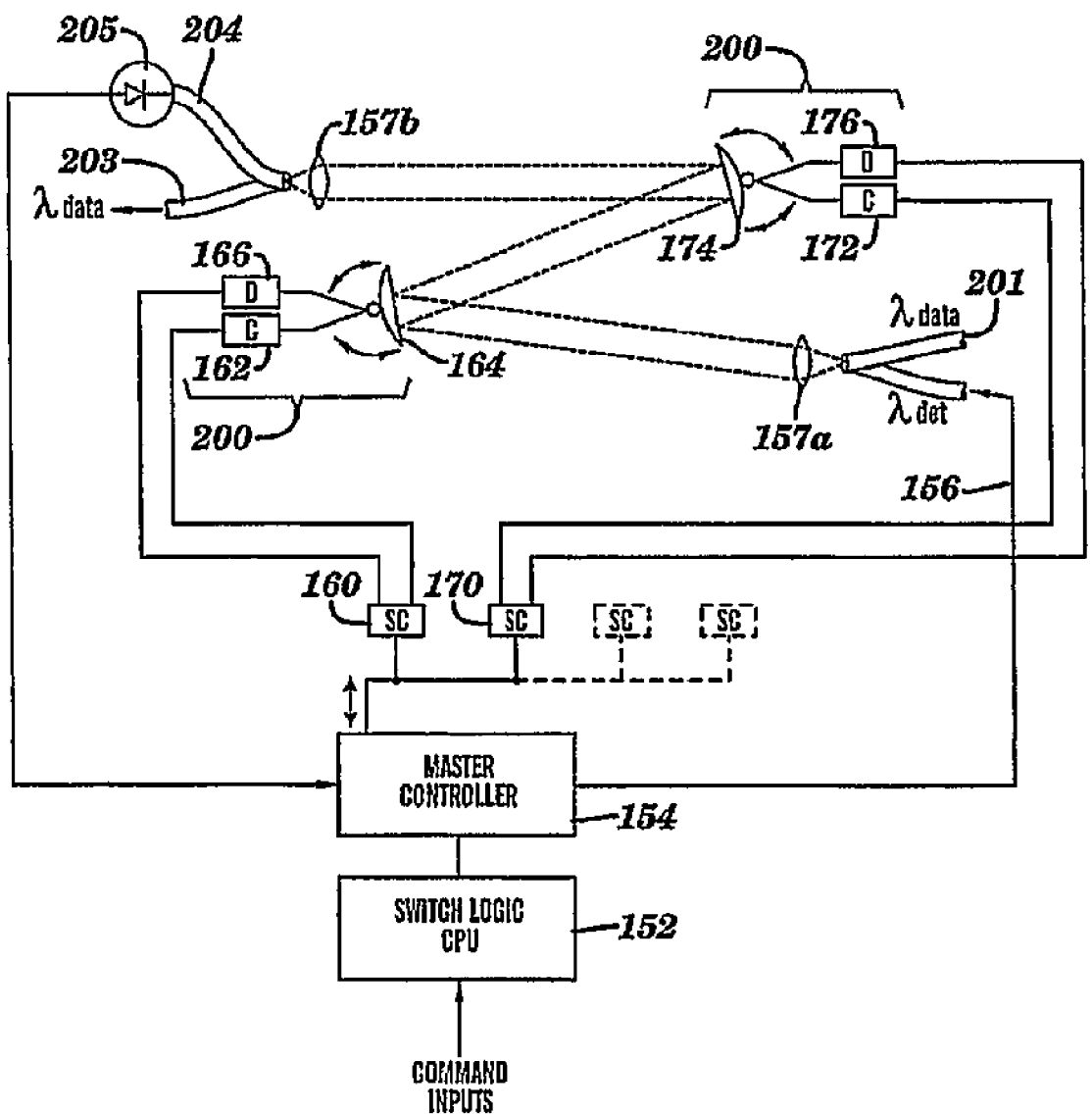
Figure 20:
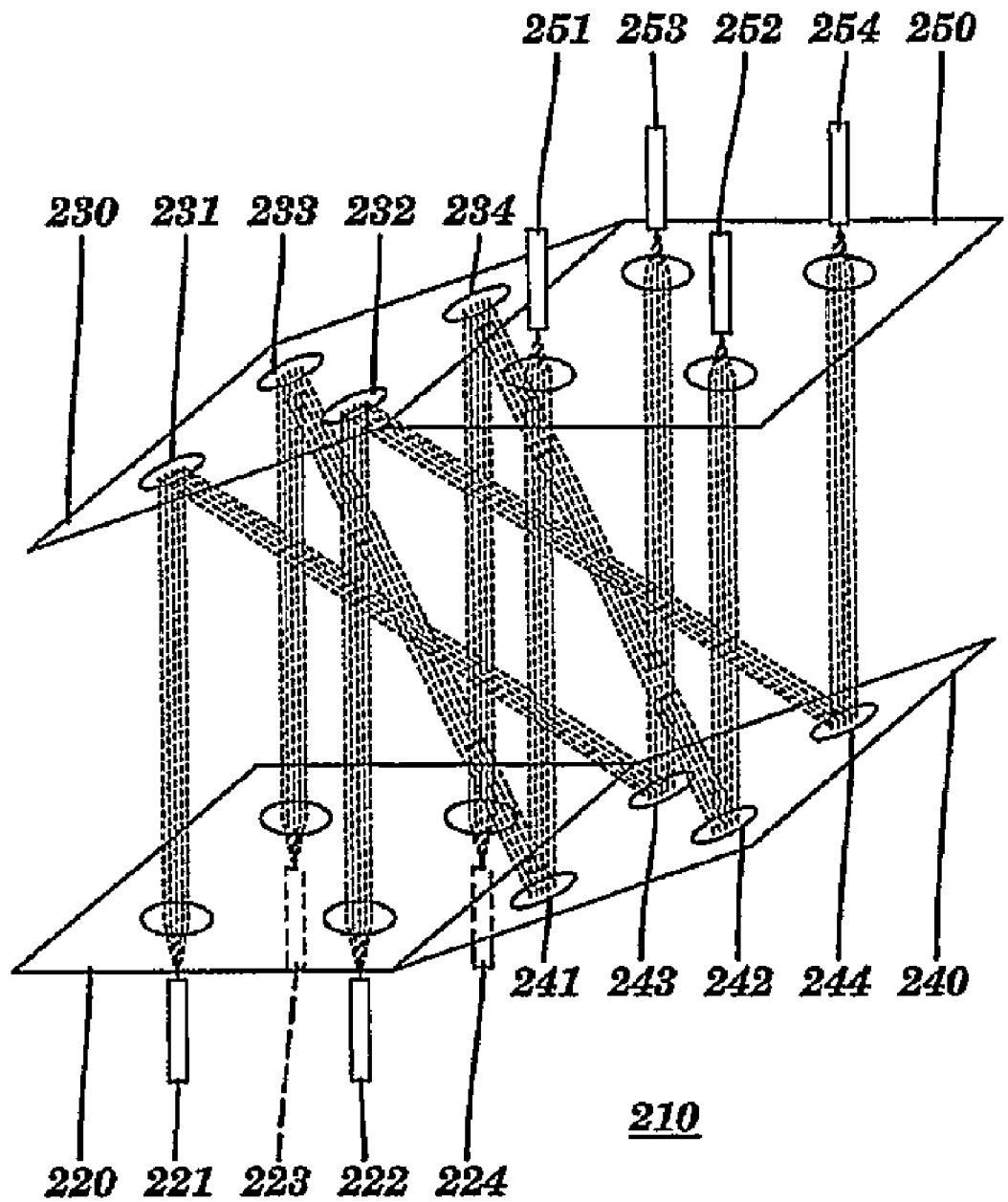
Figure 21:
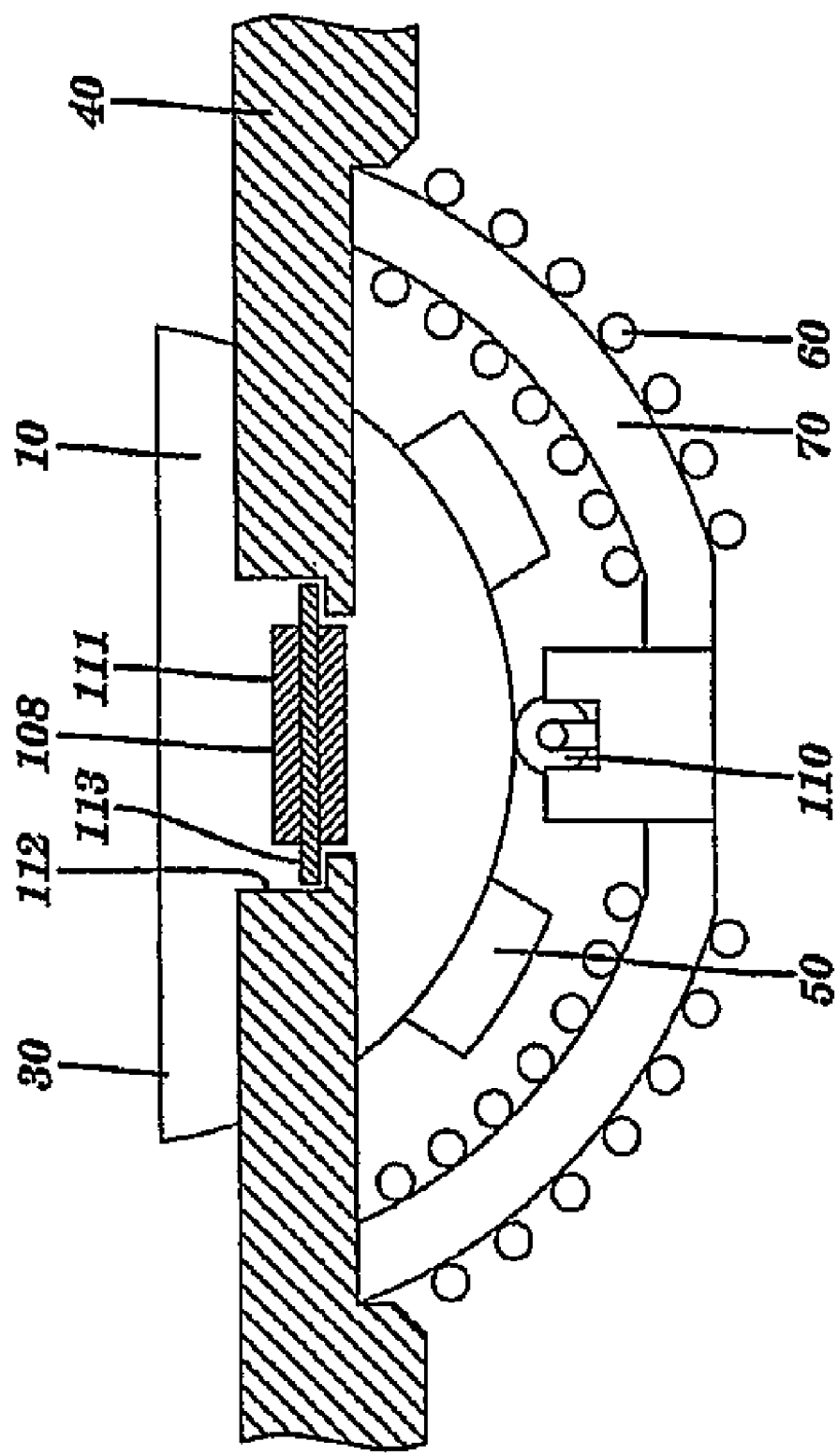
Figure 22:
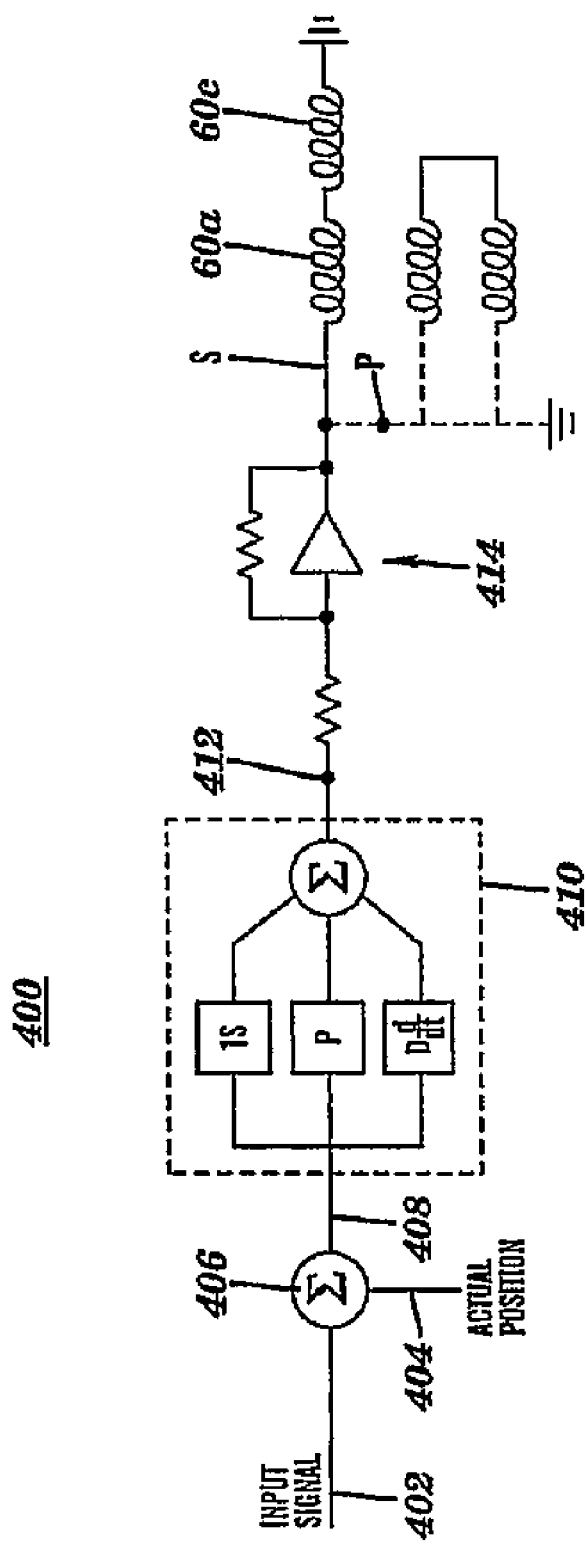
Figure 23:
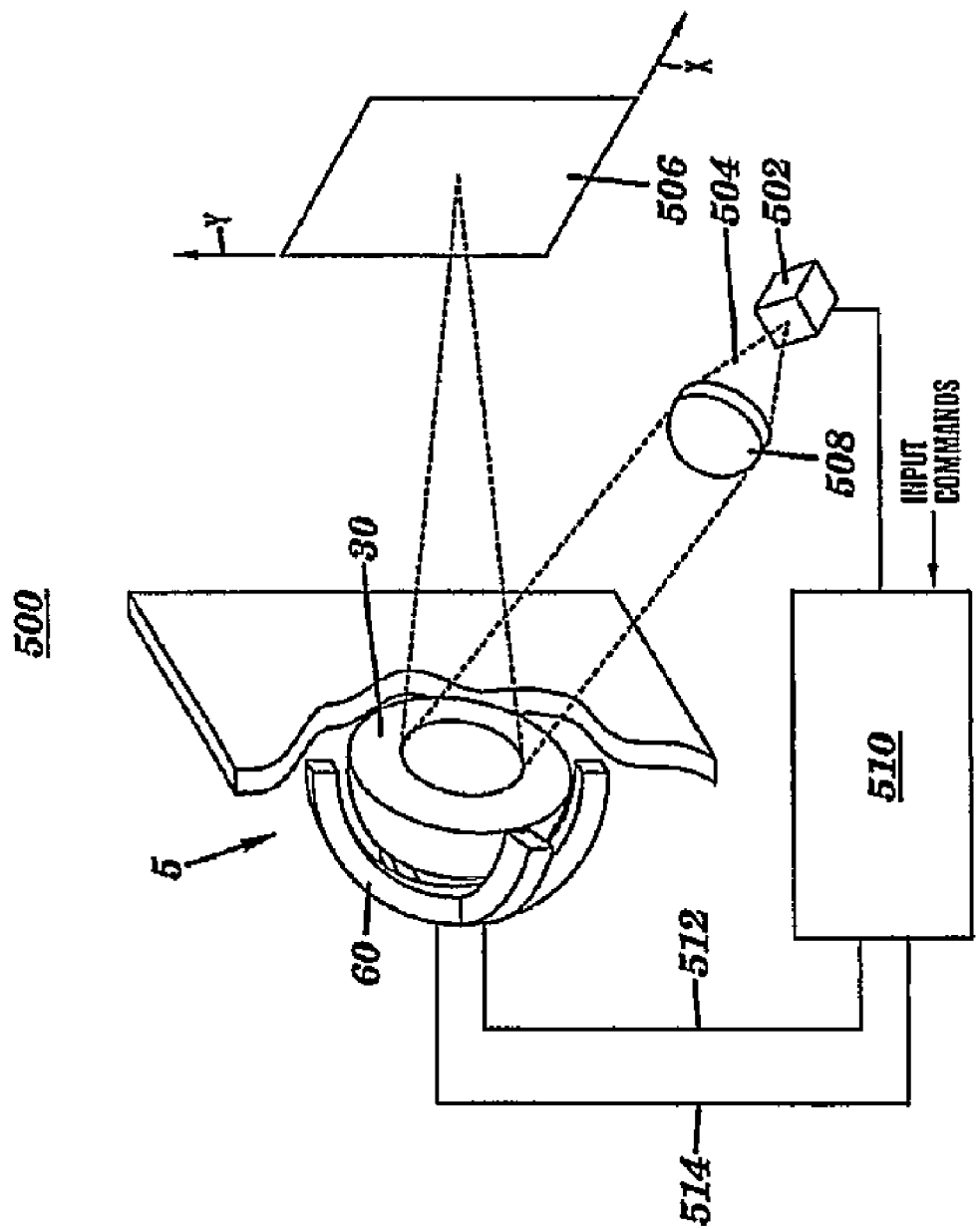

Referring to FIG. 10, and the above description, the clamping force provided between the magnetic element 50 and the stator element 70 provide a net magnetic traction force $F_{net}$ for retaining the ball 10 in its raceway 20. The magnitude of the clamping force $F_{net}$ is dependant upon the magnitude of magnetic flux driven through the air gap 73. The flux magnitude depends on the strength of the magnet portions 50a–50d, the geometry of the air gaps 73a–73d, the magnetic permeability of the stator arms 70a–70d and the magnetic permeability of ball 10 or back iron 81 at the resulting flux level. The thickness of coils 60 can be seen to limit the minimum available air gaps 73a–73d. Adjusting any of these parameters can produce a wide range of the claiming force magnitude. In FIG. 10, the direction of a traction force F across each air gap 73a–73d is substantially radial with respect to the ball 10. The resultant clamping force (Fnet) is also a function of the average cone angle subtended by the annular magnetic ring 50, i.e. the size of the magnets.

A normal force $F_{normal}$ directed substantially radially toward the spherical center 32 is generated between the ball 10 at the bearing seat 20 to oppose the clamping force $F_{net}$. This normal force generates a frictional torque between the ball 10 and the bearing seat 20 that resists rotational motion of ball 10 about its spherical rotation axis 32. According to the invention, the magnitude of the clamping force $F_{net}$ is selected to hold the ball 10 in a fixed position for long periods, e.g. from about 50 ms up to many hours, during normal operation. Moreover, the magnitude of the clamping force may be selected to retain the ball 10 against gravitational forces should it be advantageous to use the steering apparatus in any orientation. The claiming force magnitude may also be selected to retain the ball in place even in the presence of high shock loads if needed.

In the bearing seat 20 and ball 10 interface, the normal force $F_{normal}$ opposing the clamping force $F_{net}$ generates a frictional force at the interface that is substantially perpendicular in direction to the normal force thereby applying a frictional torque tending to oppose any rotation of the ball 10 in the seat 20. Accordingly, any force applied by the coils 60 for rotating the ball 10 must be of sufficient magnitude for overcoming the frictional torque. The magnitude of the frictional torque is given by the product of the normal force $F_{normal}$ and the frictional coefficient in the interface.

For example, in a system design where the ball 10 has a spherical radius of 0.267 inches, (6.8 mm) and wherein the surface 30 is an equatorial plane of the ball 10 offset from the plate 40 by 0.104 inches, (2.6 mm) on the first side 6, when the tilt angle α is zero, and wherein the magnet ring 50 has an outside spherical radius of 0.323 inches, (8.2 mm), the friction torque in inch-pounds is shown in Table 1 below according to a varying air gap dimension in inches. The air gap dimension may be varied by varying the inside spherical radius of the stator 70, indicated by Stator Irad. In this case, a frictional coefficient in the interface of 0.8 is assumed with an interface contact angle of approximately 23 degrees.

TABLE 1

| Stator IRad | Gap (in) | T-friction (in lbs) |
| --- | --- | --- |
| 0.357 | −0.034 | 2.70E−03 |
| 0.391 | −0.068 | 1.62E−03 |
| 0.422 | −0.099 | 1.08E−03 |

Conversely the larger air gap spacing allows for more copper in the coil windings 60a–60d for providing a higher torque constant as will be described below. The torque resisting rotation of the ball 10 with respect to the seat 20 is linearly proportional to the coefficient of friction between the component materials and the normal force $F_{Normal}$. Because of the spherical symmetry of the device, the torque is uniform with respect to the angular position of the ball 10 within the seat 20.

Fabrication Examples

The movable member 10 is preferably formed from a hard, finely structured material such as a metal, e.g. 52100 bearing steel or an optical material, e.g. sapphire, quartz or other traditional optical materials. These material choices are beneficial because they provide a range of manufacturing techniques that allow fabricating the moving member to the required geometry with a high accuracy. In addition, metals and optical materials are also suitable as bearing materials because the have good wear resistance and because these materials can be formed having a high degree of surface uniformity by conventional smoothing and fine polished finish operations. One advantage of the steel bearing material is its magnetic permeability thereby eliminating the need to provide a separate magnetic path through the movable member 10. Of course the movable element 10 may also comprise a composite element having a plurality of materials included therein. In one example, the movable member 10 may comprise a polymer base substrate with a steel bearings surface incorporated therein and a separate polished aluminum mirror attached thereto.

The fixed member 40 is preferably formed from a dimensionally stable material having good bearing characteristics and is preferably not readily magnetically permeable. Metals such as a phosphor bronze provide a suitable material for the bearing seat 20 because they are readily fabricated by conventional techniques and because phosphor bronze is a suitable matching material for the bearing steel cited above. The fixed member 40 may provide other functionality such as providing a platform for routing electrical connection to the steering device, a heat dissipation path, or as a structural member for supporting one or more steering devices in an array. The fixed member may also be formed as a composite element. For example, the fixed member 40 may comprise a polymer or epoxy based substrate having a bearing seat of a suitable bearing material incorporated therein and the substrate may include copper circuits embedded therein.

In any configuration, the interaction of materials in the bearing interface should be selected according to well known bearing material matching standards. Using the examples above, a bearing steel ball member 10 is matched with a phosphor bronze raceway 20 and the phosphor bronze raceway 20 is plated with a thin layer of silver or other soft lubrication film. In this case the phosphor bronze is the softer material and substantially all of the material wear will occur in the phosphor bronze instead of the bearing steel. In addition, bearing elements may be lapped together after conventional forming so that the contact area at the interface is polished and intimate. Such a bearing may have a coefficient of friction of about 0.3 unlubricated. Other bearing seat material combinations such as hard chrome coated onto leaded bronze can yield much lower coefficients of friction if desired.

The bearing seat interface need not comprise a large contact region such as the described above wherein the intimated contact of the ball 10 over the entire spherical raceway 20. Given that the friction and therefore the torque force is independent of area and dependent on normal force, the spherical raceway 20 of the above example may be reduced to three contact pads equally spaced around the bearing seat. Furthermore these contact points may comprise either a sliding contact as described above, or they may comprise a rolling contact. The rolling contact can be achieved e.g. by rotatably supporting one or more rods, balls, ball bearing or roller bearings in the plate 40 for forming the bearing seat 20. A rolling contact interface may be used to further reduce friction thereby lowering the holding torque of the ball 10. In embodiments wherein the bearing interface is a sliding interface, the coefficient of friction in the raceway 20 may be adjusted by further providing a lubricant between the ball and the bearing seat. There may be a dry film lubricant between the ball and the bearing seat, or there may be a low vapor pressure liquid or semi-liquid lubricant between the ball and the bearing seat. As a further functionality, a liquid lubricant layer may provide a surface tension between the ball and socket for retaining the ball in its socket during magnetic levitation or during short periods of linear acceleration tending to lift the ball from the socket.

In the preferred embodiment of the present invention the ball member 10 provides a discreet, rugged and structurally stiff movable member that allows the designer to select one or more materials for fabricating the ball that substantially eliminate many problems of the prior art. Use of steel, or glass eliminates susceptibility to degradation by heat, moisture, chemical environments and allows the device to be able to withstand increased shock and acceleration during use. Moreover, many more fabrication processes become available for the present invention, e.g. in optical applications, the present invention provides the ability to finely polish a mirror surface 30 using conventional optical surface preparation techniques such as flat surface grinding and polishing and especially for gang polishing a large number elements simultaneously. The present invention also enables the use of vapor deposited or vacuum deposited optical coatings, e.g. a multi-layered highly reflective dielectric coating or the like, which may be applied onto a mirror surface 30 that is integral with the ball 10. Such fabrication and coating choices are not available for optical switching devices in the prior art.

The present invention also provides a thermal path for more readily removing heat from the steering device 5 since the movable and fixed elements may be formed from readily thermally conductive materials such as metals for quickly removing heat from the coil windings 60 and from the mirror surface 30. The benefits of these improvements to e.g. an optical switching device include providing an optical switch having lower optical signal losses, the ability to reflect optical beams having higher power densities without causing damage to the mirror surface 30 and reduced wavefront distortion in a reflected beam. All of these benefits are a result of the ability to provide an improved optical surface figure, e.g. a flatter mirror, improved heat dissipation and an improved mirror coating.

Operation

In operation, the movable member 10 may be clamped in a fixed position for a long period without the need for applying any current to the coils 60 due to the clamping force provided by the magnetic element 50. This may allow the steering actuator 5 to direct an optical beam in a fixed direct or at a fixed target and hold the beam position for long periods with using electrical power and without generating heat in the coils 60. To reposition the surface 30 for redirect the optical beam to another orientation of target, a current may be applied to one or more of the coils 60 to induce a magnetic force in the stator 70. The magnetic force induced in the stator 70 acts on the magnetic element 50 to oppose $F_{net}$, thereby reducing or eliminating the torque force holding the ball in place. At the same time, the current in the coils 60 may be driven to rotate the movable member 10 in the raceway 20. The axis of rotation is coincident with a longitudinal axis of the stator 70. The rotation of the movable element tilts the mirror surface 30 for reflecting an incident beam at a new reflection angle. Once the desired position is acquired, the current is turned off, and the ball 10 is once again held in place by the friction torque force. Alternately, an additional clamping force may be applied by inducing a magnetic force in the stator 70 acting in the same direction as $F_{net}$.

Position Detection

It is useful to determine an accurate orientation of the movable member 10 so that its movement can be more accurately controlled. In acquiring a position of the movable member 10 one or more position sensors are provided. In a two-axis device, one position sensor is provided for each axis. Each position sensor may provide an electrical single proportional to a rotational orientation of the movable member 10 with respect to the fixed member 40 or with respect to a reference orientation, e.g a horizontal axis of the mirror surface 30.

Figure 14:
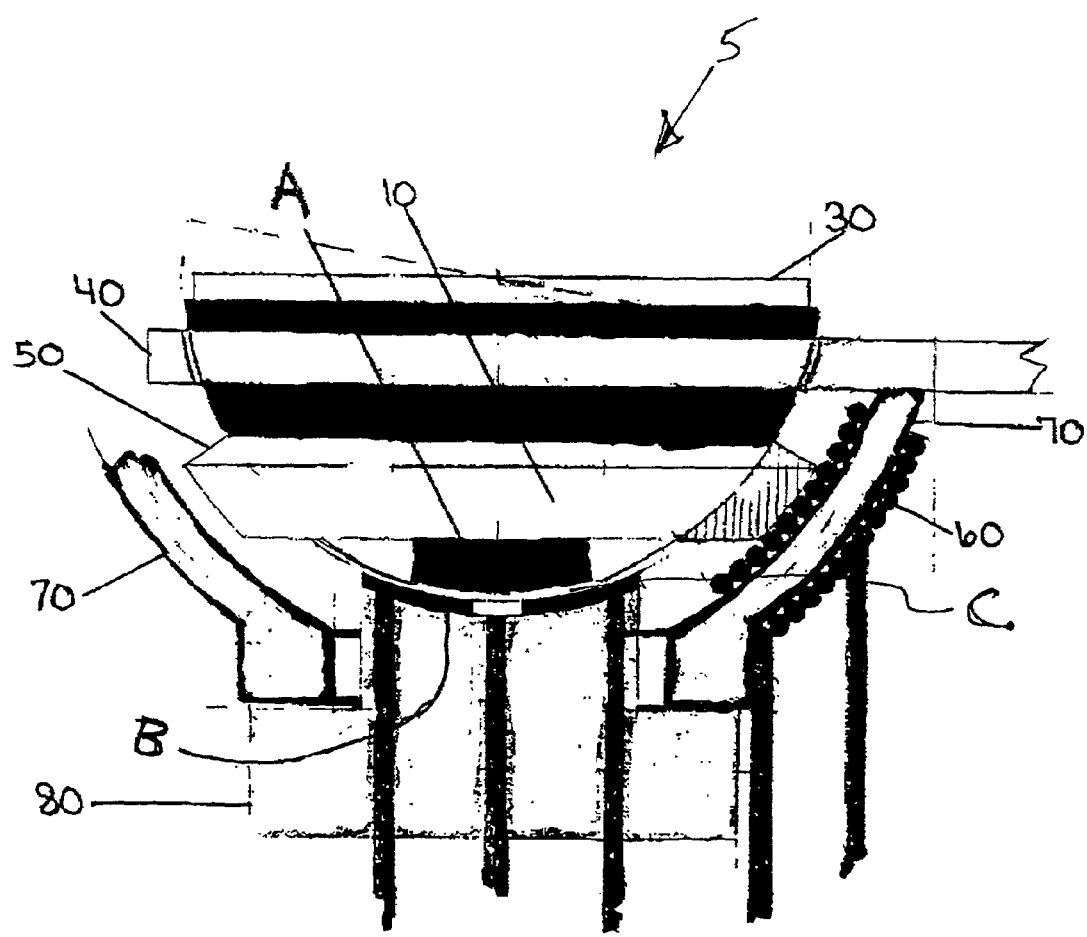
FIG. 14 is a cross section of the device in FIG. 3, configured with a capacitive position sensor.

FIG. 14 depicts a steering device 5, according to the present invention, that further includes a capacitive position sensor assembly for sensing a tilt angle of the surface 30 in two axes. The capacitive position sensor comprises a first electrode surface (A) attached to or otherwise formed onto a bottom side of the ball 10 that is electrically isolated from the remaining surface of the ball 10 and that moves with each tilting motion of ball 10 with respect to a second electrode surface (B) that is stationary with respect to the ball 10 and opposes the first electrode (A) through the full range of motion of the surface (A). A substantially uniformly thick air gap (C) separates the electrode surfaces (A) and (B) forming a dielectric layer between the electrodes such that the electrodes (A) and (B) and the air gap (C) form a capacitor. An alternating current applied to the electrode (A), is coupled to the electrode (B) through the air gap (C) and a capacitance value of the capacitor formed by (A), (B) and (C) can be measured by sensing an electrical current passing through the electrode (B). By segmenting the electrode (B), e.g. into a plurality of uniformly sized sections, e.g. four quadrants, that are electrically isolated from each other, a current can be measured at each section to determine a capacitance value generated at each isolated section. As the electrode (A) moves over different isolated sections of the segmented electrode (B), the capacitance measured by the electrical current value in a given segment of the electrode (B) will be greater when an opposing area of the electrodes (A) is large over the particular section of the electrode (B) such that the section with the largest overlap with electrode (A) will provide the largest current passing therethrough.

Accordingly, as the motion of the ball 10 tilts the surface 30 and the electrode (A) moves over the electrode section of electrode (B), each segment of the electrode (B) will have a different current than other of the segments of electrode (B) and the position of the ball 10 can be determined from the measured values of the current in each of the segments of electrode (B).

Figure 16:
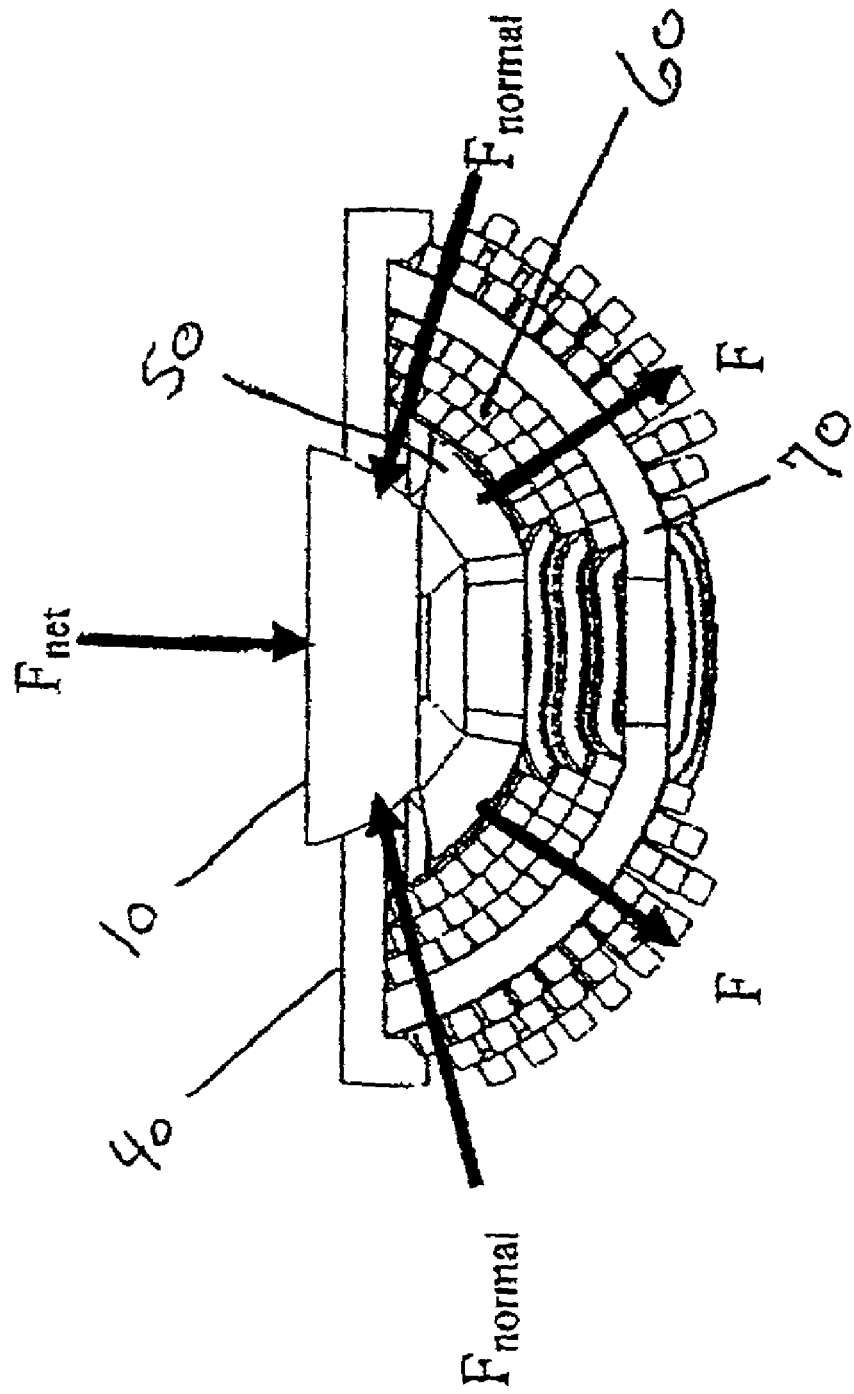
FIGS. 16A, B and C are detailed views of the embodiment of FIGS. 15A, B and C.
Figure 15:
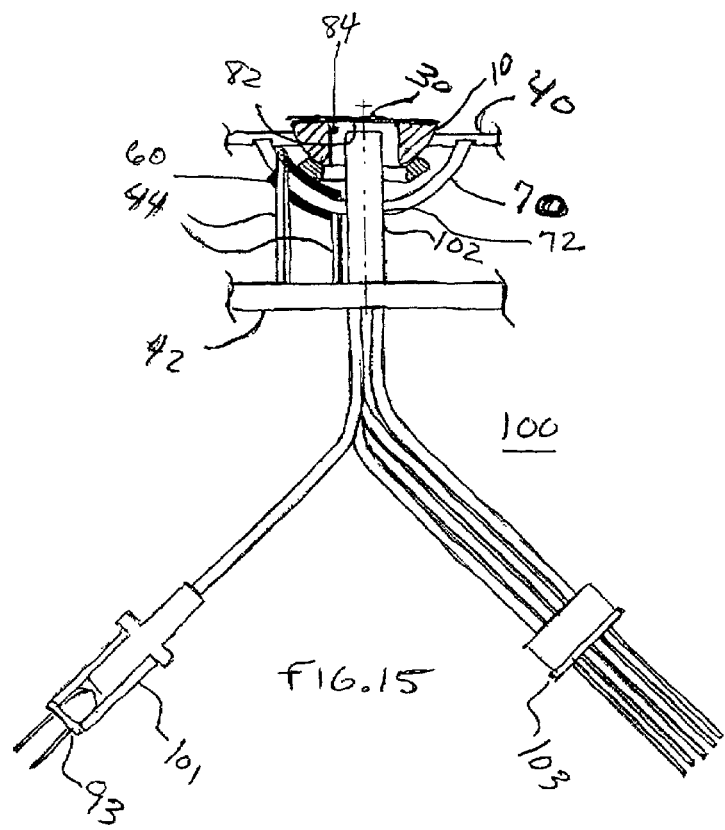
FIG. 15 is a diagrammatic cross section view of an embodiment of the invention configured with an image conduit connecting to remote light source and position sensor.

Another position detection scheme applicable to these embodiments is illustrated on FIGS. 15 and 16. FIG. 15 depicts a beam steering apparatus 5, similar to that of FIG. 3, but further including an underside mirror 82 opposed to the mirror surface 30. A conduit 100 includes provides an optical channel for passing optical signals there through. A back plane substrate 42 is used to connect with the steering device 5 for providing and electrical interface to the steering device 5 via the electrical conduits 44. The conduit 100 also passes through the back plane 42 and may be supported thereby to maintain a rigid interface with the movable member 10. The ball 10 includes a chamber area 84 formed therein for providing a clearance between the conduit 100 and the ball 10 during rotation of the ball.

The conduit 100 comprises a plurality of optical conduits assembled together, usually but not necessarily constructed of a bundle of optical fibers whose proximate and distal ends are congruent. An image or illumination beam incident anywhere on an input plane formed on one end of the bundle appears in exactly the same coordinates on an opposing output plane formed by the other end of the bundle. The conduit may be rigid or flexible. Underside position sensing mirror 82 is formed substantially parallel to the topside deflection mirror surface 30 or could comprise the same surface 30 if the substrate supporting the mirror surface 30 is transparent at the wavelengths used by the position detector. Alternately, any reference mirrored surface 82 attached to and movable with the ball 10 and having a known spatial relationship with the mirror surface 30 may be used as a reflective surface for position sensing.

Figures 16A, 16B, 16C, 16D:
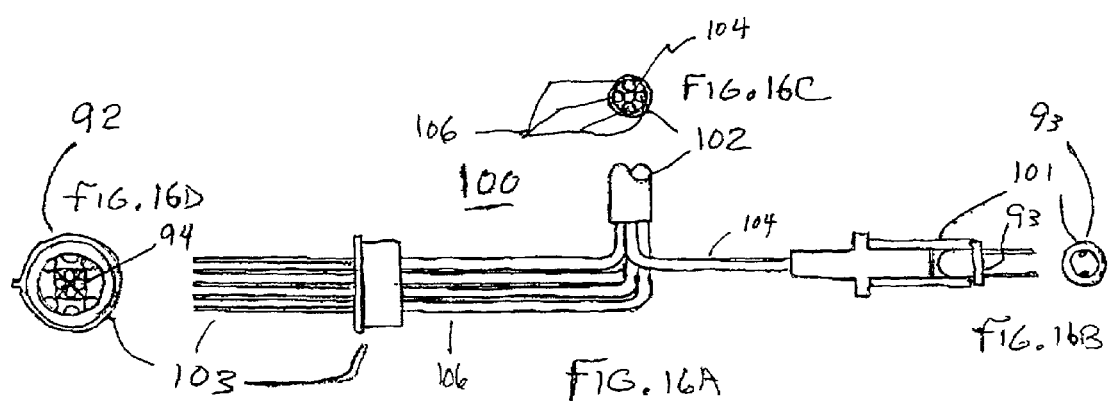

FIG. 15 shows the conduit 100 in detail. At a pick up end of the conduit 100 a pick up termination 102 is provided to bundle the conduits together in a fixed arrangement and to provide stiffness to the terminal end 102. Opposite to the terminal end, the conduits are separated into individual elements. A light source 93 is provided at one of the plurality of conduits at a termination 101 for delivering illumination to the mirror 82. Illumination from the light source 93 is delivered to the mirror surface 82 and reflected therefrom to the pickup termination 102. The end face of terminal 102 is shown in FIG. 16c. The reflected illumination from the mirror 82 is delivered to a radiation detector 92 via one or more of the plurality of optical conduits terminated at a detector termination 103. FIG. 16A shows the image conduit 100 connected by its pickup termination 102 at the pick up end and to the light source in FIG. 16b and to the radiation detector 92 in FIG. 16d.

The light source 93 may comprise a coherent source such as a laser diode or an incoherent source such as a light emitting diode, (LED). Light reflected by the mirror 82 falls onto the pickup terminal 102 which may include one or more center optical conduits 104 surrounded by four or more symmetrically positioned light receiving conduits 106. The same configuration is substantially repeated at the detector termination end 103 which is attached proximate to an active surface of the detector 92. The radiation detector 92 may be a quadrature detector having four distinct detection areas each providing a separate detection signal. According to the invention, each of the four receiving conduits 106 receives radiation reflected by the mirror 82 and delivers the received radiation to a different quadrant of detector 92 such that the radiation exiting each receiving conduit provides a separate electrical signal. As will be readily recognized by those skilled in the art, when the mirror 84 is substantially parallel with pickup end 102, any reflected light from the mirror 84 will be substantially symmetrically distributed over each of four receiving conduits 106 and each of the four detector quadrants may produce a uniform electrical signal. When the mirror surface 84 is tilted with respect to the terminal end 102, any reflected energy from the tilted mirror 82 will be shifted with respect to the terminal end such that the reflected radiation from the mirror 82 is non-symmetrically distributed to the receiving conduits 106. This results in a non-symmetrical distribution of radiation reaching each detector quadrant and an associated difference between electrical signals from each quadrant. The electrical signal difference can then be processed to determine a two-axis tilt angle of the mirror 82 with respect to a horizontal or other reference plane.

Figure 17:
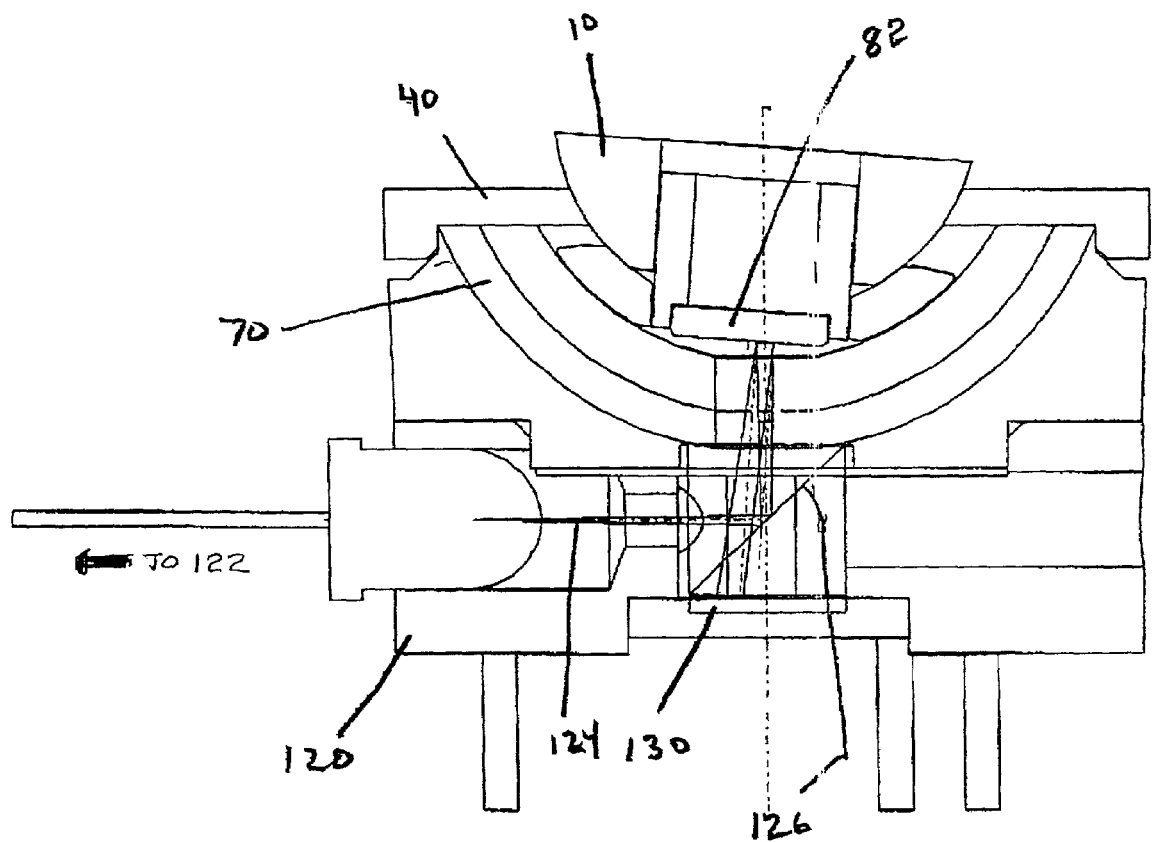
FIG. 17 is a side elevation of yet another embodiment of the invention incorporating a right angle light source, beam reflector, and optical position sensor mechanism.

Referring to FIG. 17, there is illustrated another example of an optical position detection system applicable to these embodiments of the invention. In this example a base member 120 is provided with cavities suitable for receiving a light source 122, a beam splitter mirror assembly 126, and Position Sensitive Detector (PSD) 130 with the orientations shown. A light beam 124 from the light source 122 is reflected off beam splitter mirror assembly 126 towards a mirror 82 on the underside of ball 10, and back through beam splitter mirror assembly 126 to a two dimensional active surface of PSD 130. The PSD 130 provides an electrical signal indicative of the position of the reflected beam with respect to a center position of the two dimensional active surface. As in the previous example, any tilting of ball 10 away from the a horizontal or other reference plane causes a shift by twice the tilt angle in the reflected light beam position on the PSD which outputs an electrical signals corresponding to the x and y coordinates of the reflected beam on the PSD.

Other optical position sensor configurations within the scope of the invention are easily derived. For example, it will be apparent to those skilled in the art that although mirror 82 and the associated light source and sensors may be configured with respect to the equivalent movable component of ball 10 so as to have mirror 82 be other than parallel with the topside mirror surface 30. The light source may be offset from the detector pairs, so that the source light beam and reflected light beam angles are significantly offset rather than nearly co-axial. An illumination detector may also be configured to receive reflected radiation from the topside mirror surface 30 for determining an orientation thereof.

Figure 21:
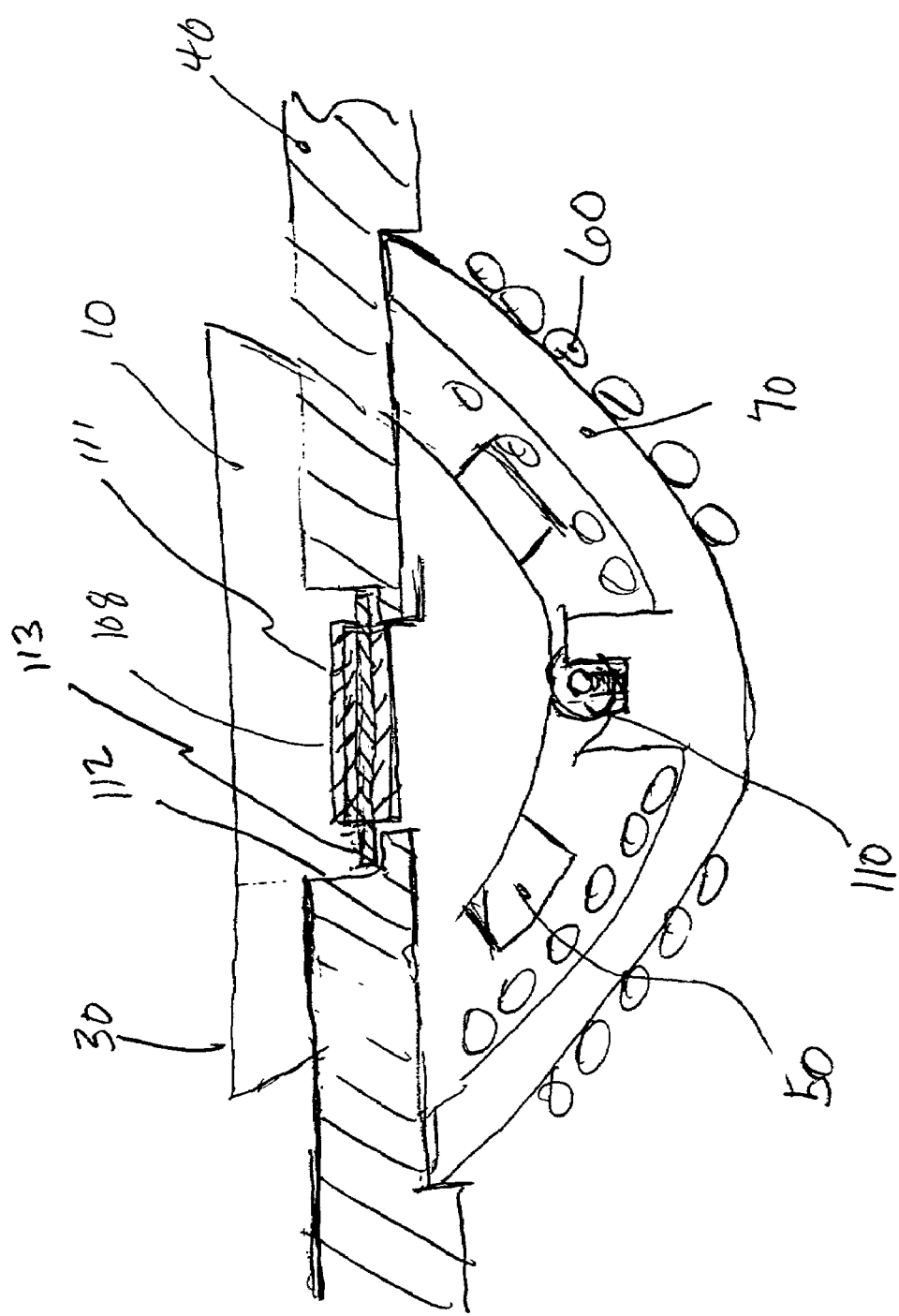
FIG. 21 is a steering device having mechanical position sensors.

Further to the electrical and optical position sensors described above, a mechanical position sensor is depicted in FIG. 21. The mechanical position sensor comprises at least one rotatable element 108 and 110 in rolling contact with the movable member 10 such that the rotatable elements are rotated in response to rotation of the movable member 10. In FIG. 21, a ball 10 is supported for rotation in a spherical raceway, not shown, in a fixed member 40. The fixed member 40 is shown in partial section to depict a recess 112 into which one of the rotatable elements 108 is support for rotation. The element 108 comprises a roller bearing or sleeve 111 supported on an inner shaft 113. The shaft 113 may be spring loaded to force the sleeve 111 into rolling contact with the ball 10. When the ball 10 is rotated in an axis orthogonal to the rotation axis of the sleeve 111, the sleeve 111 also rotates and the rotational movement of the sleeve 111 may be used to drive a rotory encoder or the like for tracking the rotational position of the ball 10. The second rotatable element 110 is similarly constructed and spring loaded against the ball 10 for rotation sensing in a perpendicular axis. The stator element 70 may support the rotatable element 110. Because there is a point contact between the sleeves 111 and the ball 10, the ball 10 may slip past the sleeve 111 when rotation of the ball is in an axis, which is perpendicular to the sleeve rotation axis. Accordingly, orthogonal rotary encoders driven by the sleeves 111 may track the tilt angle of the mirror surface 30. An electrical signal from each encoder can be used in conjunction with suitable electronics to provide the required position feedback.

Electronic Control

Figure 22:
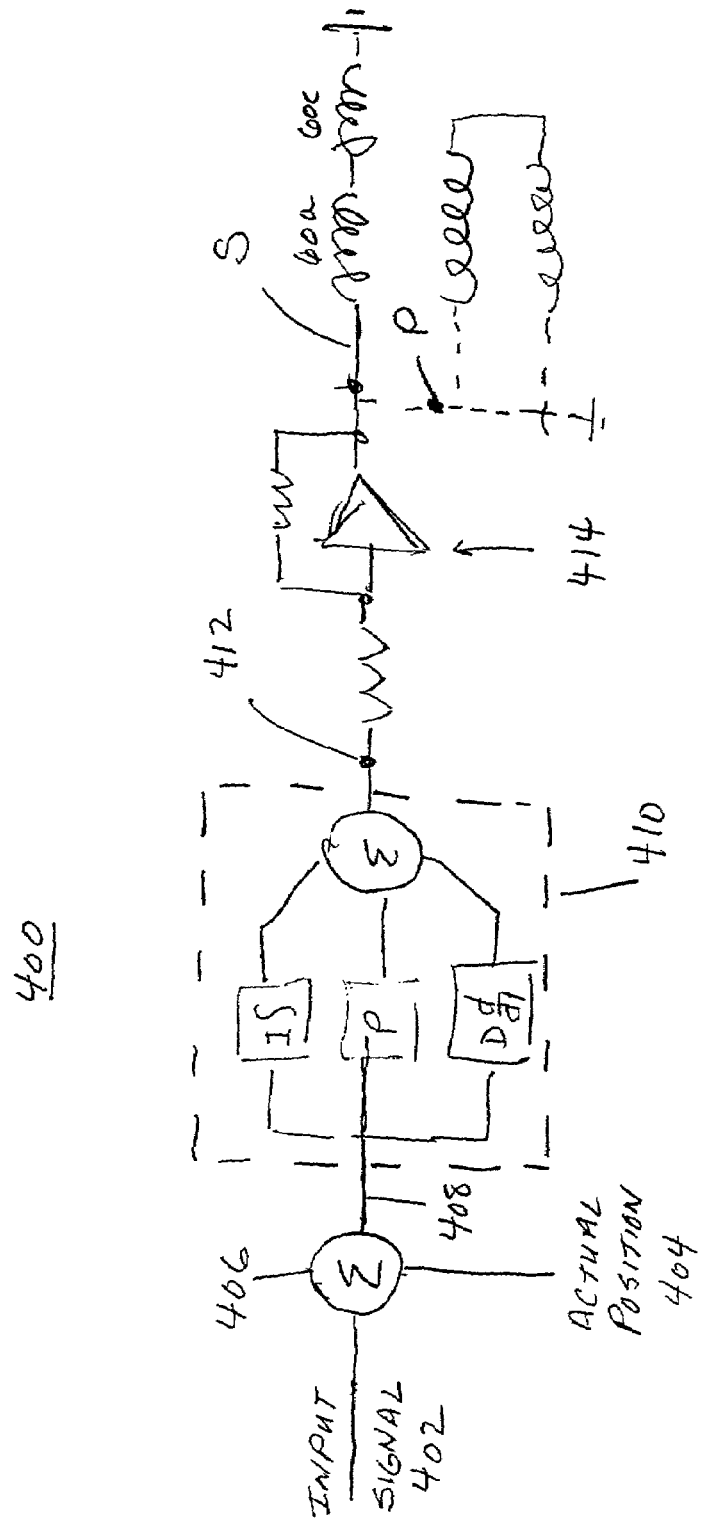
FIG. 22 is an electronic servo controller for driving a control current to the stator coils.

As will be readily apparent to those skilled in the art, the beam steering apparatus 5 may further include a current driving circuit 400, shown schematically in FIG. 22, for receiving a command for moving the ball 10 to a desired orientation. The circuit 400 may also receive a signal indicative of an actual position of the ball 10 based position sensing device signals. Moreover, the circuit 400 may also provide a difference signal for moving the ball 10 from an actual position to a desired position and amplify the difference signal for driving a current in the coils 60a–60d. The circuit 400 may also include a servo-controlled amplifier for driving electrical current to the coils in a precise manner for achieving a very precise orientation of the ball 10 Servo current drives are well known and widely used.

In a preferred embodiment of the current driving circuit 400, a Proportional-Integrator-Derivative (PID), servo driver architecture is depicted in FIG. 22. FIG. 22 represents a single PID device, which may be used to drive a single pair of opposing coils, e.g. 60a and 60c. The opposing coils may be driven in series as show at the driver output S or the opposing coils may be driven in parallel as shown along an output path P, shown in FIG. 22 in phantom. In operation, the circuit 400 receives an input signal 402 from another device such as a digital computer or an analog processor, not shown. The input signal 402 represents a desired orientation of the ball 10 in one axis. The circuit 400 further receives an actual orientation or position signal 404 from one or more position sensors associated with the same one axis. The input signal 402 and the actual orientation signal 404 are summed in a device 406 to provide an orientation or position error signal 408 indicative of how much the ball 10 needs to be moved in the corresponding one axis to achieve the desired orientation or position. The error signal 408 is delivered to a PID servo device 410 for providing a current signal 412 which is amplified by a current amplifier 414 and delivered to opposing coils in one of the configurations S or P. A substantially similar servo drive circuit is used to provide a drive current signal to other sets of opposing stator coils e.g. 60b and 60d.

An Optical Signal Switching Apparatus

Figure 18:
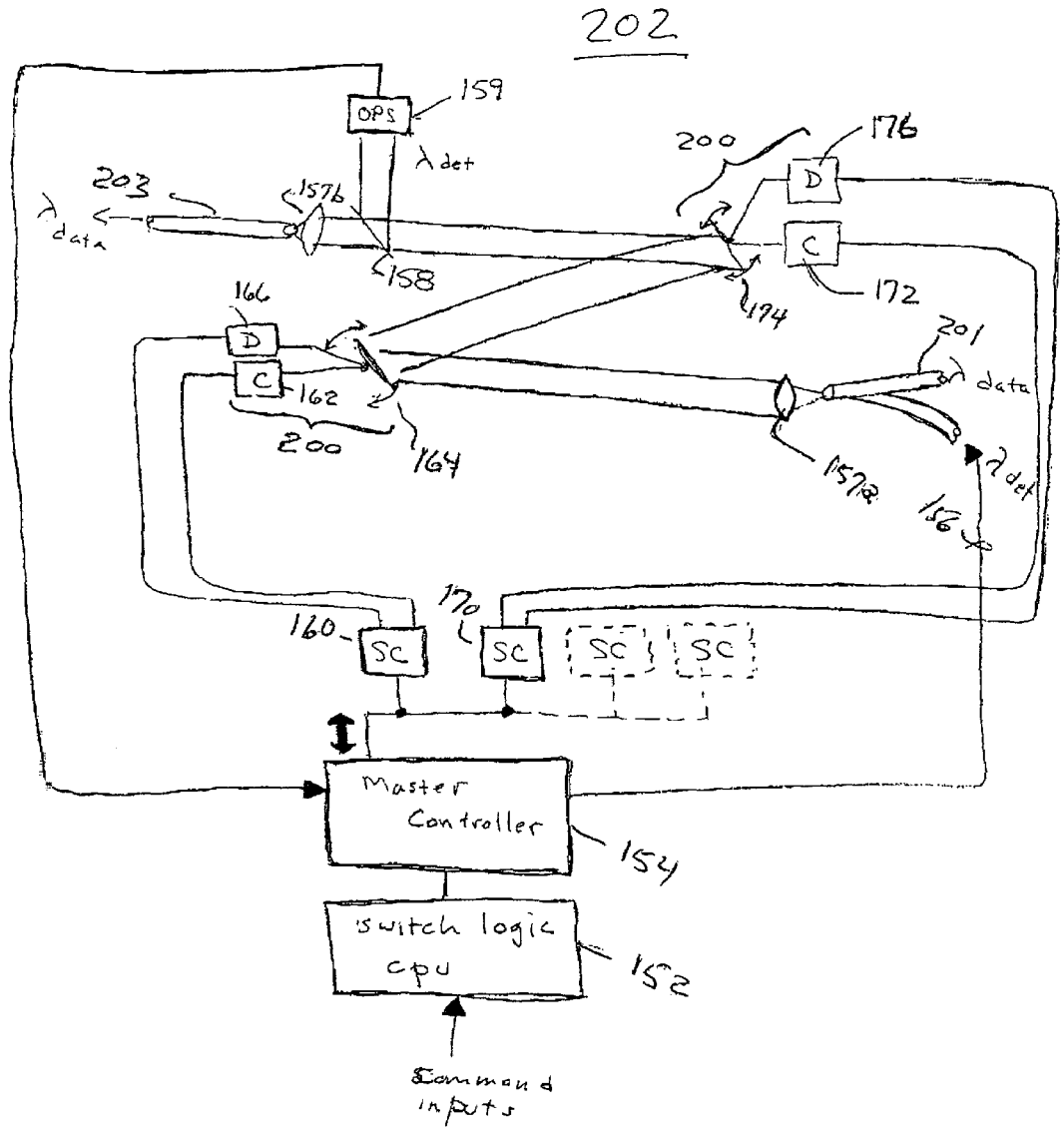
FIG. 18 is a single channel representation of a fiber-to-fiber optical link control system, illustrating beam splitter optical position sensors as components of the system.
Figure 19:
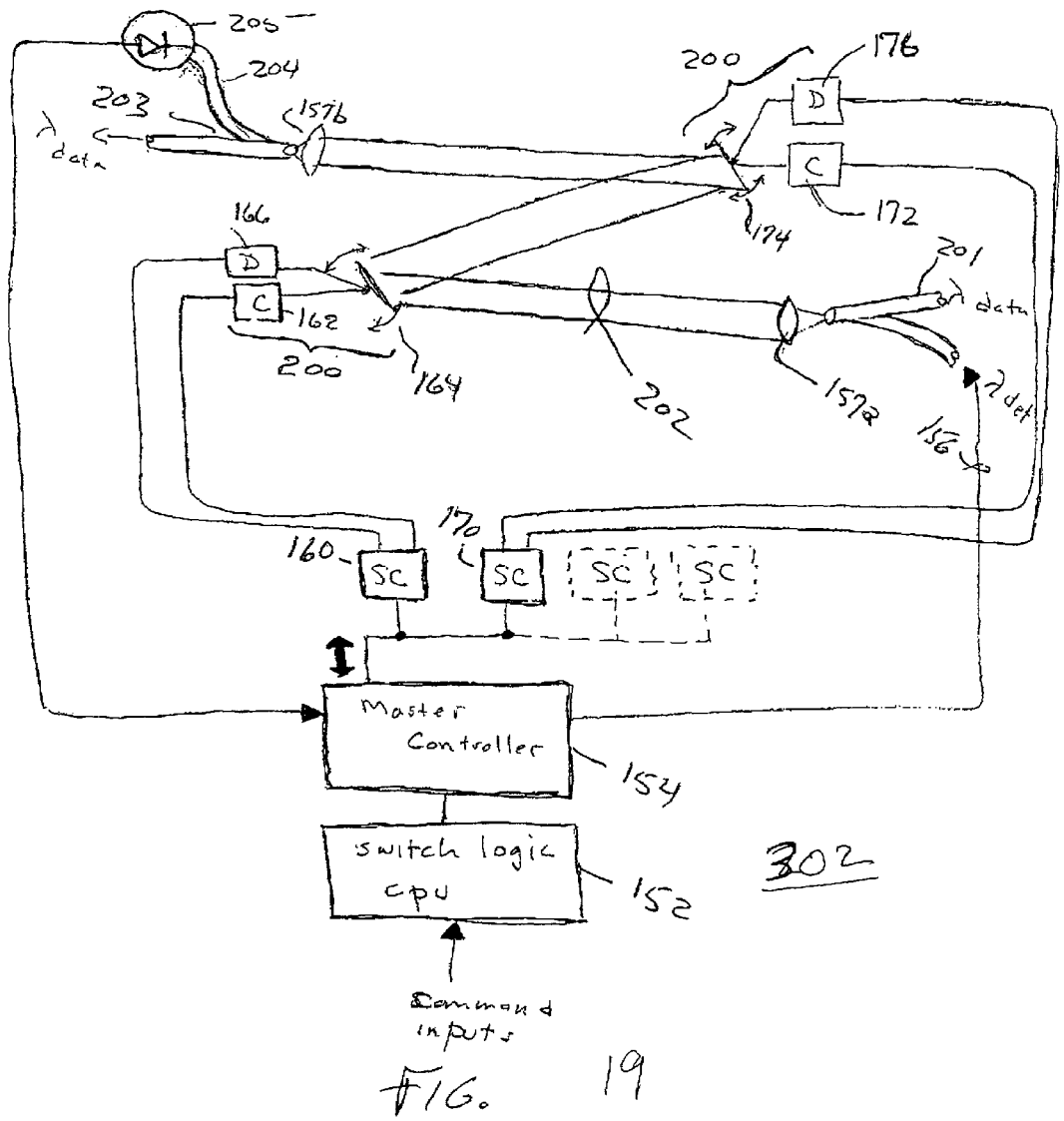
FIG. 19 is a single channel representation of a fiber-to-fiber optical link control system, illustrating fiber tap optical position sensors as components of the system.

Referring now to FIGS. 18 and 19, there are illustrated schematic diagrams depicting two a free space optical links 202 and 302 according to the present invention. The two devices are substantially similar and like elements would be labeled with like reference numerals. Each free space optical link comprises two optical steering devices serving as optical switches 200 embodying the above describe two-axis steering device invention. The switches 200 may direct an optical signal or radiation beam from a first optical fiber 201 to second optical fiber 203. The free space links 202 and 302 merely representative one channel of what may comprise many hundreds of free space links incorporated into a single communications switching hub. Moreover, either of the free space links 202 and 302 may be linked with other channels such that the schematics of FIGS. 18 and 19 may represent any pairing of fiber optic channels in the communications hub.

To control the switching, electrical signal inputs are directed to switch logic CPU 152, which is connected to a master controller 154. According to the invention, the switch logic CPU 152 determines which combination of free space switches 200 will be used to complete the desired channel connection. The switch logic CPU 152 then sends a signal to the master controller 154, which is used to drive one or more servo controllers 160 and 170 for driving stator coil currents 162 and 172 of the selected switch devices 200. The servo controller 160 and 170 utilize position feedback from position sensors 166 and 176 to acquire a position of the mirrors 164 and 174 and to orient one or both of the mirrors in a desired manner. An optical signal from the input fiber 201 of a first communication channel, is collimated by a lens element 157a and reflected by each of the switches 200, by the switch mirrors 164 and 174. The collimated optical signal beam is then focused by a second lens 157b, which focuses the beam onto an end of an output fiber 203 for passing the optical signal thereto. Alternately, the system is reversible such that the input signal may be received at the fiber 203 and output to the fiber 201.

In operation, master controller 154 may insert an optical control signal 156 into the input optical fiber channel 201 to be used for optimizing the channel connections. The control signal 156 follows the same optical path as the communication signal and is at least partially reflected by a beam splitter 158. The partially reflected control signal 156 is directed onto a radiation sensor, which provides an electrical feedback signal to the master controller 154. The feedback signal may be used to optimize the optical signal connection characteristics. The control signal 156 may comprise a different optical wavelength than the communication signal and the beam splitter 158 may be wavelength dependent such that it reflects only the control signal wavelength without reflecting the communication signal. Alternately, the beam splitter 158 may only reflect a small percentage of the total signal.

FIG. 19 depicts a second embodiment of a control signal pick off device used to optimize the optical signal connection characteristics. In this second control signal embodiment a radiation detector 205 is connected to a fiber tap 204, tapped into the output fiber channel 203. The fiber tap 204 samples a few percent of the light in the receiving fiber 203. In this case, the control signal 156 reaches the detector 205 via the tap filter 204 and provides an electrical feedback signal to the master controller 154. The electrical feedback signal may be used to optimize the channel connection.

Figure 20:
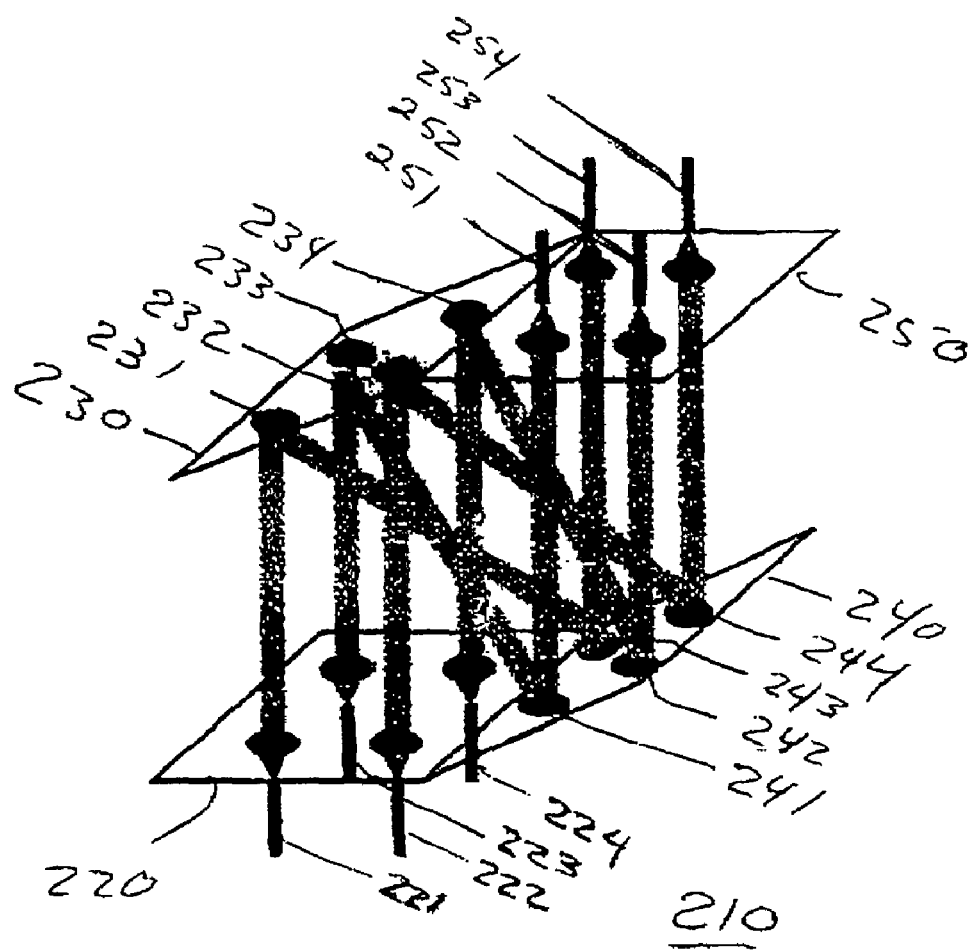
FIG. 20 is a matrix array of two banks of deflectors of the invention, providing an optical link between multiple fibers.

Referring now to FIG. 20, there is illustrated a simple example of an OCX, optical switch 210 connecting a 4-port array 220 of input optical carriers 221–224, which might be single channel or multi-channel fiber optical conduits carrying optically modulated communications signals, and a 4-port array 250 of output optical carriers 251–254. Optical switch 210 includes an associated two-axis, 4 carrier beam, steering device 230, with 4 beam steerers 231–234, constructed and operated in accordance with the present invention. In addition, there is another two-axis, 4 carrier beam steering device 240 with 4 beam steerers 241–244, also according to the present invention.

In operation, each beam steerer 231–234, and 241–244 is controllable in accordance with the invention to steer or direct an optical beam in a desired pointing direction. In one example, an input beam received from optical carrier (221) impinges upon a steerer (231). Steerer (231) is movable in two axes to direct the beam to any one of the steerers (241–244). Each steerer (241–244) is movable in two axes to direct the beam from any one of steerers (231–234) to any one of the optical output carriers (251–254). It will be readily apparent that the maximum size of an array is limited in part by the angular range of the beam steerers. In addition to the example provided above, the function of the input and output beam arrays (220) and (250) may be reversed such that the free space switch (210) provides two way communication between any channel in the array (220) and any channel in the array (250) such that an optically modulated signal traveling in either direction in any first array channel may pass through the OCX to any second array channel.

Accordingly, each or any beam steerer 231–234, and 241–244, may be held stationary for periods ranging from seconds to hours passing continuous communications traffic between the same two optical carriers, or any or all of the beam steerers may be rapidly operated to redirect optical data between different carriers at rates of up to 1 millisecond per change. Because the individual steerer apparatus requires neither power or position monitoring except when it is desired to move the steered element to a new position, it is possible to share drive servo electronics among a multiplicity of beam steerers of a common array. Referring back to FIGS. 18 and 19, the servo controllers 160 and 170 each drive a single switching device 200. According to the present invention, the same two servo controllers may drive be used to drive one or more other switches 200 in a multiplex sharing mode, e.g. serially. The use of each servo controller to drive a plurality switch alignments provides a considerable economy of cost, volume, and power dissipation.

Figure 11:
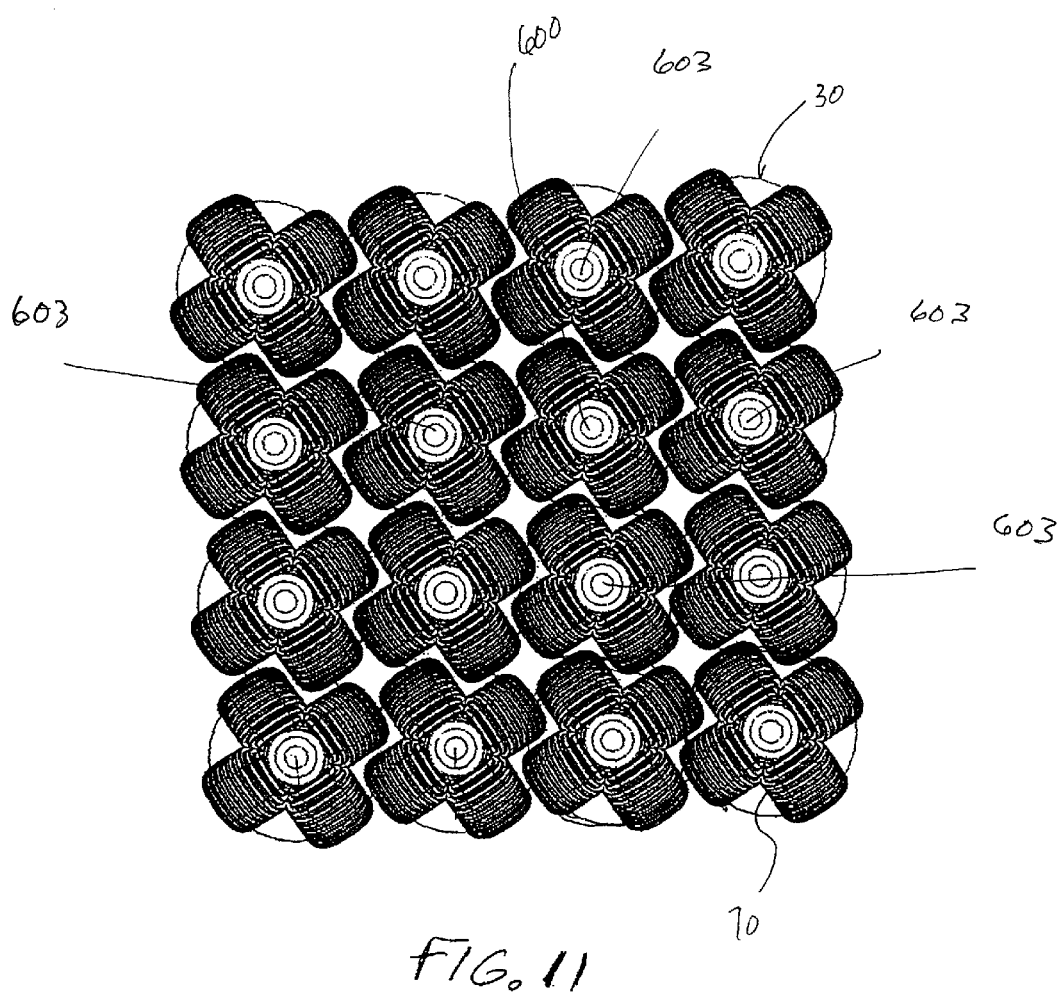
FIG. 11 is a lower end view of an array of the devices of FIG. 3, illustrating the packing arrangement for best area density yield.

Referring to FIGS. 4 and 11, the beam steering apparatus 5 of the present invention is shown from the second side 8 thereof with the mirror surface 30 facing away from the viewer. A footprint of the steering apparatus 5 from the bottom side is cruciform due to the shape of the four-armed stator 70 and the four coils 60a–d. This shape is conducive to a nesting arrangement as shown in FIG. 11. According to the invention a second side footprint of each steering apparatus is formed for nesting of a plurality of the steering devices together in an improving a packing efficiency. Utilizing a circular top mirror 30 and a cruciform stator element 70 of a plurality of the devices may be packed together so that edges of a first mirror 600 may be placed proximate to four adjacent mirrors edges 603 as shown in FIG. 11. Accordingly, a unit to unit spacing defined by a distance or pitch between adjacent mirror centers is about 20% greater than may be expected from individual beam steering devices that can not be nested together.

A Single Magnet Embodiment

Figure 13:
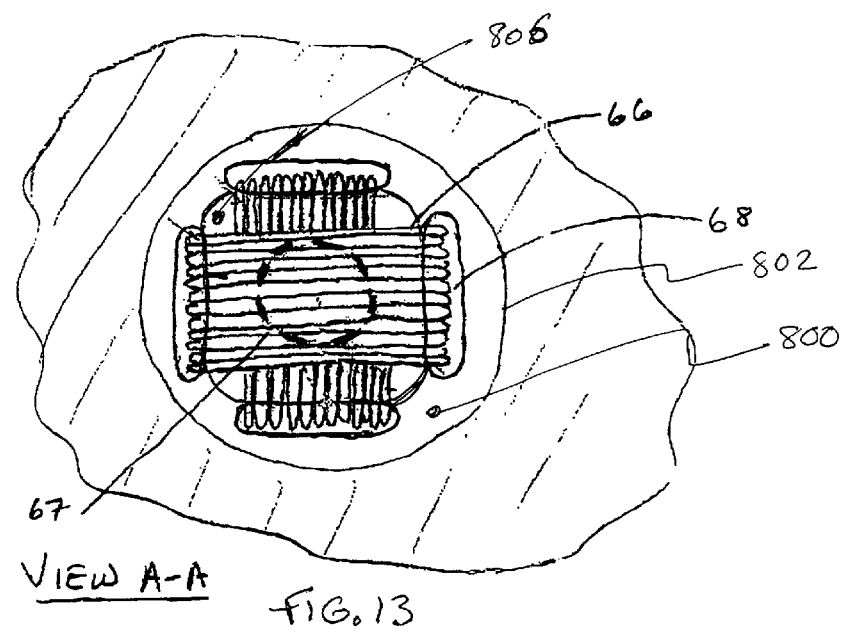
FIG. 13 is a horizontal section view of the device of FIG. 12, showing the dual axis coil assembly in plan form.
Figure 12:
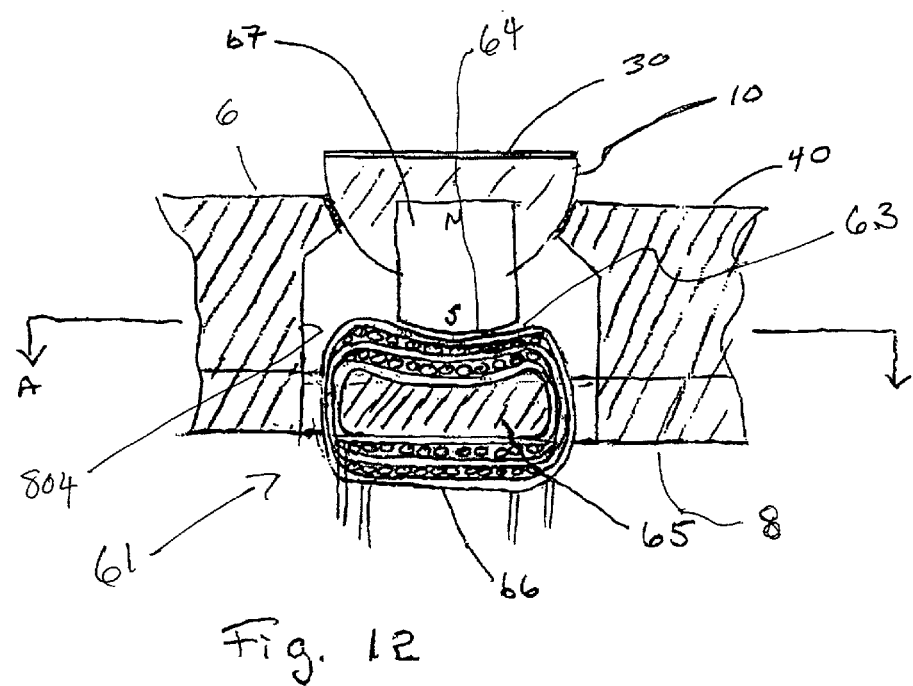
FIG. 12 is a cross section view of a single magnet embodiment with a core magnet of vertical orientation and a dual axis stator and coil assembly.

Referring to FIGS. 12 and 13, another embodiment of the invention utilizes a unitary two-pole magnet 67. This embodiment of the invention includes a movable member 10, disposed in a raceway 20 of a fixed member 40 for movement with respect thereto, as described above. According to this embodiment a single, axially oriented magnet 67 is disposed in a cavity of the movable member 10 on a second side 8, opposing a first side 6. In this case, the magnet 67 is circular in cross-section but other cross-section shapes can be utilized. The magnet 67 includes a single north and a single south pole, at opposite ends thereof, with one of the poles facing a stator assembly 61. The stator assembly 61 comprises a magnetically permeable stator 65 that is fixedly supported with respect to the fixed member 40. The stator assembly 61 is positioned proximate to the magnet 67 and may be formed with a spherical radius 63 to conform to a substantially matching spherical radius 64 formed on the magnet 67. Accordingly, a substantially uniform air gap 75 is provided between the magnet 67 and the stator 66 through the entire range of motion of the movable member 10. Moreover, a substantially uniform traction force is provided between the magnet 67 and the stator 65, over the entire range of motion, for drawing the movable member 10 into the raceway 20 and holding the movable member in a fixed orientation without the need for electrical power.

The stator assembly 61 further includes a pair of orthogonal interlaced coil assemblies 66 wound onto a magnetically permeable stator 65. As a separate electrical current is applied to each coil assembly 66, a magnetic force is induced in the stator 65 with each coil 66 inducing a perpendicular force with respect to the other.

A cross section taken through the stator 65, (section A—A of FIG. 12), is shown in FIG. 13. In this embodiment, the stator 65 comprises a disk 800 having an outer diameter 802 that fits into a bore 804 of the fixed member 40 for securing the stator in place by any suitable assembly technique. Four slots 68 are provided in the disk 800 and pass therethrough for providing a passage for winding the orthogonal coil assemblies 66 around a center region 806 of the stator 65. Each coil assembly 68 is wound orthogonal to the other such that a current applied to each coil induces a perpendicular magnetic force within the stator 65 for moving the magnet 67 and attached movable member 10 through two orthogonal tilt axes. As described above, a servo controller may be used to control the currents in coil assemblies 66 as desired.

A Single Axis Embodiment

In another embodiment of the present invention, a single tilt axis device 700 is shown in FIG. 3A. The single axis device 700 has a substantially identical cross-section as is shown for the device 5 in FIGS. 3 and 5. However, the single axis device 700 includes a stator 702 having only one pair of opposing stator arms 702a and 702c and stator coils 704a and 704c. The single axis device 700 comprises two magnet elements 706 and 708. In this case a magnetic flux path extends across an air gap between the magnet 708 and the stator arm 702c, along the stator to the stator arm 702a, across a second air gap between stator arm 702a and the magnet 706 and through the cylindrical element 712. In the device 700, an elongated mirror surface 710 is formed onto a partial cylindrical 712. The magnets 706 and 708 are attached to the partial cylinder 712 and may extend along its full length or along only a portion of the length of the cylindrical element 712. Similarly, the stator 702 may extend along its full length or along only a portion of the length of the cylindrical element 712. The cylinder portion 712 is seated in a cylindrical bearing seat formed in a support plate 714. Accordingly the signal axis device may be used to scan an optical signal along a substantially one-dimensional line. One application of the device 700 may be to scan a scan line 716, incident on the mirror surface 710 such that the entire scan line is scanned through a range of angles.

Radiation Scanning Systems

Figure 23:
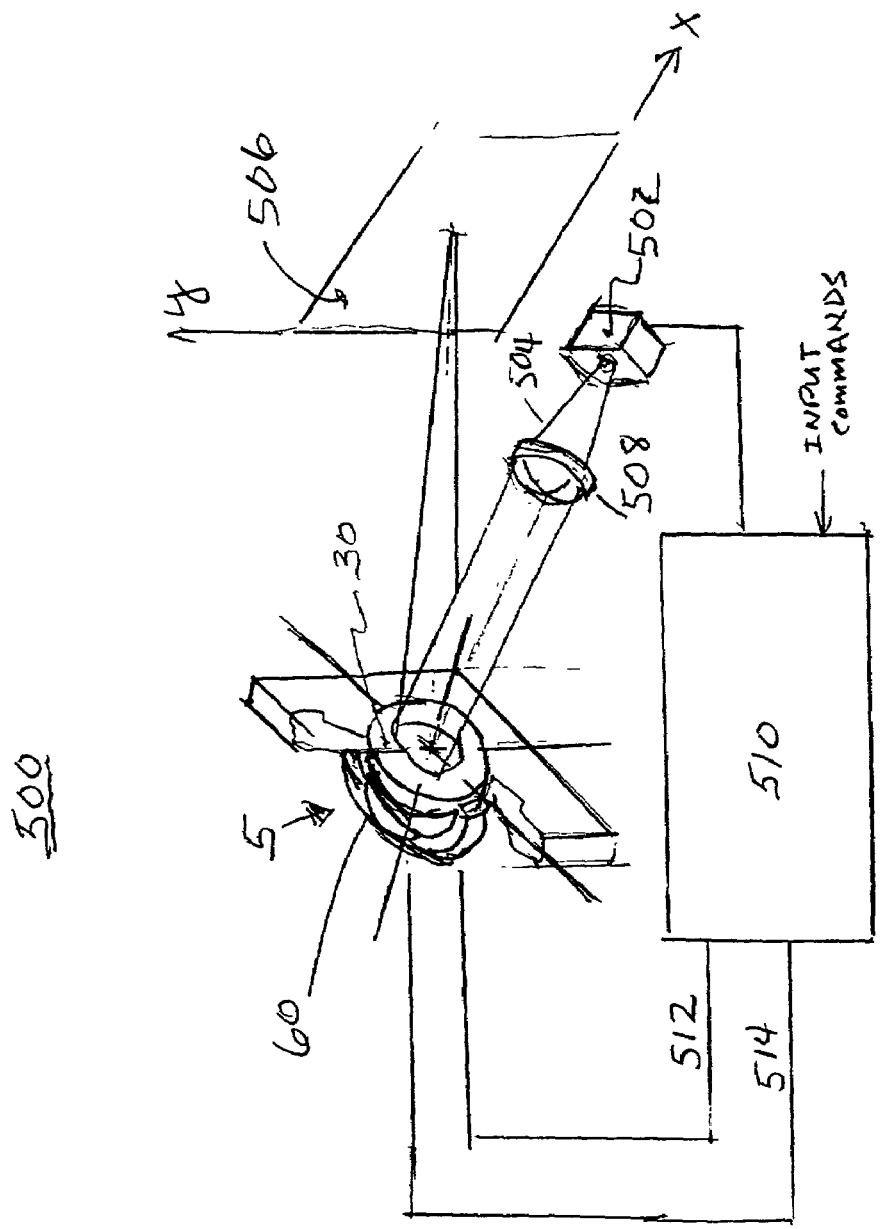
FIG. 23 is a radiation scanning system for scanning two and three-dimensional objects.
Figure 1A:
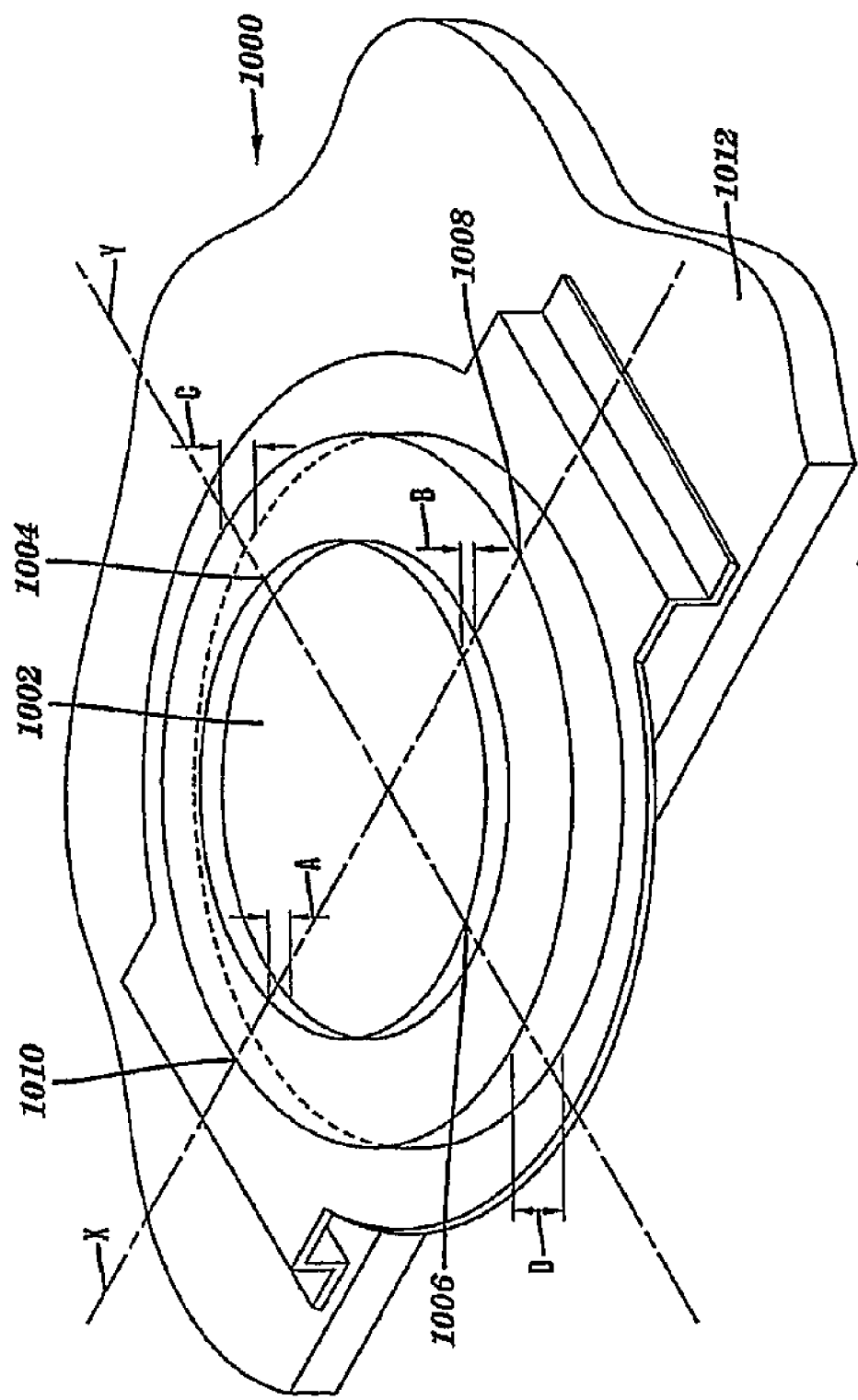
Figure 1B:
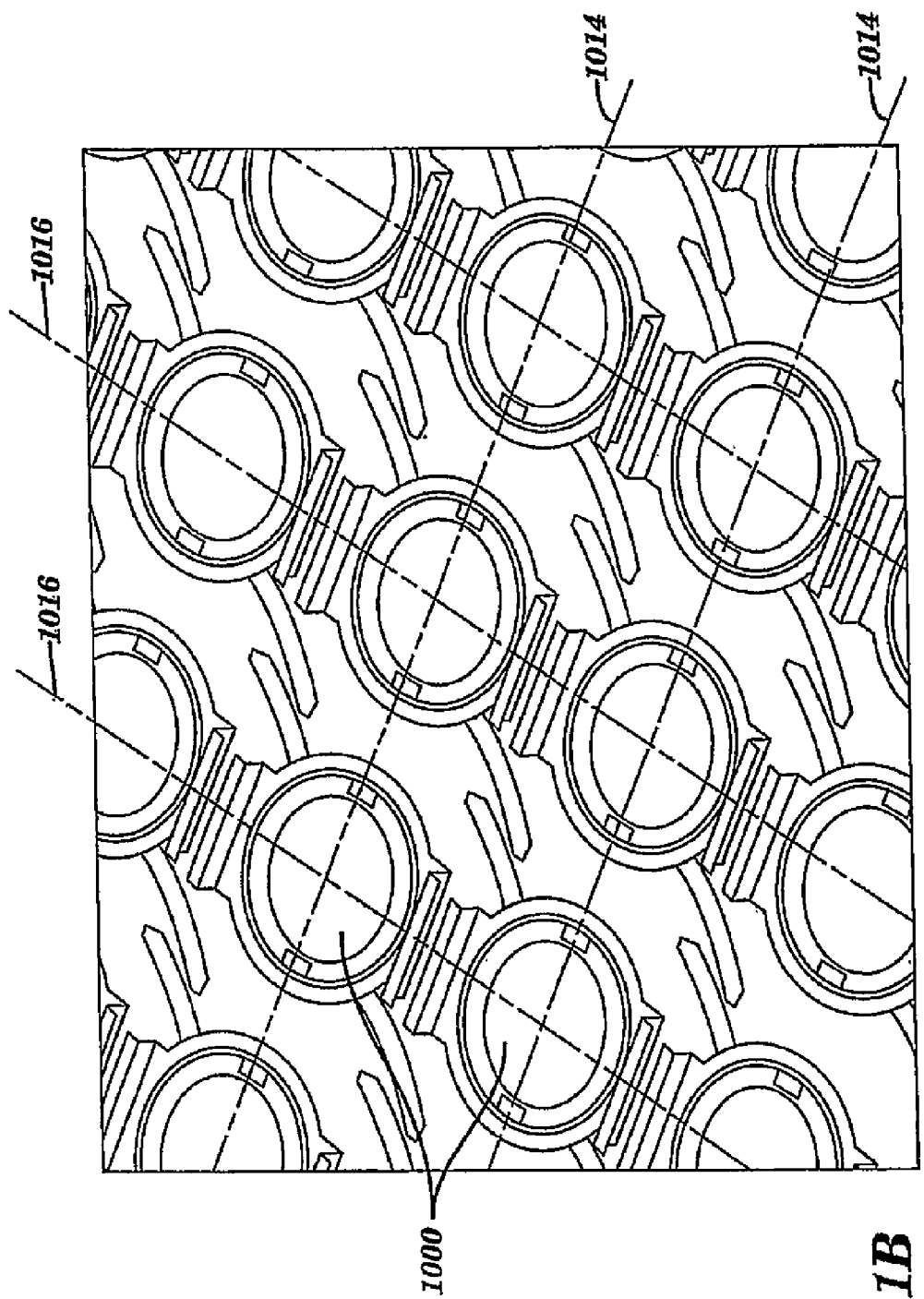
Figure 2:
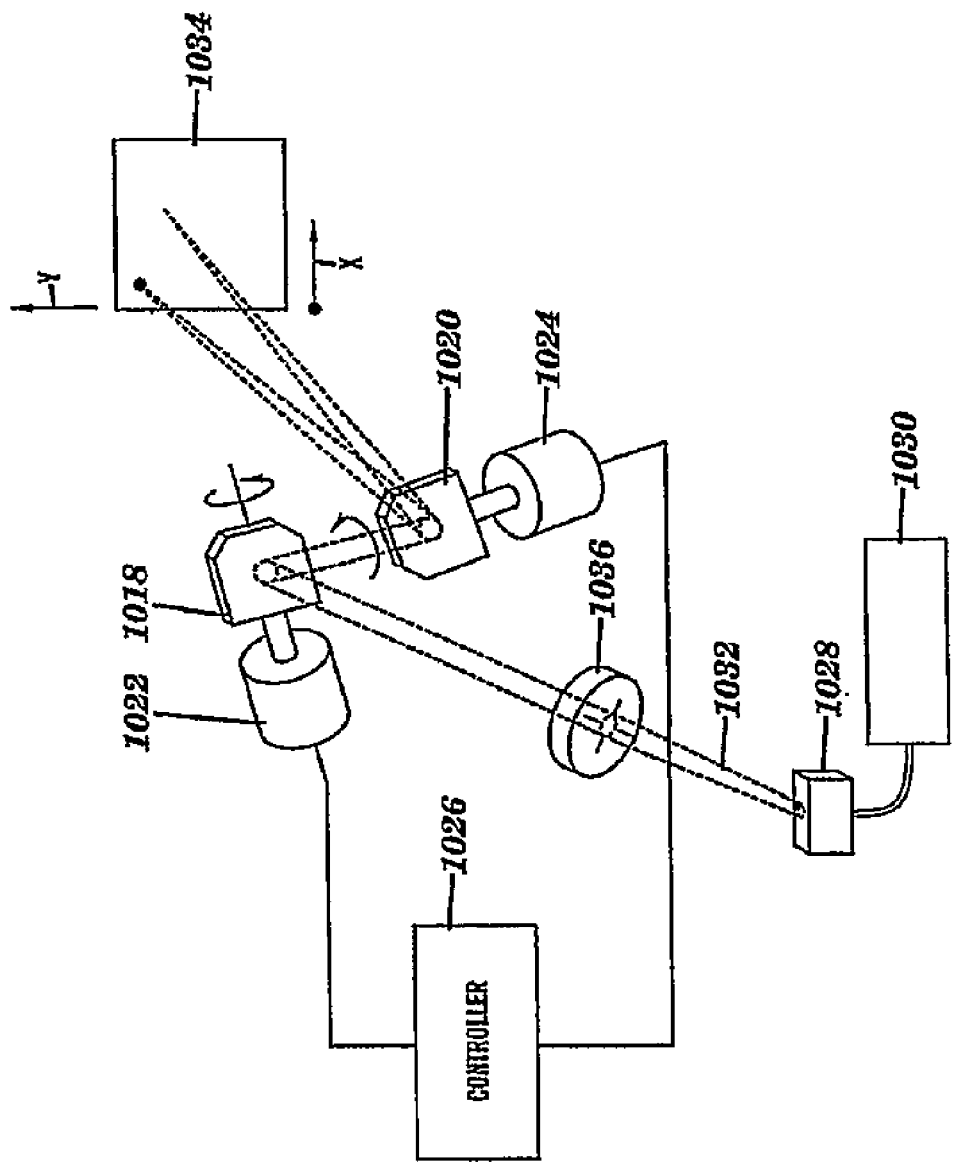
FIG. 2 is a prior art perspective view of a two-axis laser scanning system.

Referring to FIG. 23, another example and application of the invention includes a two axis beam scanning system 500 which may replace the prior art system of FIG. 2 in all types of systems such as laser marking or scribing, and material processing, including laser welding and hole drilling applications in metals and printed circuit boards, (PCB), that may require very high power densities at the deflecting mirror surface 30. Other uses for the beam scanning system 500 may be for scanning a radiation beam over a two dimensional plane for image recording onto photosensitive material, medical applications such as laser dermatological or eye surgery applications or for any other application where precise control of the position of a beam may be required. Such applications may include reading image information, e.g. in a document scanner or recording image information, e.g. in a laser printing device. Moreover, the system 500 may be used for scanning a three dimensional object or a scene, e.g. for performing a scan of an object or a medical patient with an X-ray or other diagnostic radiation beam, or for performing a security scan wherein an image of a three dimensional object or scene is being scanned by the system 500 for recorded by a camera or image recording device. Alternately such a device may be used for light beam display systems, for tracking an object or an optical signal such as may be used in free space optical data communications or for targeting designators.

Accordingly a radiation beam scanning system 500 comprises a two-axis beam steering device 5 according to the present invention, as shown in any of the configurations described herein. In one embodiment of the scanning system 500, a radiation beam source 502 provides a radiation beam 504, which is incident on the movable mirror surface 30 of the steering device 5. The radiation beam 504 is reflected by the surface 30 such that the beam 504 is directed onto a two dimensional scan plane 506 and two tilt angles of the mirror surface 30 may be manipulated to position the radiation beam 504 at desired x and y coordinates in the scan plane 506 or to continuously scan the plane 506 in a desired pattern. In the case where a focusing device, e.g. a lens 508, is provided, the radiation beam path, the beam 504 may be substantially focused over the entire scan plane 506.

A electronic controller 510, includes a current driving circuit 400 as described above, is provided to control each separate tilt angle of the surface 30 by modulating current amplitudes delivered to each of the coils 60 of the device 5 by the connection 512, as is described above. The electronic controller 510 for defining desired motions of the ball 10 might receive an input command from another device. The electronic controller 510 may also receive a position feedback signal from a two-axis position detector associated with the device 5 by the connection 514, and process the feedback signal for controlling the current amplitude in a desired manner. Accordingly, the system 500 may be controlled in several ways to, e.g. raster scan the radiation beam 504 over the scan plane, to selectively position the beam 504 at discrete positions in the scan plane 506 or to hold the beam 504 in a fixed position in the scan plane 506. As is described above, the system 500 may hold the beam 504 in a fixed position indefinitely without the need for driving the coils 60. The electronic controller 510 may also control the output of the radiation beam 504 from the laser 502. Accordingly, the electronic controller 510 may further include a radiation source driver for modulating output amplitude and a wavelength of the radiation beam.

In other embodiment of the system 500, the lens 508 may be positioned anywhere along the optical path of the radiation beam 504 and may be used to focus the radiation beam over a flat field as in the example above where the scan plane 506 is planar. In other applications, the scan plane 506 may comprise a spherical, cylindrical or other surface shape and the lens 508 may be designed to provide a focused radiation beam over a desired scan region.

In another embodiment of the system 500, an image-recording device such as a film or digital camera system, or a radiation beam detector, may replace the radiation source 502 shown in FIG. 23. In this case, the mirror surface 30 may be controlled to scan the surface 506 to record an image thereof or to search for a desired camera response, e.g. the brightest spot, a particular radiation wavelength or a particular feature. Again, the scan area 506 may comprise a three dimensional space such as an object or a scene. Moreover, the lens 508 may be included in the camera and may comprise an automatically focusing lens. In yet another embodiment, the scanning system 500 may be used without the lens 508 for scanning a diverging radiation beam 504 from the radiation source 502 over a region or plane 506. One application of such a device is a free space communication signal-sending device. Alternately, the device 502 may comprise a free space communication signal-receiving device by placing a radiation detector on the surface 30.

Figure 24A:
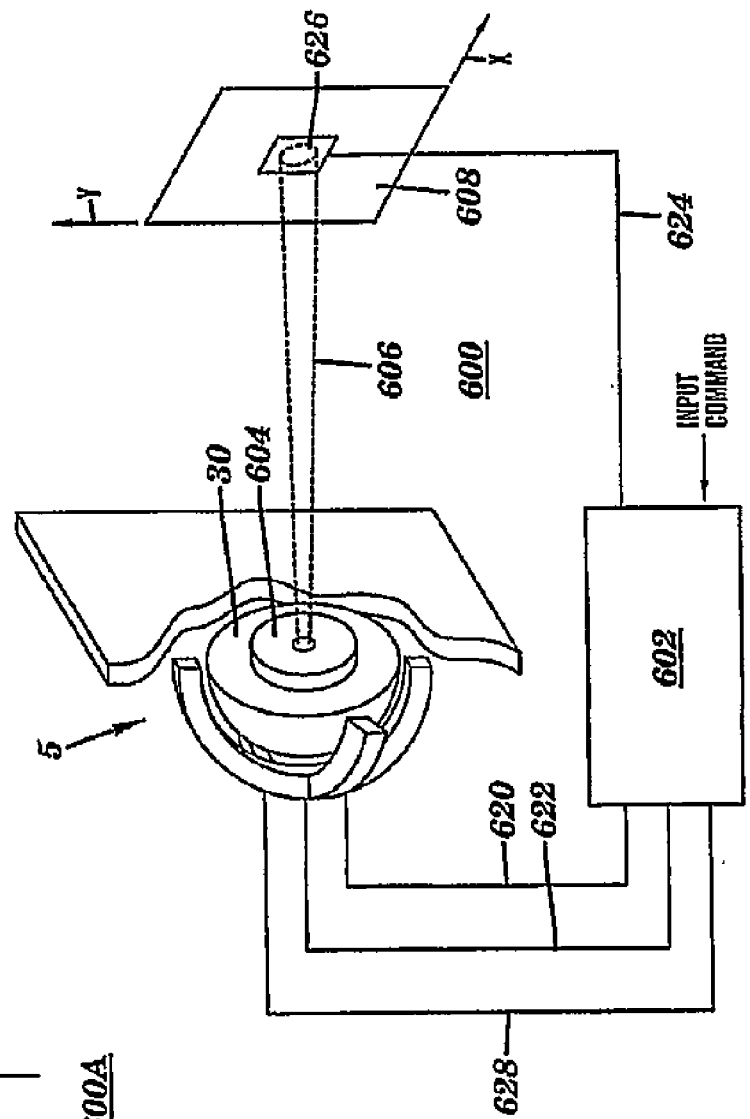
FIG. 24A is a radiation scanning system having a flexible beam conduit attached to the movable member for directing a beam exiting from the conduit.
Figure 24B:
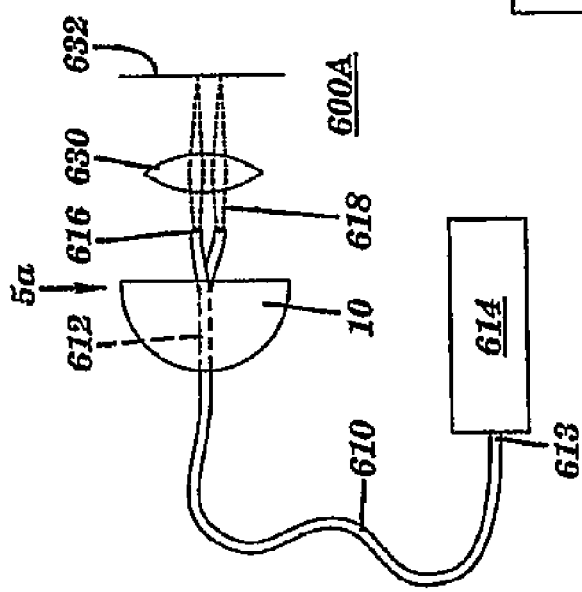
FIG. 24 is a radiation scanning system having a radiation source attached to the movable element.

Referring to FIG. 24, another scanning system 600 comprises a steering device 5 having a surface 30 according to the present invention. The surface 30 is selectively oriented in two axes by a current driver 602, includes a current driving circuit 400 as described above, according to the present invention. In this case, a radiation beam source 604 is attached directly to the surface 30 such that tilting of the surface 30 selectively adjusts a pointing direction of a radiation beam 606 emitted by the source 604. The device 600 may be used to direct the beam 606 onto a desired x and y location of a two-dimensional scan plane 608 or the device 600 may me used to scan a three-dimensional object with the beam 606. In addition, the device 600 may be used to point the beam 606 in a desired direction, e.g. at a far off target.

Current drivers 602 may be incorporated in the system 600 for driving a current signal to the coils, not shown, over a connection 620, for pointing the beam 606 in a desired direction. An input command may be received for directing the motion of the ball 10 in a desired manner. The current driver 602 may also receive a position feedback signal from one or more position sensors associated with the steering device 5, over the connection 622, or a position feedback signal may be received from a position detection device 626 associated with the scan plane 608, over the connection 624. In either case the current driver 602 may include signal-processing capability of monitoring, and or closely controlling the pointing direction of the beam 606. Finally, the current driver 602 may also include a driver for controlling the radiation beam source output amplitude or wavelength over the connection 628.

Another embodiment of a scanning system 600A is shown schematically in FIG. 24A. The system 600A comprises a steering device 5A according to the present invention that is used to support a flexible radiation beam conduit 610 within a bore 612 that passes through the movable member or ball 10. According to the embodiment 600A, the flexible beam conduit 610, which may comprise a fiber optical element, is coupled at an input end 613 to a radiation source 614, e.g. a high-powered laser source, that delivers a radiation beam to the input end 613. A distal end 616 of the conduit 610 is supported within the bore 612 and the distal end 616 is movable with the ball 10 by the steering device 5A. A radiation beam 618 exits the conduit 610 at the distal end 616 and may be pointed in a desired direction or at a scan plane 632, much like as in the system 600 described above. Similarly, a controller, not shown, may be used to control the pointing direction, receive feedback from position sensors and control the output amplitude and or wavelength of the radiation source 614.

In either of the embodiments 600 or 600A, a lens 630, shown schematically in FIG. 24A only, may be positioned between the radiation beam, (606, 618), and the scan plane (608, 632). In either case, the lens 630 may comprise a telecentric lens, which is designed and positioned such that for each pointing direction of the radiation beam (606, 618), the lens 630 will direct the radiation beam to be incident onto the scan plane (608, 632) such that the beam is incident substantially perpendicular to the scan plane (608, 630). Accordingly, either of the scanning devices 600 and 600 A when combined with the lens 630 may selectively address a plurality of discrete x and y points on the scan plane (608, 632) with an angle of incidence of the beam (606,618) that is substantially perpendicular to the scan plane surface (608, 632). This capability is readily applicable in laser processing devices e.g. in laser via drilling devices for drilling via holes in PCB's, in laser trimming device for trimming electronic circuit components, e.g. resistors and capacitors and circuit repair devices, e.g. for repair integrated circuits by laser ablation of selected portions of the circuit.

In another embodiment of the present invention, a radiation beam detector may be attached to the mirror surface 30 for providing an electrical signal in response to receiving a radiation signal thereon. A connection may be provided between the beam detection device and an electronic controller to deliver a beam detection signal to the electronic controller. The radiation beam detector may be used to seek, track and receive an optical signal by scanning the detector over a range of tilt angles, using the detector signal as a position feedback signal. Alternately, both a radiation source and a radiation receiving or detecting device may be mounted onto the surface 30 simultaneously for providing a steering device for pointing an output beam and for receiving an incoming optical signal.

Variations on these embodiments will be readily discernable to those skilled in the art. The steering device 5 can be scaled up and down to meet quite different applications and requirements. There will be design limits to the mass that can be accommodated on the steered element, but electronic and mechanical microstructures provide for many possible applications of the functionality and performance provided by the invention, in addition to simple beam steering.

Although the surface 30 is typically depicted as a flat mirror surface, in the embodiments described herein, other surfaces of any desired shape or function may be envisioned by one of skill in the art. For example, the surface 30 may comprise a spherical or aspherical reflector. Moreover the surface 30 may perform other optical functions other than reflection such as wavelength selection, e.g. when the surface 30 comprises a diffraction grating, or wavelength filtering, e.g. when the surface 30 is coated with a wavelength selective absorption coating The invention is susceptible of other variants and embodiments. For example, there is an angularly repositionable platform, which may be used to orient an element attached thereto in a precisely controlled manner, where the element may be manipulated in two axes over a limited angular range within the bearing seat of up to 40 degrees. In another variation, the current driver may be in communication with a manually control input device such as joy-stick or a mouse attached to a computer for manually adjusting an orientation of the movable member 10.

As another example, there is a planar array of angularly repositionable platform systems consisting of a planar structure incorporating a uniformly distributed pattern of individual angularly repositionable platform systems as described above. The control circuit may be common to the array and selectively connectible to any of the angularly repositionable platform systems within the array. Similarly to the arrays described above, there may be individual control circuits for each steering device, or there may be a common control circuit in each beam steering array, where the control circuit is selectively connectible to any of the steering devices within its respective beam steering array.

Other and further embodiments of the invention within the scope of the appended claims will be readily apparent to those skilled in the art, from the abstract, specification and figures attached.

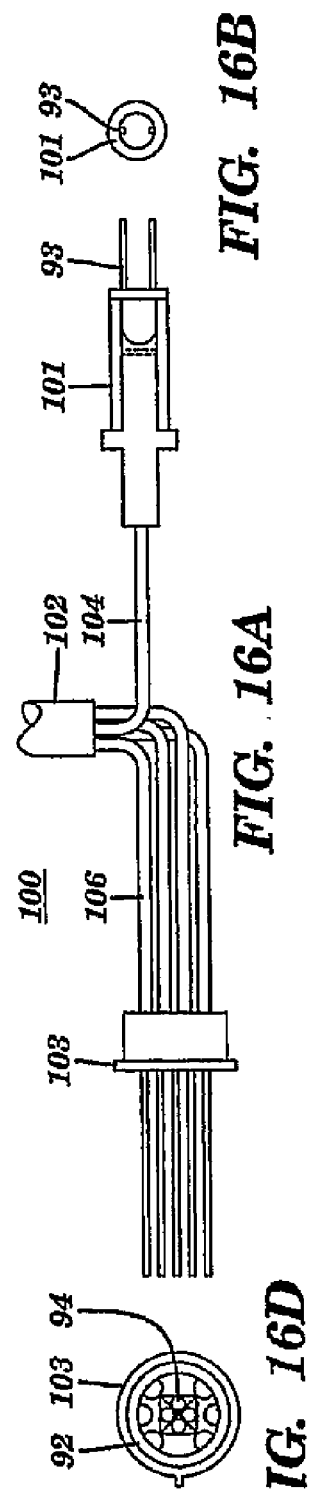

We claim:

1. An apparatus comprising:
   a movable member having a magnetically permeable portion contained therein for providing a magnetic flux path therethrough, a first side and an opposing second side, said second side including an outer bearing surface formed thereon;
   a fixed member for movably supporting the movable member with respect thereto, said fixed member comprising a bearing seat for receiving the outer bearing surface therein and for movably supporting said movable member;
   a magnetic element fixedly attached to said movable member and movable therewith;
   a magnetically permeable stator element fixedly attached to said fixed member and positioned within a magnetic flux field of said magnetic element such that an air gap is formed therebetween, thereby providing a magnetic traction force acting across the air gap for urging the moving element toward the fixed element; and,
   at least one stator current coil wound onto a portion of the stator element for inducing an electromagnetic force within the stator element in response to,a current passing therethrough, said electromagnetic force acting on the magnetic element;
   wherein the bearing surface of the movable member and the bearing seat of the fixed member have a coefficient of friction and wherein said magnetic tractive force in combination with the coefficient of friction provides a clamping force for urging the bearing surface into contact with the bearing seat with sufficient force magnitude that the clamping force holds the movable member in a stationary orientation with respect to the fixed member during normal operation of the apparatus.

2. An apparatus according to claim 1 further comprising a current driving circuit connected with the at least one stator current coil for providing a current to the at least one coil such that the electromagnetic force generated in the stator element has a direction and a magnitude for one of, increasing and decreasing a magnitude of said clamping force.

3. An apparatus according to claim 2 wherein the current driver circuit further provides current to the at least one coil such that the electromagnetic force generated by the coil current in the stator element with a direction and a magnitude sufficient for rotating the movable member about at least one rotational axis.

4. An apparatus according to claim 1 wherein the movable member comprises an outer spherical bearing surface on said second side and wherein the fixed member comprises an inner spherical bearing raceway for receiving the outer spherical bearing surface therein such that the movable member is supported for rotation with respect to the fixed member and wherein the stator element is configured to provide mutually perpendicular electromagnetic forces in response to drive currents in the at least one stator coil, said provide mutually perpendicular electromagnetic forces providing mutually perpendicular rotations of the movable member for orienting the first side at a desired orientation.

5. The apparatus according to claim 4 wherein the movable member further comprises a mirrored surface formed on said first side thereof for reflecting incident radiation therefrom.

6. An apparatus according to claim 1 wherein the movable member comprises an outer cylindrical bearing surface on said second side the cylindrical bearing surface being formed about a longitudinal axis of the movable member and wherein the fixed member comprises an inner cylindrical bearing raceway for receiving the cylindrical bearing surface therein such that the movable member is rotatable about the longitudinal axis for a single axis rotation with respect to the fixed member.

7. An apparatus according to claim 6 wherein the movable member further comprises a mirrored surface formed on said first side thereof for reflecting incident radiation therefrom.

8. An apparatus according to claim 3 wherein the first side of the movable member comprises a platform for supporting an element for controlled movement thereof.

9. An apparatus according to claim 1 further comprising means for determining an orientation of the movable member with respect to a reference orientation.

10. An apparatus according to claim 3, further comprising means for providing an electrical signal representative of an orientation of the movable member with respect to a reference orientation, said electrical signal being communicated to the current driver circuit for determining said direction and said magnitude for rotating said movable member.

11. A method for supporting a movable member comprising the steps of:
 forming the movable member with a first side and an opposing second side having an outer bearing surface formed thereon, said movable member further providing a magnetic flux path passing therethrough;
 supporting the movable member by a fixed member, said fixed member comprising a bearing seat for receiving the outer bearing surface therein the fixed member being formed to provide access to the movable member first and said second sides from opposing sides of the fixed member;
 fixedly attaching a magnetic element to the movable member for movement therewith;
 generating a magnetic traction force for urging the moving element toward the fixed member by fixedly attaching a magnetically permeable stator element to the fixed member within a magnetic flux field of the magnetic element such that an air gap is formed between the magnetic element and the stator element;
 winding a stator current coil onto a portion of the stator element for inducing an electromagnetic force within the stator element in response to a current passing therethrough, said electromagnetic force acting on the magnetic element;
 providing a desired coefficient of friction between the bearing surface and the bearing seat: and,
 selecting the magnetic tractive force to act in combination with the coefficient of friction to provide sufficient force magnitude for clamping the movable member in a stationary orientation with respect to the fixed member under normal operating conditions.

12. A method according to claim 11 further comprising the step of driving a current to the at least one stator current coil sufficient for generating the electromagnetic force in the stator element with a direction and a magnitude sufficient for one of, increasing and decreasing a magnitude of said clamping force.

13. A method according to claim 11 further comprising the step of driving a current to the at least one stator current coil sufficient for generating the electromagnetic force in the stator element with a direction and a magnitude sufficient for rotating the movable member with respect to the fixed member.

14. A method according to claim 13, further comprising the steps of:
 determining an actual orientation of the movable member with respect to a reference orientation; and,
 generating an electrical signal representative of the actual orientation.

15. A method according to claim 14, further comprising the step of using the electrical signal representative of the actual orientation for determining said direction and said magnitude for rotating said movable member with respect to said fixed member for achieving a desired orientation with respect to said reference orientation.

16. An apparatus comprising:
 a movable member having a magnetically permeable portion contained therein for providing a magnetic flux path therethrough, a first side and an opposing second side, said second side including an outer bearing surface formed thereon;
 a fixed member for movably supporting the movable member with respect thereto, said fixed member comprising a bearing seat for receiving the outer bearing surface therein and for movably supporting said movable member, wherein said movable member is received by said fixed member through a first side of said fixed member, and wherein said movable member is accessible through said fixed member from a second side of said fixed member that is opposite said first side of said fixed member;
 a magnetic element fixedly attached to said movable member and movable therewith;
 a magnetically permeable stator element fixedly attached to said fixed member and positioned within a magnetic flux field of said magnetic element such that an air gap is formed therebetween, thereby providing a magnetic traction force acting across the air gap for urging the moving element toward the fixed element; and,
 at least one stator current coil wound onto a portion of the stator element for inducing an electromagnetic force within the stator element in response to a current passing therethrough, said electromagnetic force acting on the magnetic element.

17. An apparatus according to claim 16, wherein the bearing surface of the movable member and the bearing seat of the fixed member have a coefficient of friction and wherein said magnetic tractive force in combination with the coefficient of friction provides a clamping force for urging the bearing surface into contact with the bearing seat with sufficient force magnitude that the clamping force holds the movable member in a stationary orientation with respect to the fixed member during normal operation of the apparatus.

18. An apparatus according to claim 17 further comprising a current driving circuit connected with the at least one stator current coil for providing a current to the at least one coil such that the electromagnetic force generated in the stator element has a direction and a magnitude for one of, increasing and decreasing a magnitude of said clamping force.

19. An apparatus according to claim 18 wherein the current driver circuit further provides current to the at least one coil such that the electromagnetic force generated by the coil current in the stator element with a direction and a magnitude sufficient for rotating the movable member about at least one rotational axis.

20. An apparatus according to claim 16 further comprising means for determining an orientation of the movable member with respect to a reference orientation.

* * * * *

UNITED STATES PATENT AND TRADEMARK OFFICE
CERTIFICATE OF CORRECTION

| | | |
|---|---|---|
| PATENT NO. | : 7,129,601 B2 | Page 1 of 26 |
| APPLICATION NO. | : 10/075940 | |
| DATED | : October 31, 2006 | |
| INVENTOR(S) | : David C. Brown et al. | |

It is certified that error appears in the above-identified patent and that said Letters Patent is hereby corrected as shown below:

Please replace the issued informal drawings (Sheets 1-24) with the attached formal drawings (Sheets 1-25).

Signed and Sealed this

Second Day of January, 2007

JON W. DUDAS
*Director of the United States Patent and Trademark Office*